US009825516B2

(12) United States Patent
Lovas

(10) Patent No.: US 9,825,516 B2
(45) Date of Patent: Nov. 21, 2017

(54) WINDRAIDER

(71) Applicant: Andrew Lovas, San Francisco, CA (US)

(72) Inventor: Andrew Lovas, San Francisco, CA (US)

( * ) Notice: Subject to any disclaimer, the term of this patent is extended or adjusted under 35 U.S.C. 154(b) by 0 days.

(21) Appl. No.: 14/830,178

(22) Filed: Aug. 19, 2015

(65) Prior Publication Data

US 2016/0097371 A1  Apr. 7, 2016

Related U.S. Application Data

(60) Provisional application No. 62/039,493, filed on Aug. 20, 2014, provisional application No. 62/148,046, filed on Apr. 15, 2015, provisional application No. 62/156,398, filed on May 4, 2015, provisional application No. 62/184,438, filed on Jun. 25, 2015.

(51) Int. Cl.
*H02K 35/04* (2006.01)
*F03D 5/06* (2006.01)

(52) U.S. Cl.
CPC .............. *H02K 35/04* (2013.01); *F03D 5/06* (2013.01); *Y02E 10/70* (2013.01)

(58) Field of Classification Search
CPC ....... Y02E 10/725; Y02E 10/72; Y02E 10/74; F15C 1/08; F15C 1/04; B01L 3/502738
USPC ..................................... 290/44, 55; 137/829
See application file for complete search history.

(56) References Cited

U.S. PATENT DOCUMENTS

| | | | | |
|---|---|---|---|---|
| 171,962 | A * | 1/1876 | Stephens | F03D 11/00 415/4.1 |
| 4,088,419 | A * | 5/1978 | Hope | F03D 3/02 290/55 |
| 4,174,923 | A * | 11/1979 | Williamson | F03D 3/02 415/211.1 |
| 4,288,200 | A * | 9/1981 | O'Hare | F03D 3/0481 415/4.4 |
| 4,341,176 | A * | 7/1982 | Orrison | B63H 9/0607 114/102.22 |
| 4,685,410 | A * | 8/1987 | Fuller | B63H 9/0607 114/102.22 |
| 4,899,284 | A * | 2/1990 | Lewis | B64C 3/48 244/219 |
| 5,271,349 | A * | 12/1993 | Magrini | B63H 9/1021 114/102.33 |
| 7,605,491 | B1 * | 10/2009 | Chung | F03D 3/0409 290/44 |
| 8,026,620 | B2 * | 9/2011 | Hobdy | F03B 13/20 290/42 |
| 8,167,532 | B2 * | 5/2012 | Hsu | F04D 29/4213 415/4.2 |
| 8,278,776 | B1 * | 10/2012 | Arntz | F03D 5/00 290/54 |

(Continued)

*Primary Examiner* — Tulsidas C Patel
*Assistant Examiner* — Charles Reid, Jr.

(57) ABSTRACT

Windraider is a process and a machine for converting wind energy into electricity. The Windraider process is a previously undiscovered highly efficient process for converting kinetic wind energy into oscillating rotating mechanical energy. The Windraider machine provides a unusually robust and stable platform for effecting the Windraider process, and a series of mechanisms for improving its range of applicability and for efficiently converting its resulting oscillating rotating mechanical energy into electrical energy.

4 Claims, 42 Drawing Sheets

(a.)

(b.)

(56) References Cited

U.S. PATENT DOCUMENTS

| | | | | |
|---|---|---|---|---|
| 8,734,084 B1* | 5/2014 | Lovas | ............... | F03D 5/06 |
| | | | | 415/4.2 |
| 8,860,240 B2* | 10/2014 | Lovas | ............... | F03D 5/06 |
| | | | | 290/44 |
| 9,157,417 B2* | 10/2015 | Kassianoff | ............... | B63H 1/36 |
| 2010/0007152 A1* | 1/2010 | Roskey | ............... | F01N 13/082 |
| | | | | 290/55 |
| 2011/0089702 A1* | 4/2011 | Boren | ............... | F03B 17/063 |
| | | | | 290/55 |
| 2012/0161448 A1* | 6/2012 | Khedekar | ............... | F03D 3/02 |
| | | | | 290/55 |
| 2012/0230021 A1* | 9/2012 | Lynch | ............... | F03B 17/06 |
| | | | | 362/183 |
| 2012/0326447 A1* | 12/2012 | Rodway | ............... | F03D 3/02 |
| | | | | 290/55 |
| 2014/0008917 A1* | 1/2014 | Tsitron | ............... | F03D 1/00 |
| | | | | 290/55 |
| 2014/0035288 A1* | 2/2014 | Beane | ............... | F03D 3/0436 |
| | | | | 290/55 |

* cited by examiner (a.)

(b.)

WINDRAIDER

CROSS-REFERENCE TO RELATED APPLICATIONS

1. U.S. Pat. No. 8,734,084
Filing Date: Dec. 17, 2012
Title of Invention: Wind Wing
Relation to current application: Earlier engineering implementation of the wind energy to mechanical energy conversion mechanism of Windraider.
2. U.S. Pat. No. 8,860,240
Filing Date: Feb. 7, 2014
Title of Invention: Wind Wing Electrical Generator
Relation to current application: Earlier engineering implementation of the mechanical energy to electrical energy conversion mechanism of Windraider.
3. Provisional Patent Application No. 62/038,493
Filing Date: Aug. 20, 2014
Title of Invention: Armstrong Electrical Generator
Relation to current application: Advanced engineering features for the Wind Wing (1. above) and the Wind Wing Electrical Generator (2. above).
4. Provisional Patent No. 62/148,046
Filing Date; Apr. 15, 2015
Title of Invention: Windraider
Relation to current application: Greater understanding and control of the process powering Windraider.
5. Provisional Patent Application 62/156,398
Filing Date; May 4, 2015
Title of Invention; Wiggler
Relationship to current application: Simpler Torsional transfer mechanism than introduced in the Armstrong Electrical Generator Provisional Patent Application (3. above).
6. Provisional Patent Application 62/184,438
Filing Date: Jun. 25, 2015
Title of Invention: Programmable Proportional Control Mechanism for Collapsible Vertical Wings
Relationship to current application: Programmable proportional control for a the Yeager wing element introduced in the Armstrong Electrical Generator Provisional Patent Application (3. above).

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

Windraider is the name given to improvements to the Wind Wing (U.S. Pat. No. 8,734,084), the Wind Wing Electrical Generator (U.S. Pat. No. 8,860,240).

The Wind Wing was conceived as a means of converting wind energy into electrical energy with a minimal displacement of mass.

It was the belief of the inventor that a vertical symmetrical unarticulated airfoil, capable of rotating around a vertical mast could be engineered to oscillate in the wind. And that following Faraday's Law of Induction, a section of a coil mounted on the airfoil's trailing edge would, in the presence of a nearby magnet have a current induced within it. That wind energy might be converted into electrical energy with such a minimal displacement of mass raised the potential that it might produce a simpler, more reliable, and less expensive alternative to other methods of converting wind energy into electrical energy.

A small wind tunnel was constructed using a variable speed DC (automobile radiator) motor, and different symmetrical unarticulated airfoils shapes were fabricated and tested. None was able to achieve oscillation.

The problem is that as a symmetrical articulated airfoil with a zero angle of attack to the wind rotates, lift diminishes in the direction its tail rotates toward; while at the same time it increases in the reverse direction. Most symmetrical unarticulated airfoils will flutter or vibrate, but they will not oscillate across any substantial range or in a regular manner The testing did reveal however, that the force keeping a symmetrical unarticulated airfoil with its chord parallel to the wind inside a structure surrounding it were stronger than anticipated. This led to two coincident efforts. The first was to develop a spoiler which could, in synchronization with a symmetrical unarticulated airfoils rotation, disrupt the lift on one side and then the other. The idea was that with powerful lift forces acting on both sides, inhibiting them on one side would allow the other side to dominate. The second was to take advantage of web-accessible computational fluid dynamic programs (JavaFoil, NASA FoilSim, etc. These revealed that by selecting and positioning relative to one another, three vertical airfoils close to NACA 4-digit symmetrical airfoils, and positioning them bows to wind, air flow velocity in specific sections of the channels between them would be increased, and static pressures decreased to shocking degrees.

To as much as possible maintain this source of force while still capturing wind energy and converting it into mechanical energy a scheme of segmenting and expanding the center airfoil into a Forward nacelle, an oscillating part (named the Oscillating wing) and an Aft nacelle was invented. When a model incorporating this scheme was constructed and tested, the Oscillating wing oscillated regularly over a range of almost 60 degrees. No spoiler was required and the effort to develop one was abandoned.

While not recognizing it at the time, this turned out to be an element of a previously undiscovered means of converting wind energy into mechanical energy, later named the Windraider process.

Coincident with these developments, a method of wrapping the coil around the Oscillating wing, such that it would allow magnets to be positioned on fore and aft of its aft section was invented. It was nearly simultaneously recognized that two L-shaped iron bars, their longer ends holding magnets, positioned with their short ends placed flush against the long ends of the other constitute a permanent magnet dipole, an arrangement that creates a lower-than-air-resistance path for magnetic flux between the poles of two closely positioned similarly aligned magnets or arrays of magnets. And which, with the invented wrapping arrangement allows the flux of between the two outside poles of these magnets to pass over rather than through the intervening aft section of the coil where it would otherwise almost totally negate the flux passing between the inside poles. This allowed the flux density through which the aft side of the coil oscillated could be doubled—which following Faraday's Law of Induction, doubles the voltage induced in the coil. This arrangement of magnets and iron bars was named the Dipole Permanent Magnet Assembly, abbreviated DPMA. Its distinguishing benefit is that by doubling the magnetic flux, it allows the same voltage to be induced with half the number of coil wraps.

At some point it became apparent that such machine could not only cost very little compared to other methods of converting wind energy into electrical energy, but could be fabricated by almost any community anywhere in the world by local crafts people using locally available materials. The potential that this could provide a meaningful amount of electricity to a significant portion of the estimated 25% of the world living without electricity became the dominant objective.

Pursuing this objective, it was recognized that a virtually abandoned (in the early 1900s) technique of creating strong magnets called "compound magnets" could be fabricated in these communities. Further, that aluminum soft drink cans melted (aluminum having a relatively low melting point, low specific gravity and high conductivity) drawn into wire and then coated with a combination of locally available ingredients producing magnet wire for its coils. Given this, it appeared, and still does that a Wind Wing capable of providing sufficient electricity to light two small rooms or charge the battery of a small computer or smartphone can be fabricated in many parts of the world for not much more than $20. This is the basis for the "$20 Model." Other models are referred to as "Tower Models."

Up to that point, little attention was paid to other models. Instead, because their appeared no known prior instance of wind energy being converted into mechanical energy by means the inventor had stumbled upon, focus was directed toward understanding the phenomena. The phenomena itself was eventually named the "Windraider process," its control and construction of an effecting machine is the subject of related Claims in this application.

To help determine the nature of the Windraider process—which turned out to be surprisingly complex and sophisticated—the Wind Wing model was mounted on the top of the inventor's car and driven up and down an abandoned airfield, with videos being made of the Oscillating wing's rotations, the videos later allowing determination of the Oscillating wing's instantaneous rotational speed and the combination of the generated car speed and the headwind. (i.e. the Apparent wind).

One of the surprising results of this experiment was that it showed the Wind Wing's structure to be particularly aerodynamically robust: A foamboard and paper model 18-inches high withstanding and continuing to operate in apparent wind speeds in excess of 50 MPH, 20 MPH beyond where every widely known wind turbine begins to self protect itself by furling its blades, and 10 to 15 MPH beyond where all but the largest and most sophisticated turbines have already shut down. It also happened that during a trial run before the camera was mounted and recording begun, the inadequately secured Wind Wing model blew off the top of the car and went bouncing down the runway. When it was recovered, it was found to have suffered no noticeable damage and was functioning perfectly.

In the Fall of 2012 an effort was made to have further development of the Wind Wing taken over by the National Renewable Energy Laboratory (NREL) an arm of the Department of Energy. The offer was rejected on the basis that such was not within the NREL's charter, but with the benefit that the Director of the NREL suggested that inventor's further development focus on how the Wind Wing might perform burdened with a load, and that the inventor file a US Patent Application.

Following rejection by the NREL and partially on the basis of its recommendation, in December 2012 the inventor applied for a US patent on the Wind Wing apparatus. In October 2013, a USPTO Office Action dictated this Application be divided, leading to two Applications, one resulting in the US Patent for the Wind Wing (U.S. Pat. No. 8,734,084) and the other a US Patent (U.S. Pat. No. 8,860,240) for the Wind Wing Electrical Generator.

While awaiting action on these Patent Applications, the inventor, following the recommendation of the Director of the NREL to focus on the Wind Wing's ability to carry "a load" engineered the Torsional transfer mechanism, which was included in the Aug. 20, 2014 Provisional Patent Application (62/038,493) and is one of the Claims of this Application.

The Torsional transfer mechanism recognizes the burden of "a load" is disproportionately inhibiting when the Oscillating wing is amidships and Static pressures of air flowing over each of its sides are nearly equal. It unburdens the Oscillating wing from whatever "load" it is connected to (in this instance, the coils of the Armstrong generator) until the Oscillating wing is oscillating beyond a threshold arc where the difference in Static pressure is sufficient to overcome the burden of the inertia of the "load."

In late 2013, the inventor found on the Internet a paper be two faculty members of the Georgia Institute of Technology School of Aerospace Engineering analyzing another oscillating wing power device, the Wind Fin, concluding, among other things, "Equally sized WFs [Wind Fins] and HAWTs {Horizontal Access Wind Turbines] provide comparable output power. Until he read this, the inventor believed the Wind Wing was capable of producing no more than considerably less than a well engineered wind turbine, especially a Horizontal Access Wind Turbine (HAWT). generally recognized to produce more power than a Vertical Access Wind Turbine (VAWT). Inasmuch as the inventor believed, and still does that the Wind Wing is a stronger, more reliable, less expensive and more efficient design than a Wind Fin for converting wind energy into electrical energy, this opened the potential for it to become a commercial machine and perhaps most importantly a effective and highly deployable weapon in the United States' battle against global warming.

It is a physical characteristic of higher speed winds that they contain more kinetic energy than lower speed winds. In fact, the kinetic energy of the wind is proportional to its velocity cubed. It is also generally accepted that in most locations wind speeds increase with elevation above the ground, the result of ground features (trees, buildings, etc., even the surface of calm water) exerting friction on the wind. The proven (from car testing) ability of the Wind Wing to operate in apparent wind speeds higher than tolerated by turbines suggested it will be a better alternative to wind turbines in many situations simply by positioning it higher in wind speeds where they are unable to function. The ability of the Torsional transfer mechanism to allow it to drive heavier coil loads encourages this perspective. Two new inventions, both included in the Claims of this Application advance it.

The first of these is what the inventor named the Yeager wing in honor of Chuck Yeager, the man who first broke the sound barrier. It is a collapsible Oscillating wing which, when fully collapsed, allows the Oscillating wing to, along with the Wind Wing's Forward and Aft nacelles, assume a form aerodynamically indistinguishable from the NACA 4-digit streamlined symmetrical airfoil from which they were originally configured.

NACA 4-digit airfoils were originally published in 1929-1933 by the National Advisory Committee on Aeronautics, (NACA) the predecessor agency to NASA. These airfoils suffer remarkably little drag (Coefficients of Drag in the range of 0.05 versus that of bare poles whose range is approximately 0.45) allowing wind to pass around and through Wind Wings with very little loss of speed and kinetic energy. Presenting three NACA 4-digit streamlined symmetrical airfoils (each nearly the height of the Wind Wing) means that a Wind Wing can stand up in the face of extraordinarily powerful winds without damage.

It also opened the possibility of the Wind Wing not only being able to avoid furling and shutting down in wind speeds where a turbine would be required to do so, but being able to convert wind energy into mechanical energy in even higher wind speeds by just partially collapsing. Facilities to test the limits of this are beyond the access of the inventor. but there is no reason to believe that the Wind Wing might not be able to convert wind energy into mechanical energy in speeds in excess of 60 MPH and beyond—except that no generator thus far invented appears capable of withstanding the shock of oscillating motion such speeds would produce.

To control the opening and closing of the Yeager wing, the inventor engineered a programmable proportional controller for which he filed a Provisional Patent Application, No. 62/184,438 on Jun. 25, 2015.

The Programmable proportional control mechanism uses the Yeager wing's oscillating motion's centrifugal force to drive outward a weight hinge connected to two arms which are themselves connected to the collapsible sides of the Yeager wing. As the Yeager wing oscillates more rapidly in response to higher speed winds, its oscillating rotational speed increases, increasing the centrifugal force on this hinge driving it further outward and closing the collapsible sides of the Yeager wing. This closing force is resisted by an elliptical spring increasingly forcing the collapsible sides of the Yeager wing toward opening as it closes. Eventually equilibrium is reached so that there is a degree of closure for each wind speed. This degree of closure is also partially determined by a program bar allowing the equilibrium point for each wind speed to be programmed by the user, and with the program bar interchangeable, different programs matched to different local environments.

This capability allows the degree of closure of the Yeager wing to be optimized to a range of local conditions which themselves might change depending upon the time of the year. For example, in the summer there might be less but more steady wind. While in the Winter, the wind might be stronger. And in the Spring and in the Fall there might be more gusty wind than otherwise. Most importantly, where wind speeds are such that they would cause any component to fail, the Programmable proportional control mechanism can close the Yeager wing so that it no longer oscillates and presents what are essentially NACA 4-digit streamlined symmetrical airfoils to the wind.

Shortly after the Torsional transfer mechanism with its capacity to accommodate a greater "load' was engineered, there appeared another natural evolution of the Patented Wind Wing (U.S. Pat. No. 8,860,864) Electrical Generator, here named the Armstrong Electrical Generator (or simply the "Armstrong generator"), in honor of Neil Armstrong, one of the inventor's heroes. The Armstrong generator takes the Dipole Permanent Magnet Assembly, DPMA, from the Wind Wing Electrical Generator, increases it by a factor of 4 mounting them symmetrically around a Mast that elevates the Oscillating wing or Yeager wing high enough above the ground to take advantage of the higher speed winds there present. It also employs two coils rather than the Wind Wing Electrical Generator's one coil, wrapping them also symmetrically around the Mast and taking advantage of greater coil mass allowed by the Torsional transfer mechanism. The Armstrong generator is included in one of the Claims of this Application.

Over time, the inventor was able to recognize what actually occurs in the Windraider process and how to control it, something also included in the Claims to this Application. Remarkably, and as will be explained with the assistance of the DRAWINGS, the Windraider process operates on nearly an infinite number of points along the side of the Oscillating wing which are constantly changing as the Oscillating wing oscillates, extracting energy from the air flow, which slows the air flow increasing its Static pressure, and thus maintaining the force rotating the Oscillating wing. This very rapidly increases until the extraction reaches the Betz Limit of 59.3% which, because the Oscillating wing is extracting energy from only one channel at a time means machine extracts 29.6% of the wind of the surface it faces.

29.6% does not immediately appear a high extraction rate in that the best wind turbines claim nearly twice as much. But up to now the context of almost all such comparisons are turbine v. turbine where the biggest differentiators are blades, how they perform as airfoils, the material they are made of and the engineering that determines their length and taper in an attempt to optimize the conflict created by more strength demanding more material, which creates more destructive forces which require more strength. Windraider is different. While there is a cost to increasing size, it follows, as will soon be evident, an entirely different paradigm, allowing it to be shockingly less expensive and far more reliable than a turbine. It is also not dangerous to humans (no danger of blades flying off) nor to birds or nor to other creatures, not noisy and not unattractive.

Perhaps most importantly, the Wind Wing is uncannily deployable. Almost any body shop should be capable of fabricating one in a few days. This means that should the global warming situation become significantly more acute, something there is every reason to believe is likely to occur, the United States can deploy them in tens if not hundreds of thousands in a matter of months. To the extent these devices fulfill their promise of providing half of the Average American Home's electricity needs it could reduce the Country's dependence on fossil fuels by as much as 30% and very possibly more.

It has been a long developing intention of the inventor that Governments. NGOs, corporations and others build web sites providing location-sensitive recommendations toward the construction of $20 Models, taking into account the respective environmental situations, most suitable materials, specific dimensions and fabrication guidelines so as to optimize $20 Models in some, if not all of the areas of the world where they can improve the lives of local impoverished communities. Such a development could be extended to include Tower Models as well. It is his hope that this will someday be the final development in the invention of Windraider.

BRIEF SUMMARY OF THE INVENTION

Windraider is a process and a series of machines that convert wind energy into electrical energy. The inventor has named these machines "Wind Wings" because they extract Kinetic energy from the Wind using vertical wings. He has also named the process by which they do so, the "Windraider process" because raiding the wind of some of its kinetic energy is what it does.

While features allow configuration of uncountable different models, there are two classes which most represent the two objectives which directed the inventions and that are the subjects of the Claims of this Application The first class, named "$20 Models" had, and still has as its objective allowing poor communities around the world, using whatever wind is available, whatever local materials can be economically acquired, or might be donated, their own ingenuity and their own fabrication capabilities to construct machines which will provide them with as much wind generated electricity as is practical. It is and will remain the position of the inventor that these communities have free access to the intellectual property claimed herein to construct Wind Wings for themselves and their neighbors.

The second class named the "Tower Models," taking advantage of better materials and fabrication capabilities, a number of enhancements, some being introduced here, and the higher speed winds available at higher elevations, appear capable of elsewhere substantially improving the economic competitiveness of electricity from the wind against that from carbon gas producing sources such as kerosene, coal, oil, and natural gas; reducing the cost of electricity as well as these sources' contributions to pollution, global warming, facilities for production, supporting transportation and transmission systems, related accidents and blight. It may also be that their and their derivatives' most important contribution will that they are capable of producing enough electricity economically and ergonomically and that they can fabricated and deployed sufficiently quickly in sufficiently large numbers as to have a serious impact in halting global warming. For example, the inventor believes that economically-justified deployment of Wing Wings is capable of reducing US home electricity dependence on fossil fuels by 30% in two years.

BRIEF DESCRIPTION OF THE SEVERAL VIEWS OF THE DRAWINGS

The DRAWINGS are intended to show the Windraider process; and the Wind Wing apparatus, its components, certain design and construction aids, and air flows, forces and motions, the latter three as block arrows in the directions they take place as then being discussed. Collectively, they will allow most craftsperson to construct Wind Wings of reasonable size using materials capable of performing the same functions as similar airplane elements of the same size, assuming such material possesses the same physical characteristics in terms of strength, reliability and workability. As will become apparent, the principal difference between an airplane and a Wind Wing, beyond the fact that a Wind Wing does not fly, is that an airplane moves through wind, whereas with a Wind Wing, wind moves through it.

Numbering follows a convention intended to provide both speed of recognition, and specificity. With few exceptions, drawing item numbers will indicate a more specific manifestation on of the referred-to item by extensions to the right (i.e. "29.", "29a.", "29a1."). Drawing items will further be italicized, and followed by a period. Where practical, these extensions will attempt to communicate a direction or location (i.e. "29s" indicating a starboard location or direction, "29p" its port side alternative). Air flows themselves will shown as block arrows, the length of such arrows indicative of the air flow velocity, while their thickness is indicative of their relative volume.

Following is a drawing item index:
1. Floor
   1a. $20 Model Floor
   1b. Tower Model Floor
      1b1. Key clearance
2. Starboard outside airfoil
3. Port outside airfoil
4. Roof
5. Mast
6. Forward nacelle
7. Oscillating wing
   7a. $20 Model Oscillating wing
   7b. Tower Model Oscillating wing
8. Aft nacelle
   8a. $20 Model Aft nacelle
      8a1 Outside permanent magnet array holder notch
   8b. Tower Model Aft nacelle
   8c. Aft most corner of the Aft nacelle
9. Air flows
   9s. Starboard channel airflow
      9sbu. Backed up starboard channel airflow
      9sn. Normal speed starboard channel airflow
      9sh. Higher speed starboard channel airflow
      9svh. Very high speed starboard channel airflow
      9se. Eddies in starboard channel
   9p. Port channel airflow
      9pn. Normal speed port channel airflow
      9ph. Higher speed port channel airflow
      9s. Slowing down airflow
10. Static pressure
    10s. Static pressure on the starboard side of the Oscillating wing
    10p. Static pressure on the port side of the Oscillating wing
11. Rotation of the Oscillating wing
    11s. Rotation of the Oscillating wing to starboard
    11p. Rotation of the Oscillating wing to port
12. Horizontal Access Wind Turbine (HAWT)
13. 59.3% of the Wind's Kinetic energy, the Betz Limit
14. Wind (Freestream)
    14s. Slowed down wind (having lost 59.3% of its Kinetic energy)
    14d. Diverted wind
15. NACA 0020 or a similar airfoil
16. NACA 0030 or a similar airfoil
17. Midpoint between the widest points of the airfoil
18. Aft most point on the airfoil identified as (17.) above
19. Smaller design circle
20. Larger design circle
21. Forward air gap
22. Aft air gap
23. Yeager wing
    23s. Yeager wing starboard element
       23sf. Starboard element frame
    23p. Yeager wing port element
       23pf Port element frame
    23ess. Extender spring support ribs
24. Skin
25. Extender spring
    25a. Extender spring extended
    25b. Extender spring partially compressed
    25c. Extender spring fully compressed
26. Programmable Proportional Control Mechanism, "PPCM"
    26a. PPCM arm
       26a1. PPCM arm-computer connection point
       26a2. PPCM arm roller connection point
       26a3. PPCM arm-frame connection point
       26a4. PPCM arm roller connection bar
       26a5. PPCM arm roller
       26a6. PPCM arm roller connection bar guide
    26b. PPCM computer 26b1. PPCM computer case
26c. PPCM program bar
  26c1. PPCM program bar alignment track
  26c2. PPCM program bar holder screw connection
26d. PPCM program bar holder (rotating fastener)
26e. Swivel fastener
26q. Angle of openness of the Yeager wing
26r. Relative distance between the PPCM computer and the Mast
26t. Arc of rotation of the PPCM wing element connection points
26v. Path of a PPCM arm computer connection points
27. Brake
  27a. Brake mass
  27b. Brake rotor
  27c. Brake activation spring
28. Torsional transfer mechanism, "TTM"
  28kp. Key plate
  28k. Key
  28p. Slot plate
  28t. Slot
  28sn. Springs
  28sofc. Mast clearance
29. Armstrong electrical generator
  29a. Torque transmitter/Generator cover
  29b. Dipole Permanent Magnet Assembly, "DPMA"
    29b1. Magnets with their poles aligned
    29b2. Inner support cylinder
  29c. Coils
    29co. Underlaid coil
    29cu. Overlaid coil
  29d. Coil transport
    29d1. Top coil transport
    29d2. Bottom coil transport
  29te. Torque transmitter/transport attachment
30. Inner support cylinder
31. Wiggler
  31a. Rack
    31a1. Missing teeth
  31b. Pinion

FIG. 3 (b.) is a top down view of a Wind Wing Tower Model with its Roof removed which illustrates parts of its Floor, Starboard outside airfoil, Port outside airfoil, Mast, Forward nacelle, Oscillating wing and Aft nacelle.

FIG. 4 (b). illustrates the maximum traverse of the Oscillating wing in the port direction.

FIG. 13 (b.) shows how by taking the section intended toward becoming the outline of the Oscillation wing, copying it, rotating the copy around the mast, an combining them, the outline of the Oscillating wing can be arrived at.

FIG. 13 (c.) shows how corners of the Forward nacelle, Oscillating wing and Aft nacelle should be rounded off to avoid immediate buildup of eddies.

FIG. 14 (b.) is a top-down view of a Wind Wing with its Roof removed which illustrates parts of its Floor, Starboard outside airfoil, Port outside airfoil, Mast, Forward nacelle, Aft nacelle, and a fully closed Yeager wing as its Oscillating wing.

FIG. 15 (b.) is a top-down view of a Wind Wing with its Roof removed showing Yeager wing opened to the maximum allowed before it is limited by the corners of the Forward nacelle.

FIG. 19 (*b.*) is a top down view of the major assemblies of the PPCM and the frames of the Yeager wing to which they are attached when the Yeager wing is half open.

FIG. 19 (*c.*) is a top down view of the major assemblies of the PPCM and the frames of the Yeager wing to which they are attached when the Yeager wing is completely closed.

FIG. 25 (*b.*) provides the contrast recognized in Paragraphs 0071 and 0073

FIG. 26 (*b.*) shows the inside of the PPCM computer from aft of it.

FIG. 26 (*c.*) provides a top down view of the inside of the PPCM computer when the Oscillating wing is oscillating and centrifugal force is forcing the Brake mass outward, thus keeping the Brake from engaging.

FIG. 26 (*d.*) provides a top down view of the inside of the PPCM computer when the Oscillating wing's oscillations, at the end of a traverse, are stopped or sufficiently slowed down such that there is insufficient centrifugal force to keep the Brake mass outward and the Brake activation springs force it inward, activating the Brake.

FIG. 27 (*b.*) is a top down view of the Key plate.

FIG. 27 (*c.*) is a top down view of the Slot plate.

FIG. 28 (*b.*) is a side view of the Upper slip-on flange.

FIG. 28 (*c.*) is a perspective view of the Upper slip-on flange.

FIG. 28 (*d.*) is a side view showing the Key of the Key plate frame extending into the Slot of the Slot plate where it is permitted a limited amount of "wiggle room" before it engages one of the Springs at the ends of the Slot.

FIG. 36 (*b.*) shows the flux field of two compound magnets each comprised of four bar magnets all having their north and south poles oriented in the same direction, with the magnets stacked in groups of two and with the pole of one group positioned near the opposite poles of the other group.

FIG. 36 (*c.*) shows a Dipole permanent magnet assembly providing a lower than air resistance path (for flux between the outside poles of the compound magnets) over coil wraps that might pass between their inside poles, avoiding having the effect of the flux flowing between the nearby poles cancelled by flux flowing in the reverse direction between their outside poles.

FIG. 40 (*a*.) is a top view of the Armstrong generator with its Coil transports and its Coils rotated such that the angular midpoint of the latter's' side wrappings are lined up with the magnetic gaps of the DPMAs they pass through.

FIG. 40 (*b*.) is a top view of the Armstrong generator with its Coil transports and its Coils rotated approximately 30-degrees counterclockwise.

FIG. 41 (*b*.) is a side view the Armstrong generator without the Coils and the Torque transmitter/Generator cover and with its Coil transports rotated approximately 20-degrees counterclockwise.

FIG. 42 (*b*.) is top down view of the Wiggler with a zero degree of rotation.

FIG. 42 (*c*.) is a top down view of the Wiggler with the Oscillating wing rotated to starboard by an angle A', where, with an increase of wind speed, oscillations have grown to where they are generating sufficient torque to carry the load of its Coil.

FIG. 42 (*d*.) is top down view of the Wiggler with the Oscillating wing rotated to starboard by an angle B', where, having reached the limit of its rotation, it is about to begin rotating in the opposite direction and will benefit from the temporary unburdening of the load of its Coil.

DETAILED DESCRIPTION OF THE INVENTION

Figure 1:
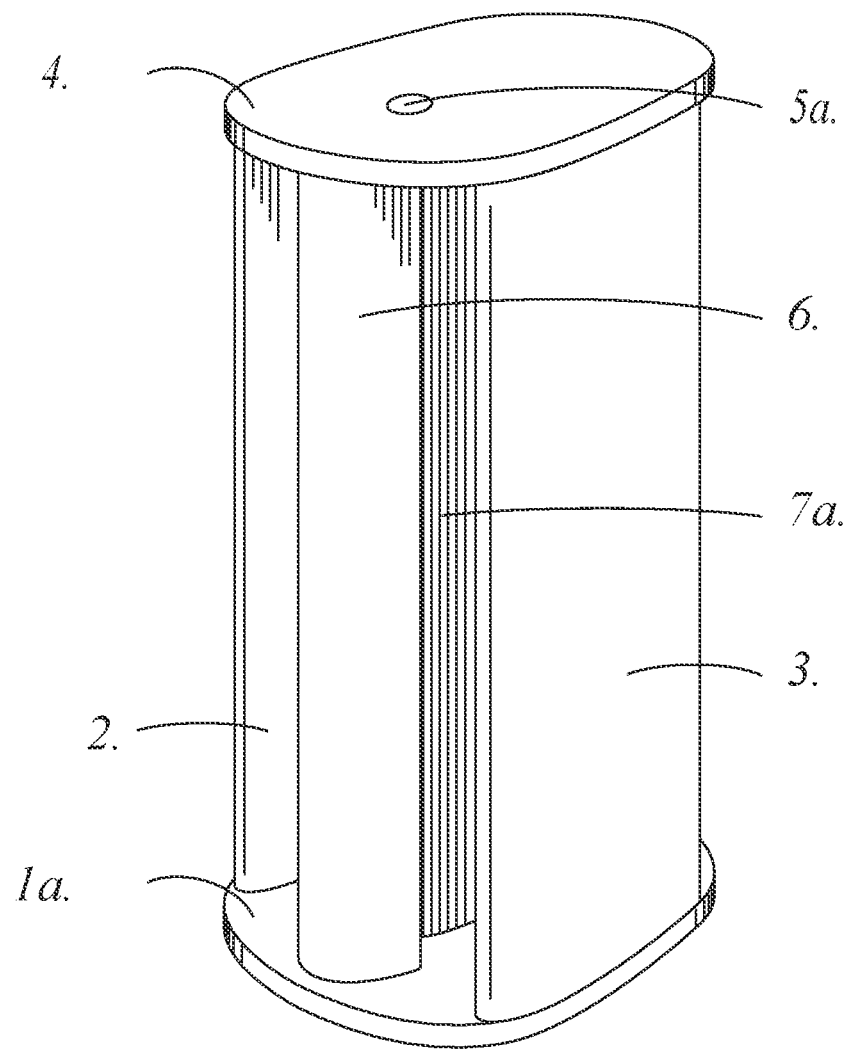
FIG. 1 is a perspective view of the outside of a Wind Wing $20 Model forward of, port of, and slightly above it, which illustrates parts of its Floor, Starboard outside airfoil, Port outside airfoil, Roof, Mast, Forward nacelle and Oscillating wing.

FIG. 1 is a perspective view of the outside of a Wind Wing $20 Model forward, port of, and slightly above it, which illustrates parts of its Floor (1*a*.), Starboard outside airfoil (2.), Port outside airfoil (3.), Roof (4.), Mast (5.), Forward nacelle (6.) and Oscillating wing (7*a*.).

Figure 2:
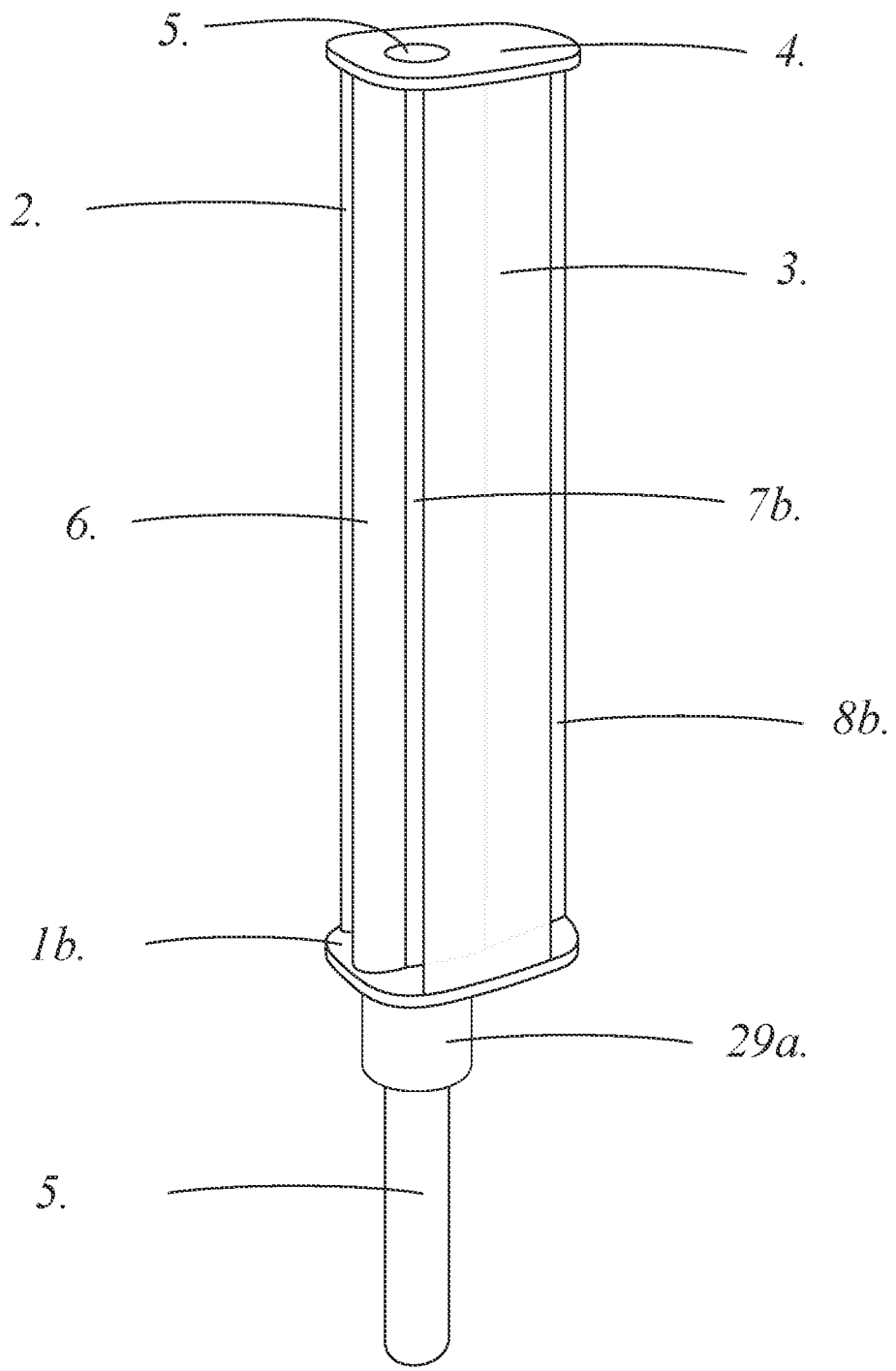
FIG. 2 is a perspective view of the outside of a Wind Wing lower Model forward of, port of, and slightly above it, which illustrates parts of its Floor, Starboard outside airfoil, Port outside airfoil, Roof, Mast, Forward nacelle, Oscillating wing, and Generator Cover.

FIG. 2 REPLACEMENT is a perspective view of the outside of a Wind Wing Tower Model forward, port of, and slightly above it, which illustrates parts of its Floor (1*b*.), Starboard outside airfoil (2.), Port outside airfoil (3.), Roof (4.), Mast (5.), Forward nacelle (6.), Oscillating wing (7*b*.) and Torque transmitter/Generator cover (29*a*).

Figure 3:
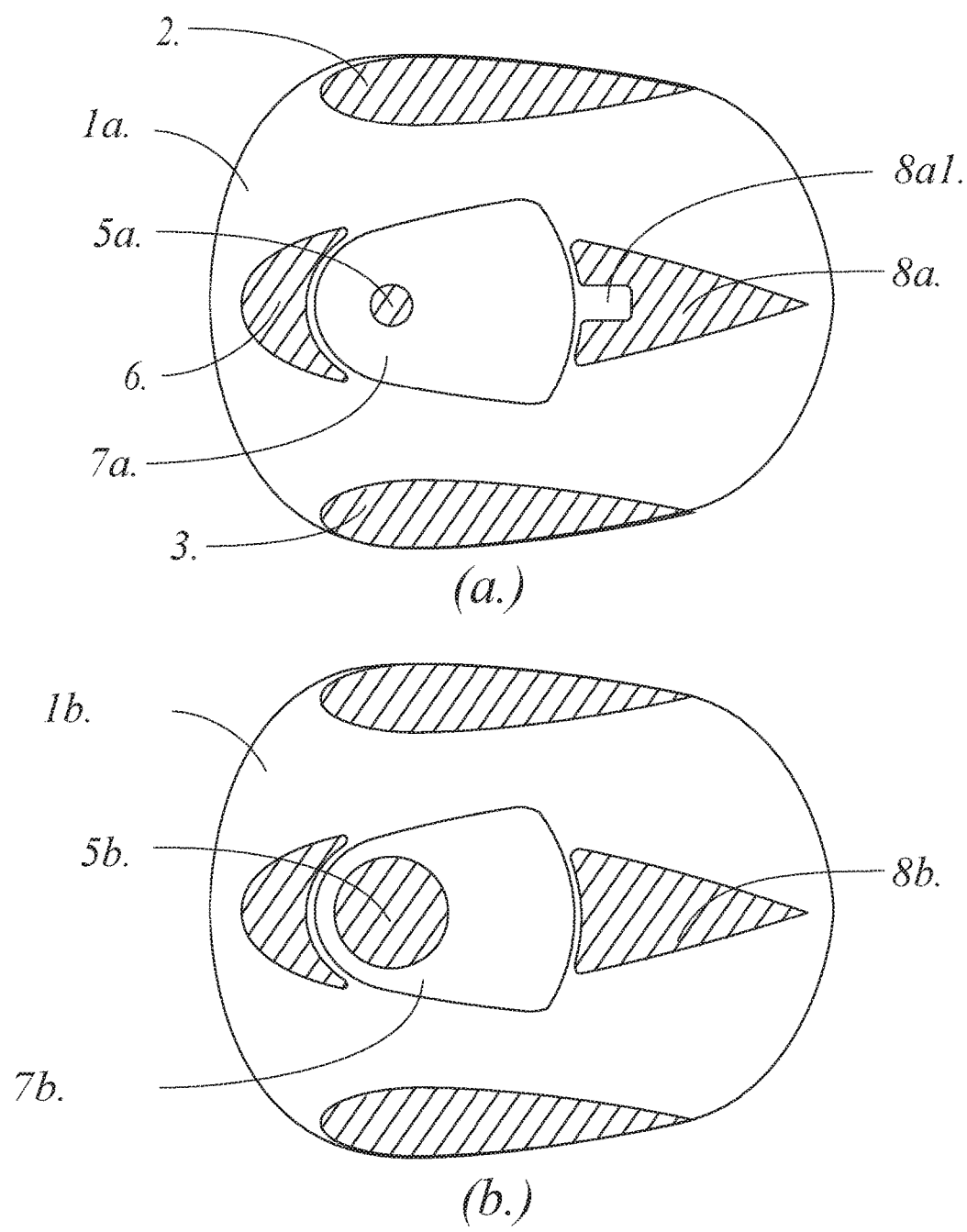
FIG. 3 (a.) is a top down view of a Wind Wing $20 Model with its Roof removed which illustrates parts of its Floor, Starboard outside airfoil, Port outside airfoil, Mast, Forward nacelle, Oscillating wing, Aft nacelle, and Outside permanent magnet array holder notch.

FIG. 3 (*a*.) is a top down view of a Wind Wing $20 Model with its Roof (4.) removed which illustrates parts of its Floor (1*a*.), Starboard outside airfoil (2.), Port outside airfoil (3.), Mast (5.), Forward nacelle (6.), Oscillating wing (7*a*.) and Aft nacelle (8*a*.), Outside permanent magnet array holder notch (8*a*.1.)

FIG. 3*b* is a top down view of a Wind Wing Tower Model with its Roof (4.) removed which illustrates parts of its Floor (1*b*.), Starboard outside airfoil (2.), Port outside airfoil (3.), Mast (5.), Forward nacelle (6.), Oscillating wing (7*b*.) and Aft nacelle (8*b*.)

FIG. 3*a* and FIG. 3*b* show that, with the $20 Model Oscillating wing (7*a*.) and the Tower Model Oscillating wing (7*b*.) both in an amidships position there is no difference in the paths each provides for air flowing through them. Each provides two airflow channels: one between the Starboard airfoil (2.) on its starboard side, and the Forward nacelle (6.), Oscillating wing (7.) and the Aft nacelle (8.) on its port side, hereafter referred to as the "Starboard air flow channel;" the other between the Forward nacelle (6.), Oscillating wing (7.) and the Aft nacelle (8.) on its Starboard side, and the Port outside airfoil, (3.) on its Port side, hereafter referred to a the "Port air flow channel."

Figure 4:
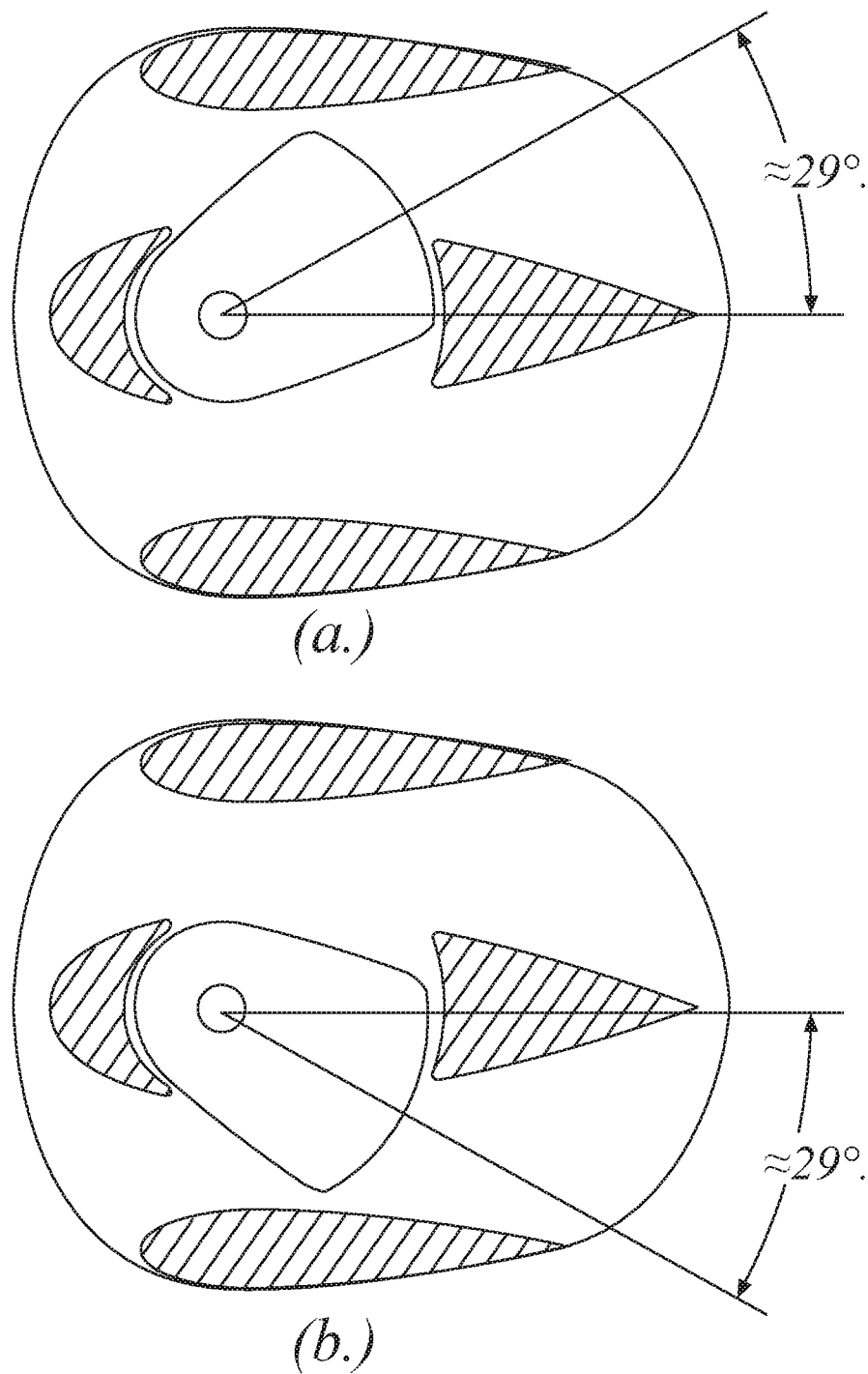
FIG. 4 (a.) illustrates the maximum traverse of the Oscillating wing in the starboard direction.

FIG. 4*a* and FIG. 4*b* illustrate the maximum traverse of the Oscillating wing (7.) in the Starboard and Port directions respectively, insensitive to whether the Oscillating wing is a $20 Model or a Tower Model. It shows that the maximum traverse in either direction is approximately 29 degrees off center.

Figure 5:
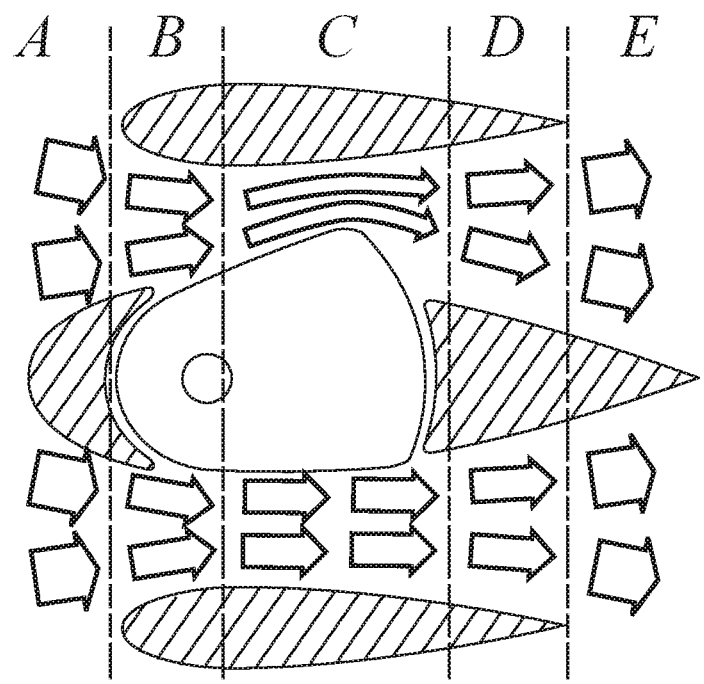
FIG. 5 illustrates the air flows through the Starboard and Port channels when the Oscillating wing is rotated to half of its maximum starboard traverse.

FIG. 5 illustrates the air flows through the Starboard and Port channels when the Oscillating wing is rotated only half of its maximum starboard traverse, 14.5 degrees off center in the starboard direction (starboard and port traverses being approximately 29 degrees each, a full traverse being approximately 59 degrees). It also divides the Starboard and Port Channels into 5 Zones, A, B, C, D, and E and illustrates the nature of the air lows through each with block arrows—longer arrows indicating higher air velocities.

It can be appreciated that with the bow of the Wind Wing pointed into the wind air flow velocity in Zone A is essentially the then current wind speed, sometimes referred to as the "Freestream."

However as air flows into Zone B, where the sides of the channels are contracted, and its flow area A is decreased, it becomes subject to the Continuity Equation which increases its velocity, v:

$$A_1 v_1 = A_2 v_2 \quad [1]$$

In this case $$A_{Zone\ A} v_{Zone\ A} = A_{Zone\ B} v_{Zone\ B} \quad [2]$$

So that notwithstanding anything else, the airflow velocities in the Starboard and Port Channels increase in Zone B. Thus the appearance in FIG. 5 of longer arrows in the Zone Bs of the channels, than appear in their Zone As.

During this and subsequent developments, an important construct element comes into play. The two outside airfoils, the Starboard outside airfoil (2.) and the Port outside airfoil (3.) are both NACA 4-digit streamlined symmetrical airfoils. So too is the airfoil from which the Forward nacelle (6.), the Oscillating wing (7.), and the Aft nacelle (8.) are all constructed. These airfoil shapes create remarkably little drag, approximately ⅕th that of a bare pole. This lack of drag allows air flowing through the Wind Wing, unless impeded by the extraction of some of its kinetic energy, to suffer very little loss of velocity.

As air flows from Zone B into and through Zone C, there is a very distinct difference between what occurs in the Port channel and what occurs in the Starboard channel. Air flowing through the Port channel in Zone C, flows at almost the same velocity as it had flowing through Zone B of the same channel. But air flowing through Zone C of the Starboard channel is very much speeded up—thus the much longer arrows indicating much higher velocities. This increase in velocity again being the result of application of the Continuity Equation to the much narrower area A in its Zone C than in its Zone B.

Wherever there is a flow of fluid a key behavior determinant is Bernoulli's Principle or Bernoulli's Equation. It can be stated in many different ways, the following appearing most appropriate to what has just been recognized as occurring in Zone C.

$$\underset{\substack{\text{Static} \\ \text{pressure}}}{P} + \underset{\substack{\text{Dynamic} \\ \text{Pressure}}}{\frac{1}{2}\rho v^2} = const$$

What can be seen here is that in order to maintain the constant in Bernoulli's Equation ("const"), an increase in local velocity, v, has to be a offset by a decrease in Static pressure, P. To go beyond this, is both complicated and unnecessary. The essential recognition is that an increase air flow velocity through Zone C (the result of the Starboard channel severely constraining the area for air flowing through it), results in a decrease in the local Static pressure.

Figure 6:
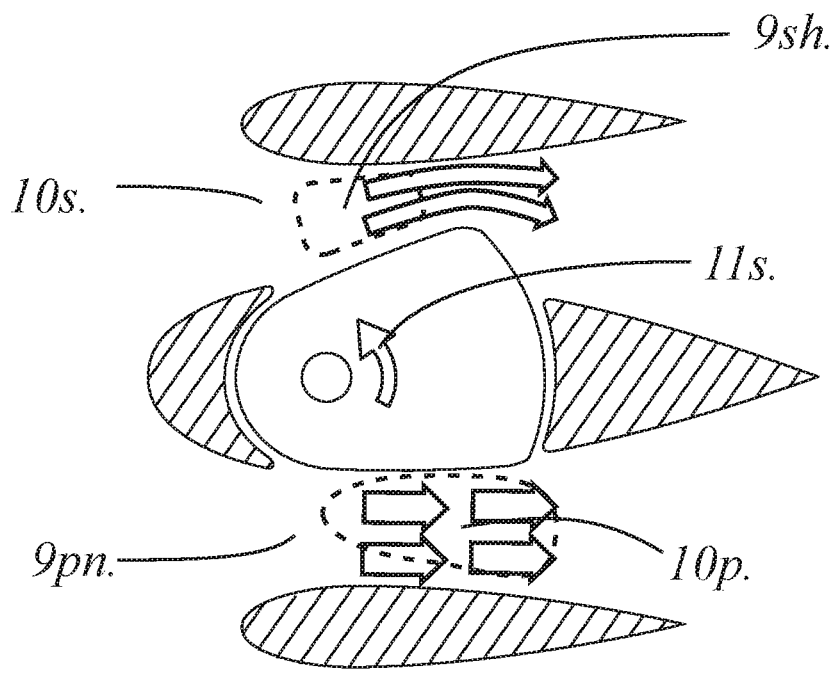
FIG. 6 is drawing showing just the air flows adjacent to the Oscillating wing when the Oscillating wing is rotated to half of its maximum starboard traverse.

FIG. 6 excludes all of the airflows that are balanced by identical or near identical airflows in the other channel—those in Zones A, B, D, and E. What remains are the High velocity airflow (9sh.) in the Starboard channel adjacent to the Oscillating wing (7.), and the Normal velocity airflow (9pn.) in the Port channel adjacent to the Oscillating wing (7.). Following Bernoulli's Equation, Static pressures in the section of the Starboard channel adjacent to Oscillating wing (10s.) are consequently lower than the Static pressure in Port channel adjacent to Oscillating wing (10p). The result of this Static pressure imbalance is that most of the Oscillating wing (7.) is forced toward rotating in the Starboard direction (11s).

Figure 7:
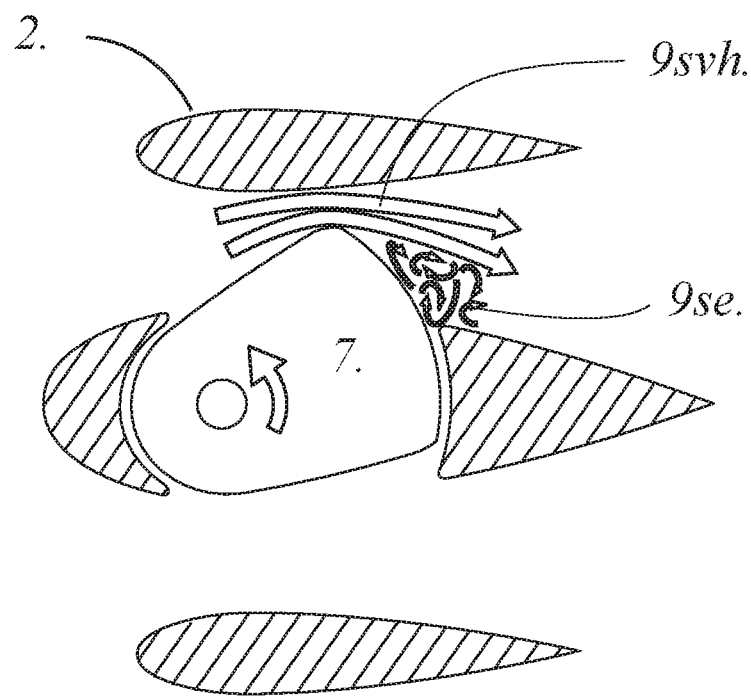
FIG. 7 is a drawing showing just the airflows in the Starboard channel, and the build-up of eddies just aft of the Oscillating wing's impinging corner.

FIG. 7 shows that as Oscillating wing (7.) rotates toward the Starboard outside airfoil (2.), the area through which the air is flowing between them, becomes smaller and smaller, resulting in a Very high velocity air flow (9svh.), thus the very long air flow arrows. Another result, this one in large part the result of the Starboard aft corner of the Oscillating wing (7.) cutting into this Very high velocity starboard channel air flow (9svh.), is the buildup of Eddies (9se.) just aft of impinging corner.

Very quickly as the Oscillating wing (7.) approaches the limit of its traverse this build ups of Eddies (9se.) clog the path of the Very high velocity starboard channel air flow (9svh.), which then backs up the air flow (9sb.) forward of the Starboard aft corner of the Oscillating wing (7.), decreasing its velocity and, again according to Bernoulli's Equation, almost instantaneously increasing Static pressure on the nearby (starboard) side of the Oscillating wing (10s.).

Figure 8:
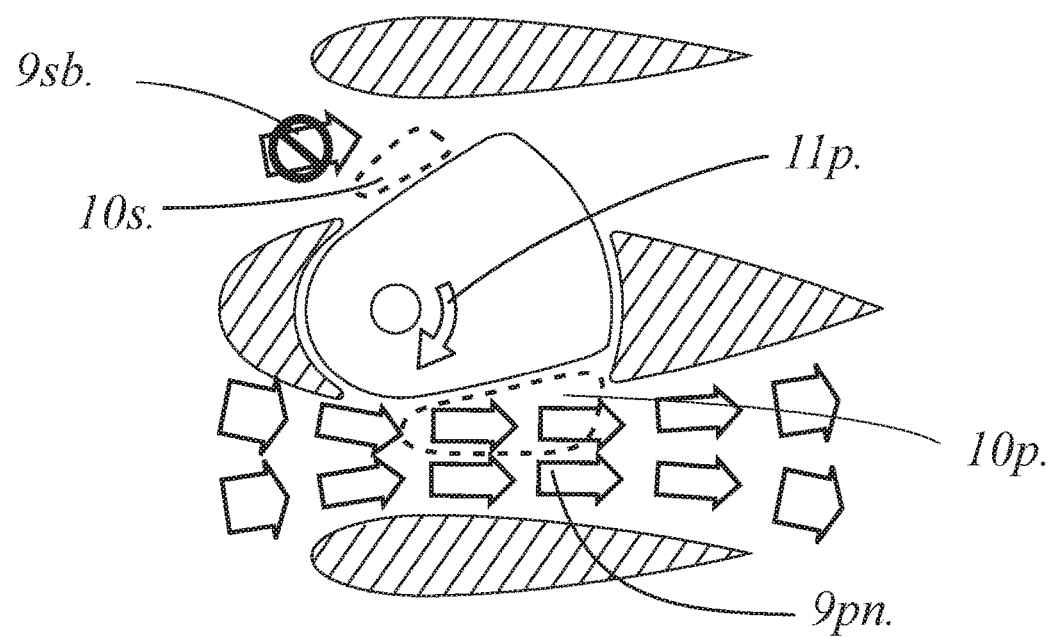
FIG. 8 is a drawing contrasting the near stoppage of air flow in the Starboard channel while the air flow in the Port channel is flowing virtually unimpeded.

FIG. 8 illustrates that with the Starboard channel air flow suddenly backed up (9sbu.), and its local Static pressure (10s.) suddenly increased, and with the Port side air flow (9pn.) continuing unabated past the Port side of the Oscillating wing (7.), and feeling its own Bernoulli Equation effect in reducing its local Static pressure (10p.), the pressure imbalance that had been forcing the Oscillating wing (7.) to rotate to Starboard (FIGS. 6-11s.) now suddenly forces it to rotate to Port (FIGS. 8-11p).

Expectedly, the Oscillating wing would rotate only a few degrees to Port (11p.), before the Starboard channel airflow would reestablish its Very high speed (9svh.), resulting in the low local Static pressure (10s.) that it was maintaining just prior to this disturbance. Instead, where the physical construct is conducive, as it is in the Wind Wing, the Oscillating wing (7.) continues to traverse to its Port side limit (FIG. 4b) where the process of Eddie build up (9pe.), air flow interruption (9pb.), local Static pressure (10p.) increase, and suddenly reversed local Static pressure imbalance (10s. and 10p.) forcing movement in the opposite direction (in this instance 11s.) repeats.

What causes this unexpected phenomena, is surprisingly complex. It begins with recognition that when an air flow gives up Kinetic energy, it slows down. And when it gives up 59.3% of its Kinetic energy, it slows down to a degree it blocks the air following it. This is known as the Betz Limit, a phenomena familiar to turbine engineers who recognize that it prevents turbines (or any other machine for that matter) from extracting any more than 59.3% of Kinetic energy from the wind. One can find any number of mathematical derivations of the Betz Limit on the Internet.

Figure 9:
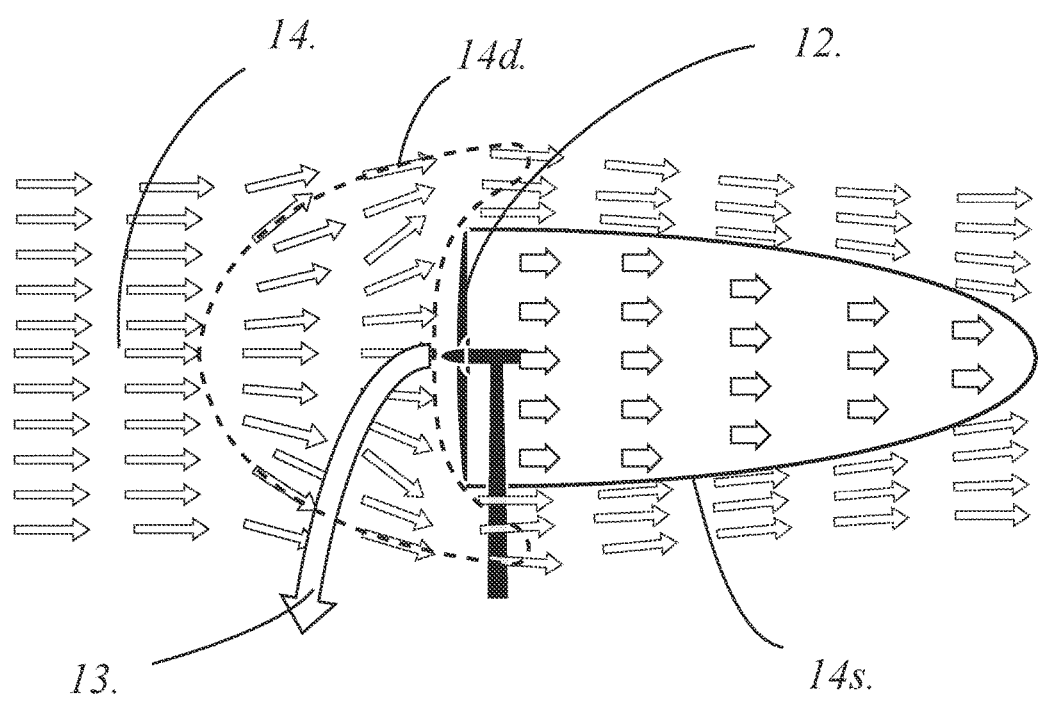
FIG. 9 is a drawing of the air flows through and around a Horizontal Access Wind Turbine when it extracting the Betz Limit of kinetic wind energy. with an arrow (13.) representing this extraction.

FIG. 9 however, illustrates the Betz Limit in a manner that most people can more easily appreciate. What it shows is a turbine (12.) extracting 59.3% (13.) of the wind's (14.) Kinetic energy, slowing it down (14s.) and blocking the following wind so it is diverted around the turbine (14d.).

When the Oscillating wing (7.) of the Wind Wing rotates, it is also extracting Kinetic energy from the air flow that is powering it. And as otherwise occurs in the case of wind turbines (12. as in, FIG. 9) this extraction also slows down the air flow from which it is being extracted.

Figure 10:
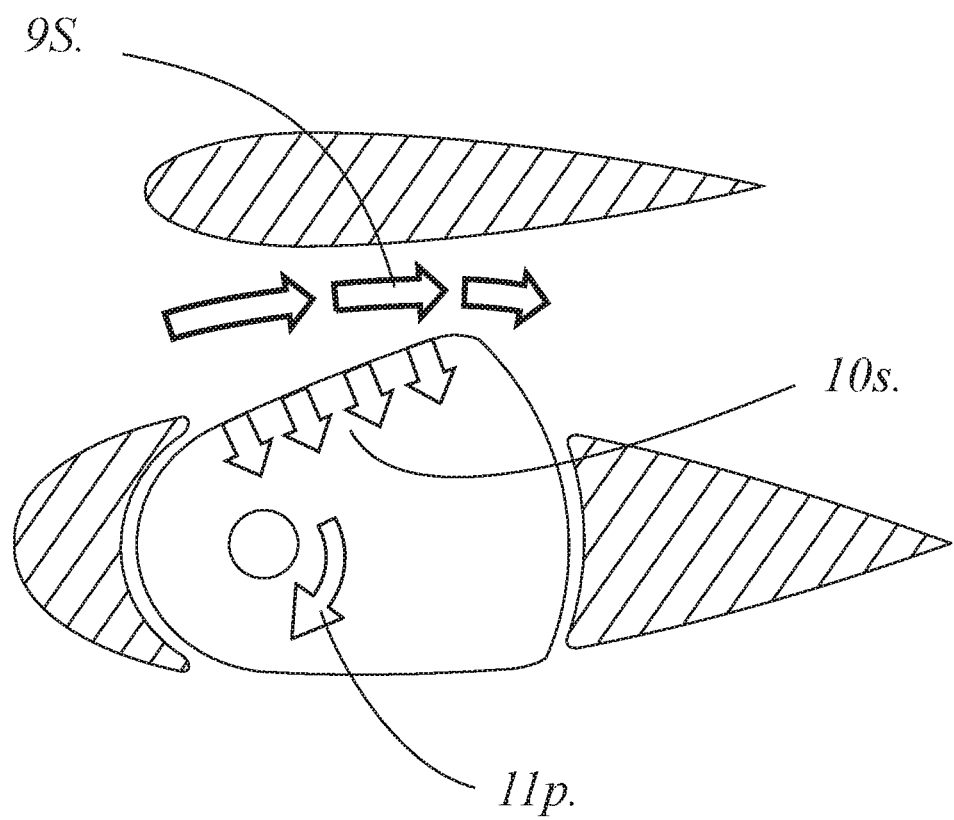
FIG. 10 is a drawing illustrating the extraction of kinetic wind energy from the Starboard channel air flow by the Oscillating wing rotating toward port, and the resulting slowing down of the Starboard channel air flow.

FIG. 10, which excludes the Port outside airfoil (3.) in order to show greater detail of developments in the Starboard channel, illustrates this development. It appears it may be worth highlighting that the effects on the air flows shown in FIG. 10 and FIG. 11, and discussed in Paragraphs 0129 through 0142 are additive to those illustrated in FIGS. 5 through 8 as discussed in Paragraphs 0113 through 0123. It may appear *trite* to equate that what the air flow is doing here is equivalent to walking while chewing gum. But so far nothing has come to mind that communicates what actually is occurring so economically FIG. 10 illustrates the Port rotation (11p.) of the Oscillating wing (7.) being powered by the local Static pressure on its Starboard side (10s). This pressure produces torque, which, multiplied by the speed of the rotation (10s or 10p), yields Power. The units (ft-lbs, RPMs, newton-meters, radians, etc.) are maddening for anyone not working with them frequently and will be dispensed with here, except to recognize that one measure of Power is the familiar term "watts." The essential recognition is that this rotation (11p.) powered by this Static pressure, (10s) itself sustained by this air flow slows down this airflow (9S.). And as recognized by Bernoulli's Equation [2.] slowing down an airflow, increases its Static pressure (10s).

At this point one is justified in asking whether this might be the action of a perpetual motion machine, pressure producing motion which produces more pressure which produces more motion. This answer is no. Additional power is constantly being pumped into the process by the air flow (9S.).

It can be appreciated from FIG. 10 that specific Static pressures (the constituents of 10s) at specific points along the Starboard side of the Oscillating wing are different. Moreover that the number of such points approaches infinity, and that this is before all the angles of rotation of the Oscillating wing (7.) are taken into account. Fortunately, the near impossible determination of all, or even a number of such values toward estimating the Power producing capability of the Wind Wing can be bypassed with recognition of what causes the Oscillating wing (7.) to behave as unexpectedly as reported earlier in Paragraph 0124.

Figure 11:
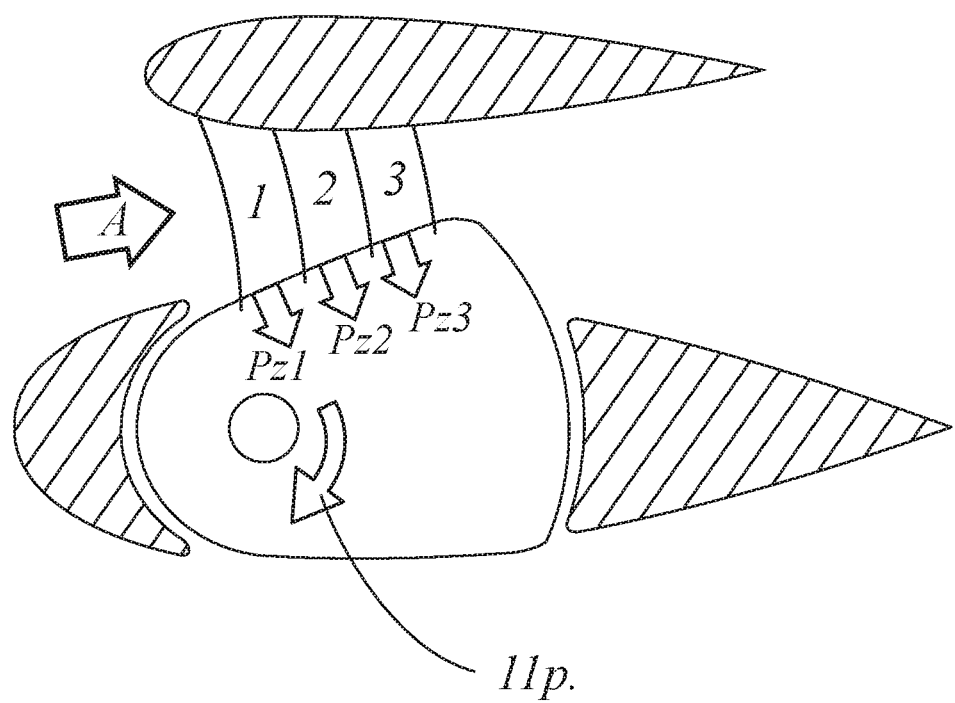
FIG. 11 is a drawing illustrating three arbitrary zones in the Starboard channel and Static pressures in each zone contributing to forcing the Oscillating wing to rotate toward port.

FIG. 11 arbitrarily divides the area between the Oscillating wing (7.) and the Starboard outside airfoil (2.) into three Zones numbering them 1, 2, and 3 fore to aft. Associated with each is a vector representing the Static pressure exerted by that zone, and labeled Pz1, Pz2 and Pz3. Also, that entering into Zone 1 is an air flow, "Air Flow A."

As Air Flow A passes through Zone 1 it exercises Static pressure through vector Pz1 toward rotating the Oscillating wing (7.) in the manner recognized by the rotation lip. It doesn't matter how much pressure (Pz1) or how far the rotation (11p.), as long as both are significant. This pressure produces torque, which multiplied by the rotation equals the Power transmitted into the section of the Oscillating wing (7.) delineated by Zone 1. This transfer of Power results in a reduction of the velocity of Air Flow A, entering into Zone 2. So that entering Zone 2, Air Flow A has less velocity, and respecting Bernoulli's Equation, higher Static Pressure, than it had entering Zone 1.

The same development occurs passing through Zone 2. The now slower moving and higher Static pressure Air Flow A flowing through Zone 2 exercises this Static pressure (Pz2) against the respective section of the Oscillating wing (7.) contributing to rotating it further (it had already rotated somewhat, no matter how little in response to Pz1) again in the manner of 11p, transferring more Power from Air Flow A, further reducing its velocity, and again, respecting Bernoulli's equation, further increasing its Static pressure. The same sequence of events occurs in Zone 3 as the now already twice slowed down and twice pressure-increased Air Flow A passes through it.

Among the observations available from FIG. 9, is that downwind air flow slowdowns are transmitted upwind. In the case of a turbine, before the downwind air flow reaches Betz Limit—where following wind diverts around it. The same thing happens in the Wind Wing. A downwind slowdown transmitted upwind, slows down the following air flow. A slowdown in an Airflow A leaving Zone 3 will be transmitted upstream to the air flow now entering Zone 1 slowing it down to the same velocity, and according to Bernoulli's Equation, increasing its Static pressure accordingly.

Having been slowed down to the velocity of the airflow leaving Zone 3, a new airflow entering Zone 1, with its Static pressure increased according to Bernoulli's Equation, goes through the same process of contributing to the rotation of the Oscillating wing in Zone 1, being (further) slowed down by this contribution, having its Static pressure (further) increased according to Bernoulli's Equation, and entering Zone 2, in this further slowed down and further Static pressure increased state, experiences the same processes (Paragraphs 0132 through 0135) the whole cycle repeated over and over again.

Two questions now beg answers: First, what is the volume of Air Flow A affected, and second, how long does it take for the effect of the slowed down air flow leaving Zone 3 take to slow down air flow about to enter Zone 1. The answer to the first question is "approaching infinitely small." This is to say that there is no air flow volume so small that this phenomena has no effect on, or that in turn does not create the effect on subsequent air flows. Offsetting this "smallness" is the fact that the smaller such volumes are, the more there are that are passing through these processes at any instant, a number that can be recognized as a consequence of the foregoing recognition as "approaching infinitely large."

The answer to the second question "how long does it take for the effect of the slowed down air leaving Zone 3 to slow down an another air flow about to enter Zone 1," is equally remarkable. Because air is relatively incompressible, it takes place at the speed of sound in air at sea level, 761 MPH or 14,000 inches per second, meaning—for a 1 foot long path—a little more than $1/1000$ of a second.

So that what occurs is that effect of the velocity of the air flow leaving Zone 3 on the air flow entering Zone 1, occurring over and over again in nearly infinite numbers at nearly instantaneous speeds, cascades almost immediately to the highest extraction rate that can be sustained, the Betz Limit, 59.3%.

This extraction rate continues through the entire traverse of the Oscillating wing (7.) until it reaches the end whereupon it goes through the process of halting and reversing direction. This steadiness through the traverse was repeatedly observed in video tape tracking of the rotational speed (11p. or 11s) of the Oscillating wing (7.) later analyzed using the open source video tracking program "Tracker." After a near negligible delay getting itself up to speed, the Oscillating wing (7.) traverses at a constant speed until it reaches the end of its traverse.

These developments, occurring as they do, are confirmed by the inability of the Oscillating wing (7.) to rotate without the presence of the Aft nacelle (8.). Aside from being blown downwind by the Wind (14.) rotating the Wind Wing around its Mast (5.) so that it remains face to the Wind (14.), the Aft nacelle (8.) combines with either the Starboard outside airfoil (2.) or the Port outside airfoil to constrict the channel between them sufficiently to maintain this Kinetic energy extraction at the Betz Limit throughout the entire traverse. Without this constriction, the higher Static pressure built up in the Zone 3s of these channels simply spills out as the rotations of the Oscillating wing (7.) open their exit. Remove the Aft nacelle (8.) and the Oscillating wing (7.) will not oscillate.

Recognition that with a suitable construct, Wind Wings can extract nearly 59.3% of the Kinetic energy of wind passing through one, and then the other of two channels, says that it can extract in the range of 29% of the Kinetic energy of whatever Freestream Wind the Wind Wing faces and can capture The amount of Wind that it can capture is the product of the height of the vertical elements times its Capture Width. The Capture Width is the distance between the most forward points on the bows of the Outside airfoils; the Starboard outside airfoil (2.) and the Port Outside airfoil (3.). It is the width of the air flow that enters the Wind Wing when it is face to the Wind (14.).

Figure 12:
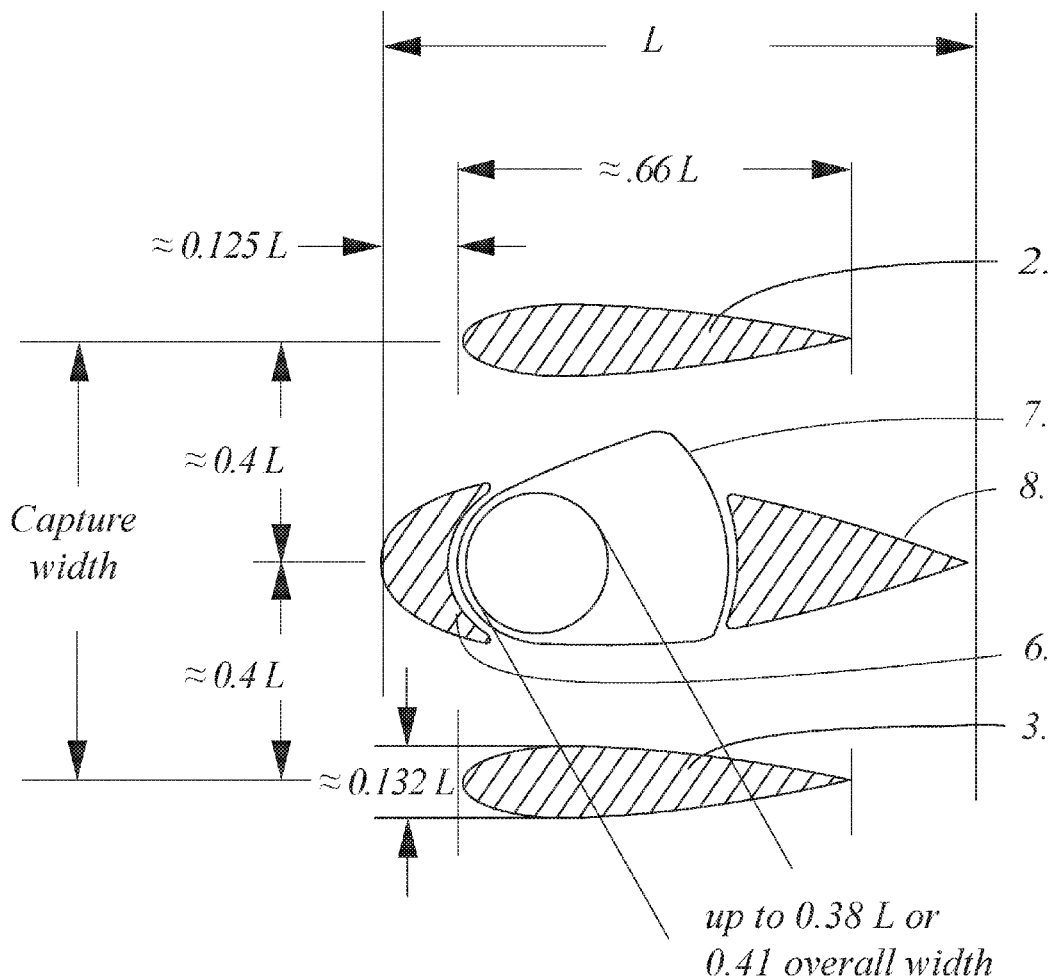
FIG. 12 is a top down view of s cross section of the Wind Wing which provides relative dimensions and positions of the Starboard outside airfoil, Port outside airfoil, Roof, Mast, Forward nacelle and Oscillating wing.

The Outside airfoils are of a shape similar to NACA-0020, and of a size and positioned relative to the Forward nacelle (6.), Oscillating wing (7.) and Aft nacelle (8.) as shown in FIG. 12.

Figure 13:
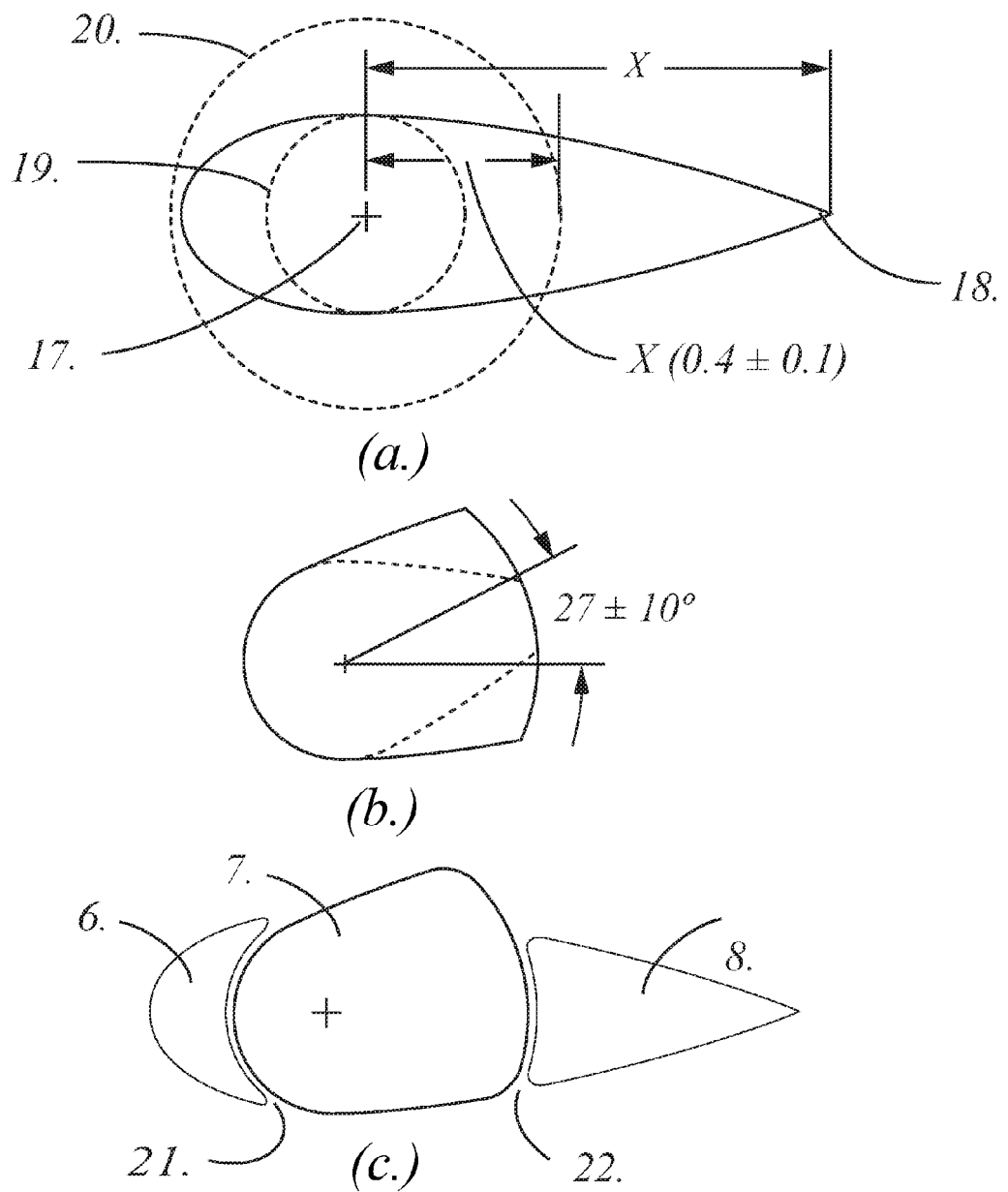
FIG. 13 (a.) shows the manner of segmenting a middle range NACA 4-digit symmetrical airfoil to create the outlines of a Forward nacelle, Oscillating wig, and Oscillating wing, the three otherwise constituting a third vertical airfoil.

FIG. 13 (a.), FIG. 13 (b.) and FIG. 13 (c.) show the steps in the evolution of the outlines of the Forward nacelle (6.), Oscillating wing (7.) and Aft nacelle (8.) from an airfoil similar to NACA-0030

It merits recognition that this drawing (FIG. 13 here) differs from a nearly identical drawing, FIG. 8 in U.S. Pat. No. 8,734,082 which erroneously states the angle of rotation of the section cut out of the center of the source airfoil as 53°±5°. It should have been 25±5°. Further, the airfoil therein erroneously specified as "similar to NACA-0040" should have been "similar to NACA-0030". A Certificate of Correction was requested on the basis that these were clerical errors, resulting from a drawing prepared for inclusion in the respective Patent Application, exaggerating these dimensions for the purpose of visual clarity inadvertently included in place of the correct one. A request for a Certificate of Correction, followed by a Request for Supervisory Review were both rejected on the basis that they changed the scope of the claims. These developments appear however, to have had a silver lining as consideration of how to derive benefit from the error, led to invention of the about to be addressed Yeager wing (23.) along with a number of other improvements (Provisional Patent Application No. 62/039, 493), and the Programmable Proportional Control Mechanism for Collapsible Vertical Wings (Provisional Patent Application No. 62/184,438).

In any event FIG. 13 (a), FIG. 13 (b) and FIG. 13 (c) show the method for creating the outlines of the Forward nacelle (6.), Oscillating wing (7.) and the Aft nacelle (8.) using a streamlined symmetrical airfoil similar to NACA-0030 or a similar airfoil (16.): dividing it with design circles, slicing it, copying and rotating one of the sliced sections, combining the rotated copy with the original, establishing clearances, and rounding off the side corners.

FIG. 13 (a) shows two design circles, a Smaller design circle (19.) and a Larger design circle (20.) drawn with their center at a point midway between the widest points on this Airfoil similar to NACA-0030 (16.). The diameter of the Smaller design circle (19.) is the width of the that airfoil at that point and while the radius of the Larger design circle (20.) is set at 40±5% of the distance from the center to the aft most point on the Airfoil (18.)

FIG. 13 (b) shows this remaining middle section copied, the copied section rotated around the Mast (5.) 27±10 degrees to the centerline, and both combined.

FIG. 13 (c) shows the section forward of the Smaller design circle (19.) becoming the basis for the outline of the Forward nacelle (6.), the section aft of the Larger design circle (20.) becoming the basis for the outline of the Aft nacelle (8.), the just modified middle section becoming the basis for the outline of the Oscillating wing (7.), and the center point becoming the axis of the Mast (5.). It also shows the Forward air gap (21.) cut between the section about to become the Forward nacelle (6.) outline and the section about to become the Oscillating wing (7.) outline, the Aft air gap (22.) cut between the section about to become the Oscillating wing (7.) outline and the section about to become the Aft nacelle (8.) outline. Finally it shows the corners of the Forward nacelle (6.) trimmed so as not to interfere with the Oscillating wing (7.) as it rotates to its port-most and starboard most-positions, approximately 29 degrees off center to either side, and the corners of the Oscillating wing (7.) and all of the corners of the Aft nacelle (8.) except the aft most one (18.) rounded moderately.

Continuing the theme of constructing either a $20 Model or a Tower Model, the first consideration after selection of an appropriate location—obviously where there is the best combination of strong and steady wind, considerate of neighbors, anchoring, etc.—is the decision of how big a machine to construct.

In the poor communities of the world, those currently without economical access to electricity, toward which the $20 Model is intended, the principal concern should be toward exploiting the Wind Wing's cubic structure resulting from the interlocking of its Floor (1.), Outside starboard airfoil (2.) Outside port airfoil (3.) Roof (4.), Forward nacelle (6.) and Aft nacelle (8.) to support the Mast (5a.), which it turn supports its Oscillating wing (7.). While the innovation of the Windraider process is likely to command initial focus, the values of Wind Wing's in such communities will depend heavily on how large and how strongly they are constructed with an emphasis on robustness and reliability. To the extent the inventor has been able to travel to third world countries, the impression is that, given the opportunity, locals will surprise everyone with what they are able to come up with on their own.

In the case of Tower Models, there is no reason to believe that a small percentage of the engineering talent and resources which have so benefited large Horizontal Axis Wind Turbines (HAWTs) cannot yield the same and perhaps greater degrees of improvement from the Windraider process and the basic Wind Wing design, particularly with the improvements about to be described.

The first of these is what the inventor has named the Yeager wing (23.) in honor of Chuck Yeager, the first man to break the sound barrier. It is essentially a collapsible vertical wing which serves as the Wind Wing's Oscillating wing (7.) with the benefits that it is incredibly survivable, that can be optimized to the then prevailing wind speed, and that it will enable the Wind Wing to remain face to the wind, carrying with it, the Armstrong generator.

It is well recognized by meteorological scientists and turbine engineers that wind blows with higher velocities at higher elevations, the phenomena attributed to the friction of the earth's surface characteristics on the wind blowing over them. This is generally referred to as the "wind gradient." Following is the formula that can be found on Wikipedia for calculating the wind gradient is at any height:

$$v_h = v_{10} \cdot \left(\frac{h}{h_{10}}\right)^a$$

where:
$V_h$=velocity at height h
$V_{10}$=velocity at a height of 10 meters (32.8 ft)
α=Hellman constant
The Hellman constant takes into account the earth surface roughness (open water, flat ground, or human inhabited area) as well as the effect it has at different times during the day on the stability of the air above it (day or night and transitioning).

Using wind blowing at 30 MPH, (which is what many wind turbine manufacturers select as their "rated speed,") at an elevation of 30 feet, the Hellman constant for stable air above a human inhabited area, and the Iowa State Energy Center formula for the Kinetic energy in wind (w [watts] =0.0052 A [cross-sectional area in square feet] $v^3$ [velocity in $MPH^{cubed}$]), the following table can be constructed:

| | Height (ft) | | | | | | | |
|---|---|---|---|---|---|---|---|---|
| | 30 | 40 | 50 | 60 | 70 | 80 | 90 | 100 |
| Wind speed (MPH) | 30 | 35.7 | 40.8 | 45.5 | 49.9 | 54 | 58 | 61.8 |
| Kinetic Energy (watts/sq. ft) | 140 | 333 | 650 | 1123 | 1784 | 2662 | 3790 | 5200 |

What can be observed here is the incredible increase in Kinetic energy in the wind that is available at higher elevations. This raises the question why are not more turbines simply positioned at higher elevations. The answer is that they cannot tolerate the higher speed winds that are within the normal distribution of winds at any given speed. A location where wind speed is recognized as 30 MPH will occasionally experience wind speeds of 40 MPH. And for all but the larger and more sophisticated turbines wind speeds greater than 30 MPH are killers. It is for this reason, that around 30 MPH all turbines, including the largest and most sophisticated begin furling their blades and or turning their axes of rotation to be perpendicular to the wind.

The fatal factor is the gradient effect on blade bending. As can be recognized in the above table, a turbine whose axis positioned 40 feet above the ground with blades 10-feet in radius will have those blades tips experience wind speeds of 30 MPH when they are at the bottoms of their rotations, and 45.5 MPH when they are the tops of their rotations. So that as they rotate, these blades are constantly being flexed forward and backward, such flexing increasing in severity and frequency at higher wind speeds.

Wind wings suffer no such problem. This is another one of those features that was never considered as the Wind Wing was being engineered, but simply showed up when the model was being tested on the top of the inventor's car. Against a 10 MPH headwind, we were able to increase car speed to better than 40 MPH before the abandoned pre-WWII runway on which the test was being conducted ran out.

It is not easy to fully appreciate the implications of this capability. In its May 2015 report Enabling Wind Power Nationwide, the DOE recognized elevating wind turbines as one of the means to utilize them in broad areas where up to now they have not made economic sense. But the DOE conditioned this anticipation somewhat on the availability of new materials. The Wind Wing has already demonstrated its capability to handle higher wind speeds than can be tolerated by turbines, and to have done so with a model whose surfaces were paper, and whose frames were foamboard. And it is not simply the additional parts of the Country where it can be brought into service that it can benefit. As recognized in the preceding table, the Kinetic wind energies that Wind Wings can tap into simply by positioned at higher elevations are staggering.

Reading the table closely, one can recognize that it very much appears that Wind Wings can provide currently considered suitable locations with up through 500% improvements in Wind Energy Power yields simply by positioning them where similar class turbines are prohibited by their wind speed limitations Even so, there are obviously wind speeds in which Wind Wings, unimproved by the about-to-be described Yeager wing are themselves vulnerable to the destructive power of very high speed winds. What the Yeager wing (23.) does among other things, is present such winds with airfoil shapes designed to withstand wind speeds higher than any recorded near the surface of the earth (the highest recorded wind speed, 231 MPH having been measured during a cyclone in Australia in 1996.)—NACA 4-digit streamlined symmetrical airfoils, first published in 1930 by the National Advisory Committee on Aeronautics, the predecessor Agency to NASA, were developed and tested to improve the speed and performance of airplanes.

Figure 14:
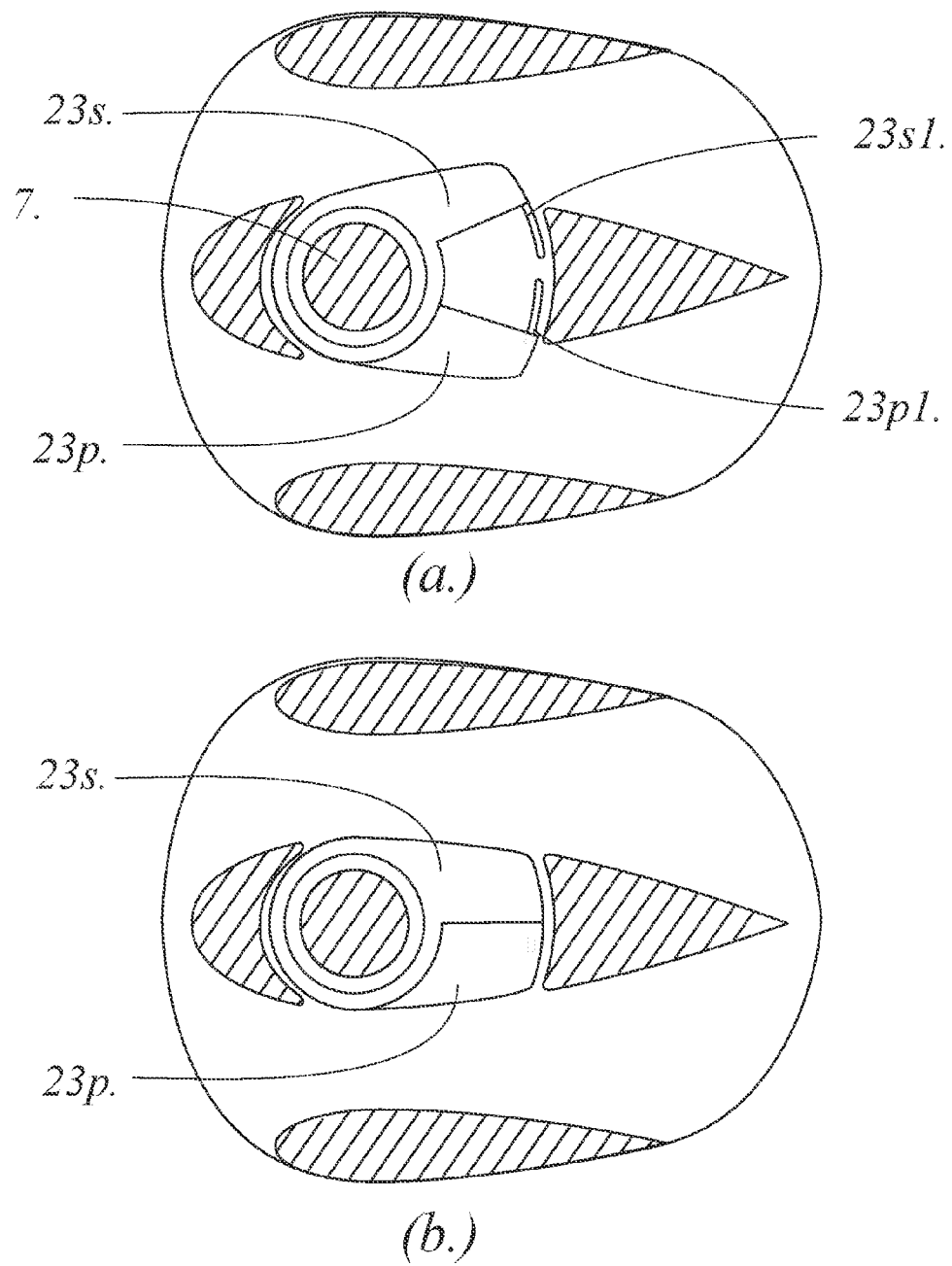
FIG. 14 (a.) is a top-down view of a Wind Wing with its Roof removed which illustrates parts of its Floor, Starboard outside airfoil, Port outside airfoil, Mast, Forward nacelle, Aft nacelle, and a half-open Yeager wing as its Oscillating wing.

FIG. 14 (a.) and FIG. 14 (b.) provide top-down views of the Yeager wing (23) nearly halfway open and completely closed respectively.

With the Yeager wing (23.) completely closed (FIG. 14b), what the Wind Wing presents to the wind, excluding its Floor (1.), Roof (4.), Torque transmitter/Generator cover (29a), Mast (5.) are 3 NACA 4-digit streamlined symmetrical airfoils or airfoils close to them. These airfoils have drag coefficients of 0.05, ⅕th that of bare poles.

Figure 15:
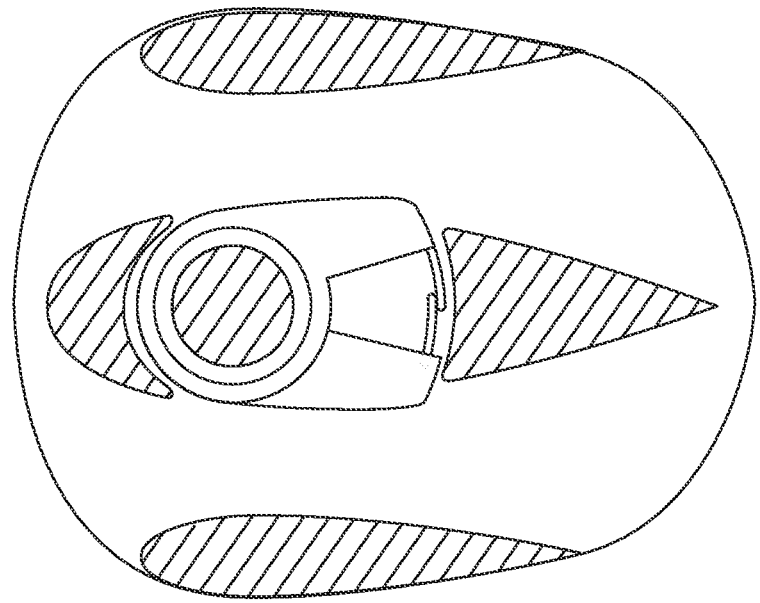
FIG. 15 (a.) is a top-down view of a Wind Wing with its Roof removed showing a Yeager wing closed to approximately half of its range of closures.
Figure 15:
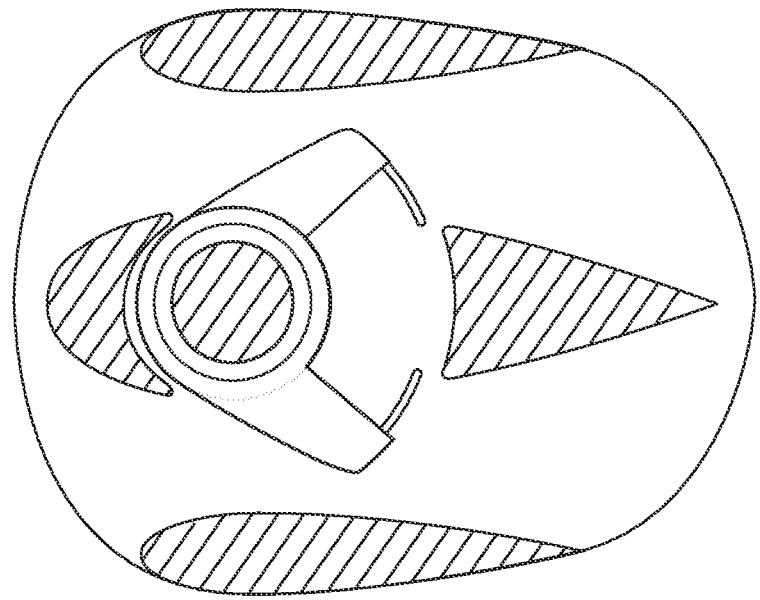

FIG. 15 (a.) is a top down view of the Yeager wing (23.) closed somewhere between the halfway open state illustrated in FIG. 14 (a.) and the completely closed state illustrated in FIG. 14 (b.). This in one of a nearly infinite degrees of closure that can be programmed into the about to be described Programmable proportional control mechanism for collapsible vertical wings (hereafter the "PPCM") that is the subject of the same named Provisional Patent Application No. 62/184,438. filed Jun. 25, 2015.

Besides allowing the Yeager wing (23.) to close completely in survival conditions FIG. 14 (b.) and open completely to facilitate it remaining face to the wind, the PPCM allows its closure to be optimized. How this occurs will be discussed presently (beginning with Paragraph 0174.

FIG. 15 (b.) shows the Yeager wing (23.) in a completely open position. In this position, it facilitates the Wind Wing keeping its entry portal face to the wind.

As originally engineered, and is still the case, the Wind Wing is able to remain face to the wind by it having its Aft Nacelle (8.) blowing it downward, rotating everything around the Mast (5.). However, with the added inertia of larger machines, and particularly that of the Armstrong Generator which also must rotate in order to maintain its alignment with the Wind Wing, a completely open Yeager wing (23.) as drawn in FIG. 15 (b.) provides what can prove to be enabling support. Without it, wind entering the aft portal might pass through in the reverse direction without the desired rotation turning it bow to the wind.

Figure 16:
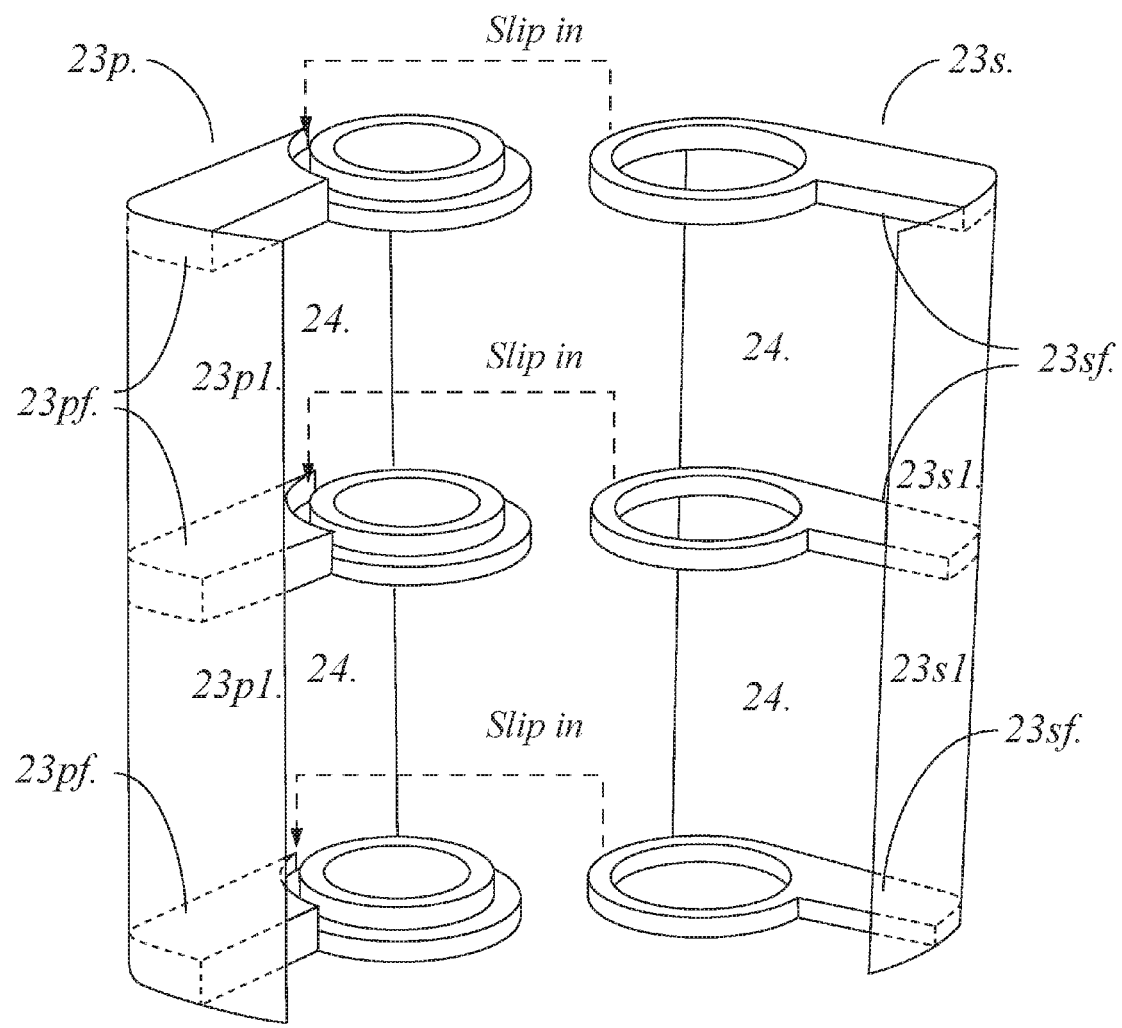
FIG. 16 is an aft view of a Yeager wing which shows how its Starboard element frames slip into groves cut for them in their Port element frames.

FIG. 16 shows that the assembly of the two largest components of the Yeager wing (23.), the Yeager wing starboard element (23s.) and the Yeager wing Port element (23p.) combine in the manner of a door hinge, with the Starboard element frames (23sf.) slipping into ("Slip in") grooves cut for them into Port element frames (23pf), and the resulting assembly slipped over the Tower Model Mast (5b.). It also shows the Skins (24.) of each element attached to the Starboard element frames (23.sf) and Port element frames (23pf.), curving around the Starboard element frames (23sf) and Port element frames (23pf.) to prevent eddies from entering the cavity between the Yeager wing starboard element (23s.) and the Yeager wing Port element (23p.) which increases as the Yeager wing (23.) opens.

It is worth noting that the forward extents of each component's Skin (24.) terminate at a point where they do not collide when the Oscillating wing (7.) is fully open, but the area between them is protected by the Forward nacelle (6.) even when the Oscillating wing (7.) is fully closed and rotated to its limits. Further, that the Aft extents of the Skins (24.) overlap as the Yeager Wing (23.) closes to where they might meet.

Figure 17P:
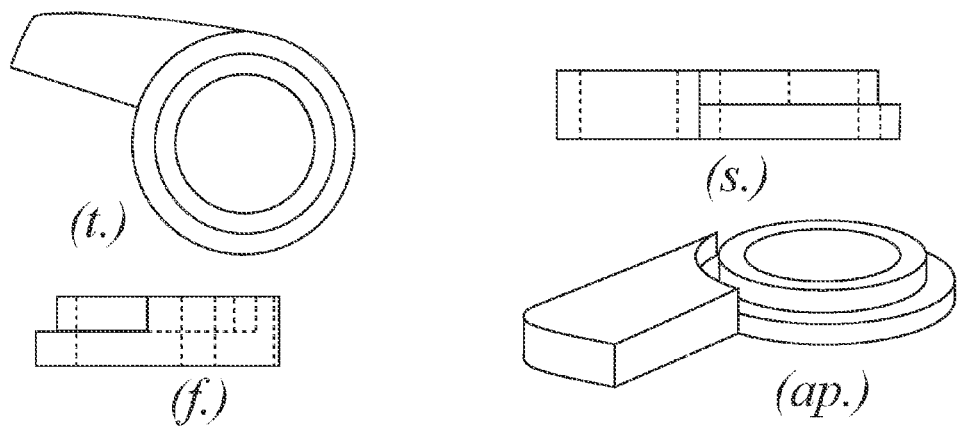
FIG. 17p (t.), (s.), (f.), and (ap.) are top, starboard, front, and from aft perspective views respectively of a Yeager wing Port element frame.
Figure 17S:
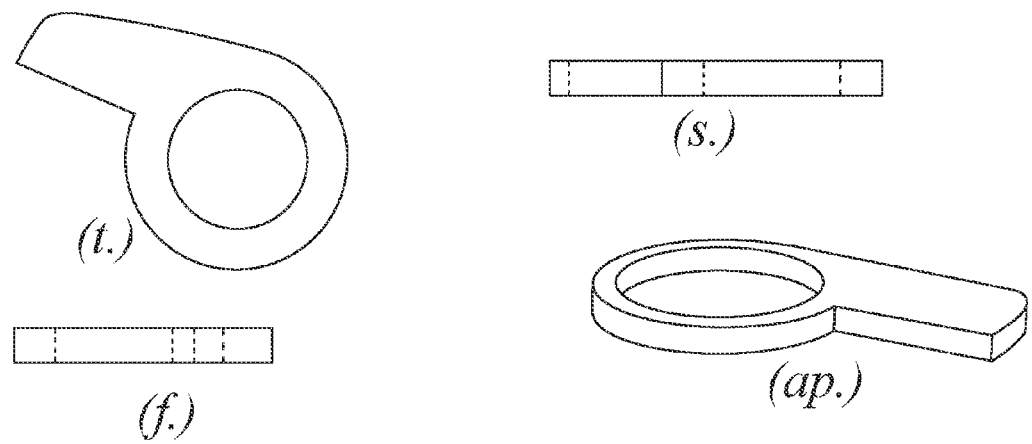
FIG. 17s (t.), (s.), (f.), and (ap.). are top, starboard, front, and from aft perspective views respectively of a Yeager wing Starboard element frame.

FIG. 17p and FIG. 17s provide top (t.), starboard (s.) front (f.) and aft perspective (ap.) views of the Port element (23pf) and Starboard element (24sf) frames respectively.

It appears ultraviolet-resistant extruded polycarbonate sheets may provide the ideal material for fabrication of the skins of the Forward nacelle (6.), Starboard outside airfoil (2.), Port Outside airfoil (3.), Aft nacelle (8.) and Yeager wing (23.), all of which are constructed using the Monocoque technique. They are strong, light, inexpensive (<$35 for a 4'x8' sheet,) ultraviolet resistant, neutral colored, and easily fabricated. For the Skins (24.) of the Starboard (23s.) and Port (23p.) elements, they provide an additional benefit, in that they are capable of being laminated so they can extend (as illustrated in FIG. 16 further over the aft sides of the Starboard element frames (23sf.) and the Port element frames (23pf) to prevent eddies from migrating into the cavity between the Starboard (23s.) and Port (23p.) elements.

As is the case with other employments of the Monocoque technique, the frames (23pf. and 24sf.) carry very little stresses, allowing them to be fabricated from other polycarbonates which, in turn allow polycarbonate Skins (24.) to be permanently adhered to them with heat bonding. This leads toward very low cost anticipations for Tower Model Wind Wings.

As earlier noted, control over the degree of closure of the Yeager wing (23.) is exercised by a remarkable mechanism that developed into what appears can be legitimately described as an analog computer, the Programmable proportional control mechanism or "PPCM," (26.).

Figure 18:
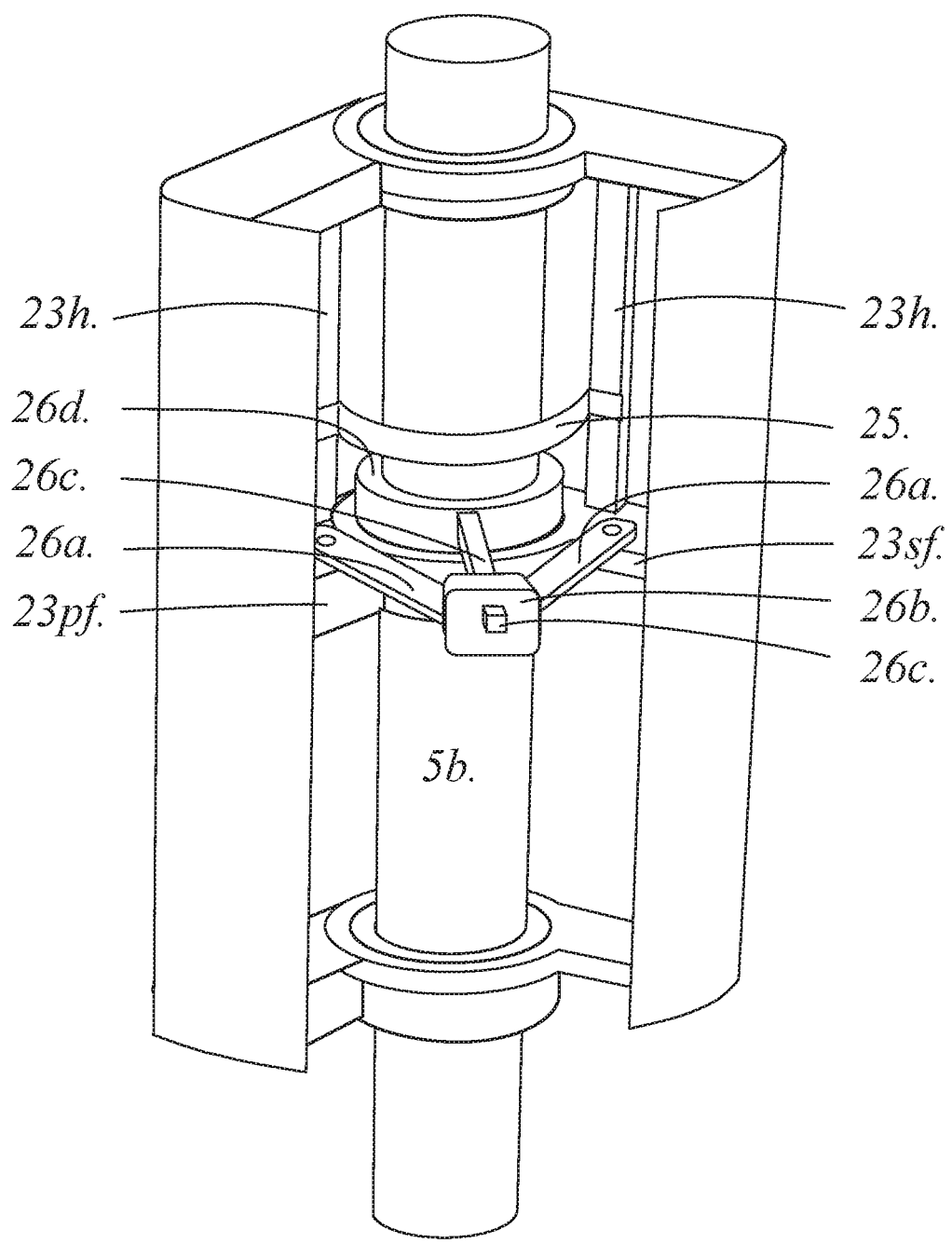
FIG. 18 is a perspective view aft and above an open Yeager wing that shows the major assemblies of the Programmable Proportional Control Mechanism "PPCM": the Extender spring, the PPCM arm, the PPCM program bar, and the PPCM computer, and the manner in which they are attached to one another, to the Port and Starboard Yeager wing elements, and to the Mast.

FIG. 18 is aft view of the Wind Wing that shows the major assemblies of the PPCM: Two PPCM arm assemblies (26a.) link the PPCM computer (26b.) to the Port (23pf.) and Starboard (23sf.) element frames, in a manner that, as the PPCM computer (26b.) is driven outward by the centrifugal force of the oscillating Yeager wing (23.), it rides along the PPCM program bar (26c.), closing the Port (23p.) and Starboard (23s.) Yeager wing elements. Also shown is the Extender spring (25.) and the Extender spring support ribs (23h.).

The Extender spring (25.) as shown here as a semi-elliptic spring, but may be any element which serves to force the Yeager wing starboard element (23s.) and the Yeager wing port element (23p.) apart, increasing this force as they are brought closer together.

Figure 19:
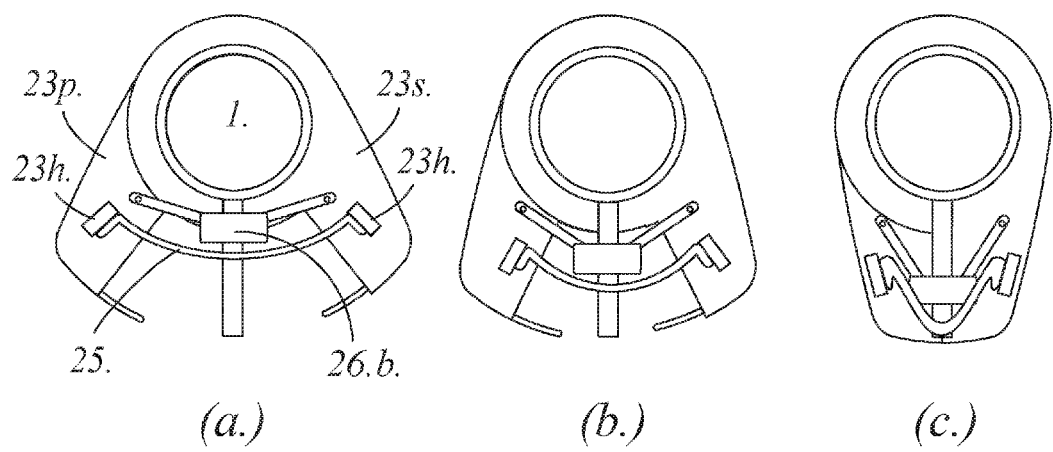
FIG. 19 (*a.*) is a top down view of the major assemblies of the PPCM and the frames of the Yeager wing to which they are attached when the Yeager wing is completely open.

FIG. 19 (a.), FIG. 19 (h.) and FIG. 19 (c.) show the Yeager wing starboard element (23s.) and the Yeager wing port element (23p.) being brought together by the progression of the PPCM computer (25b.) moving aft from the Mast (5.), simultaneously compressing the Extender spring (25.) which, as just noted, increases its force toward driving them apart.

The PPCM (26.) utilizes the centrifugal force of the Yeager wing's (23.) rotation to drive the PPCM computer (256.) outward, pulling the Yeager wing starboard element (23s.) and the Yeager wing port element (23p.) inward,— Balancing this force against that of the Extender spring (25.) attempting to push them outward.

This balance can be maintained because the further outward the PPCM computer (25b.) moves, the stronger the centrifugal force on it. And the stronger the centrifugal force on it, the more it attempts to pull the Yeager wing starboard element (23s.) and the Yeager wing port element (23p.) inward. At the same time, the more the Yeager wing starboard element (23s.) and the Yeager wing port element (23p.) are pulled inward, the stronger the force with which the Extender spring (25.) attempts pushing them outward.

The missing elements here are the speeds of rotation required to create different centrifugal forces. Higher speed rotations create greater centrifugal forces, while lower speed rotations reduce them. So that at higher speeds, the balance point between the higher centrifugal forces pulling the PPCM computer (26b.) outward, pulling the Yeager wing starboard element (23s.) and the Yeager wing port element (23p.) inward, are balanced by the greater compression of the Extender spring (25.) attempting push them outward.

Figure 20:
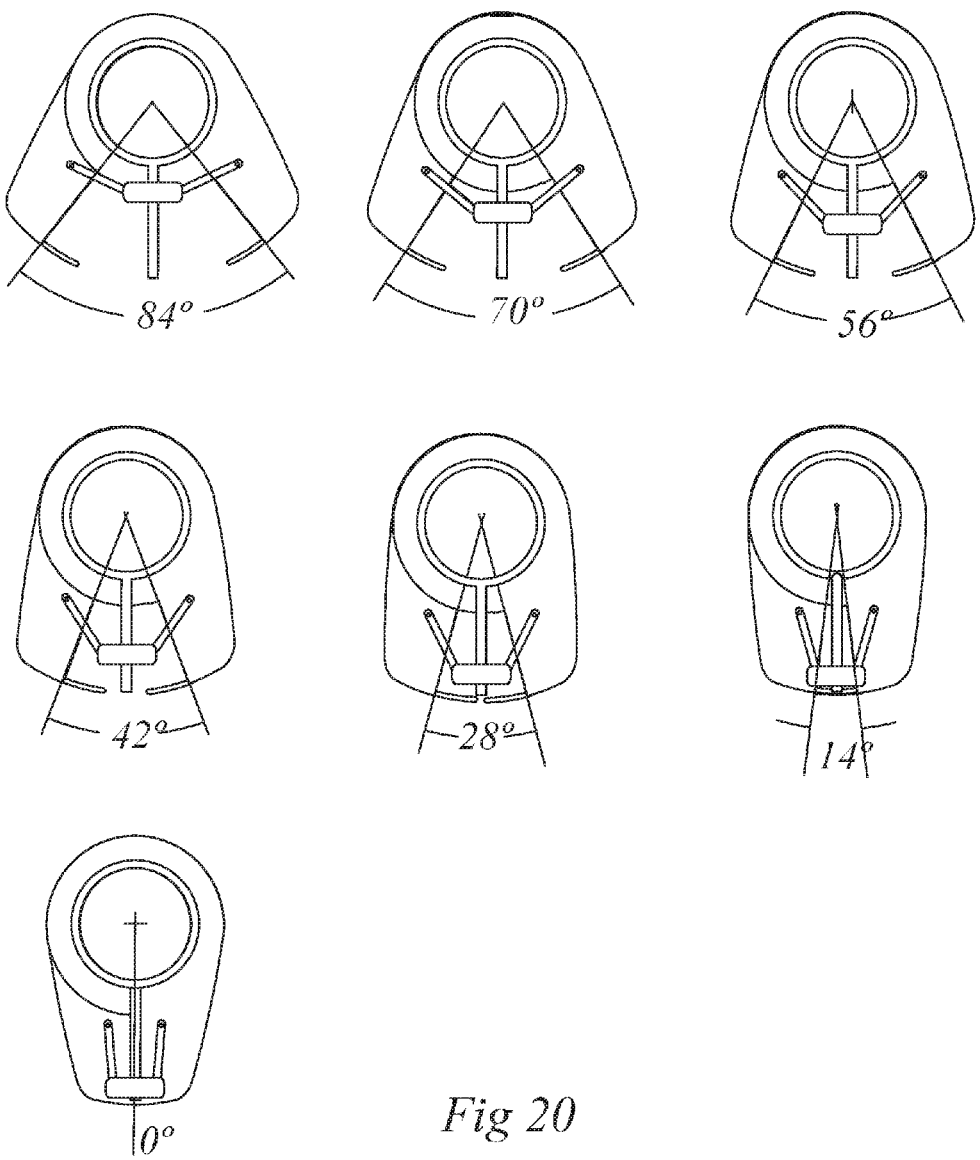
FIG. 20 shows 7 top down views of the major assemblies of the PPCM and the frames of the Yeager wing to which they are attached the when the angles between the Yeager wing's Port and Starboard elements are at 14°-apart angle increments ranging from 84° down to 0°.

FIG. 20 expands on FIG. 19 (a.), FIG. 19 (b.) and FIG. 19 (c.) by showing the Yeager wing (23.) PPCM computer (26b.), and the PPCM arm assemblies (26a.) at seven 14°-apart angles (26q.) between the Yeager wing starboard element (23s.) and the Yeager wing port element (23p.) ranging from 84° down to 0°. Here again, one can assume that the Yeager wing (25.) showing smaller angles of openness, are rotating faster than that showing greater angles of openness.

Figure 21:
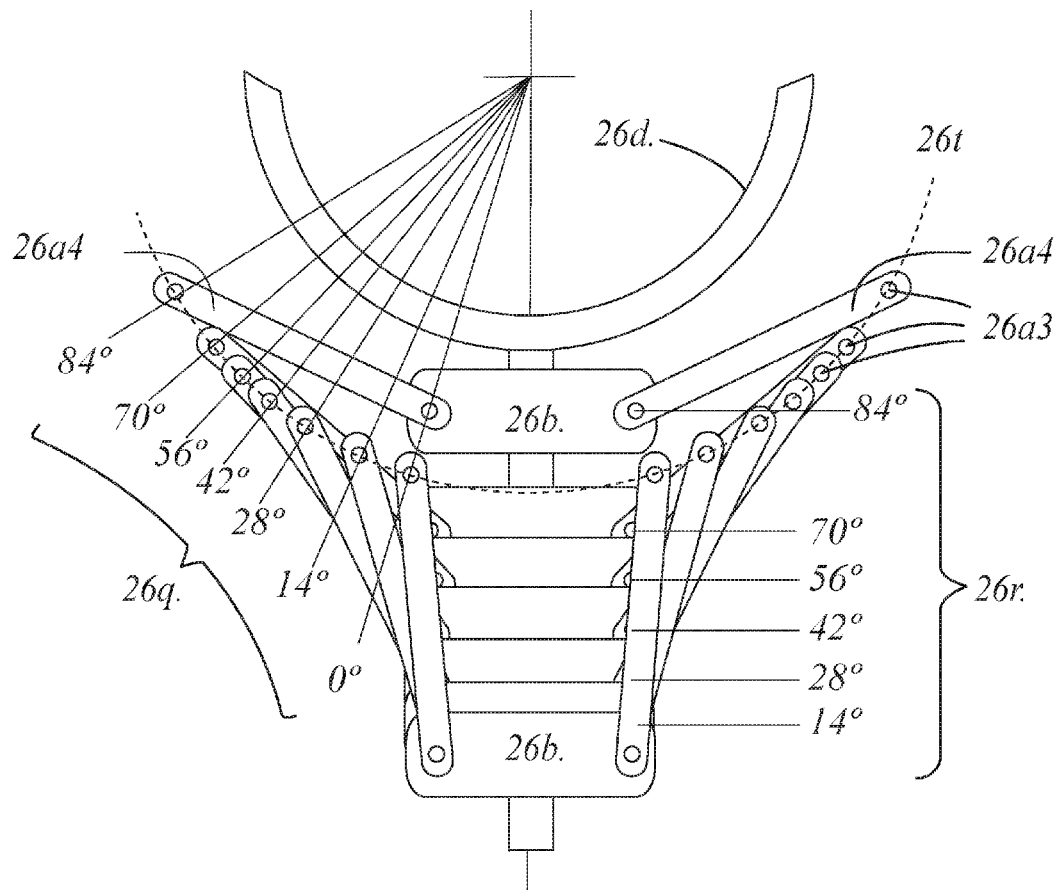
FIG. 21 shows how increasing centrifugal force resulting from faster oscillations of the Yeager wing draws the PPCM computer aft, pulling on the PPCM arm roller connection points, pulling the PPCM arm wing connection point inward along the Arc of rotation of the PPCM wing element connection points, closing the Yeager wing.

FIG. 21 isolates and overlays one after the other, the positions of the PPCM computer (26b.), and the PPCM arms (26a.) that were shown in FIG. 21 at these seven angles of (26q.) to highlight the irregular outward progress (26r.) of the PPCM computer (266.) in response to the regular incremental progress of the angle between the Yeager wing Port element (26p.) and Starboard element (26s.). As the angle between the Yeager wing Port element (26p.) and Starboard element (26s.) increases in regular 14° increments (26q.), from 0° to 14° to 28° to 42° to 56° to 70° to 84°, the PPCM computer (26b.) moves inward (26r.) toward the Mast (5.) first, a little bit, then a little bit more than that, then a lit bit more than that, then the same, then the same, then the same and then a whole lot more.

It was to compensate for this irregularity, as well as provide survivor ability in extremely high speed Winds (14.) that the PPCM (26.) was invented and the PPCM computer (26b.) engineered.

Figure 22:
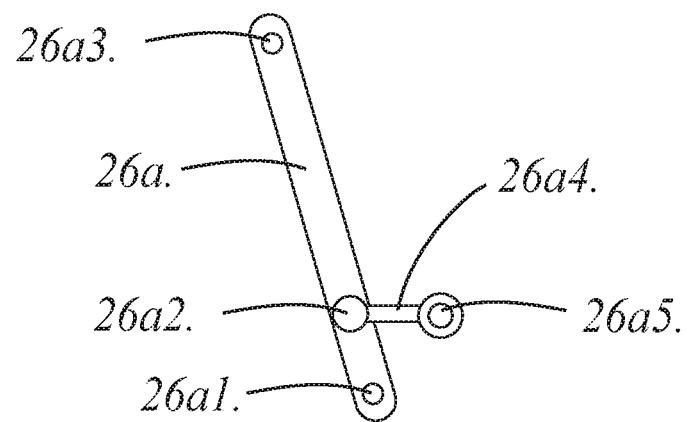
FIG. 22 illustrates a PPCM arm assembly including its PPCM arm roller and identifies its connection points.

FIG. 22 illustrates a PPCM arm assembly (26a.) including the connections that allow the two PPCM arm assemblies (26a.) to read and respond to whatever "program" has been engineered into the PPCM program bar (25c.).

Figure 23:
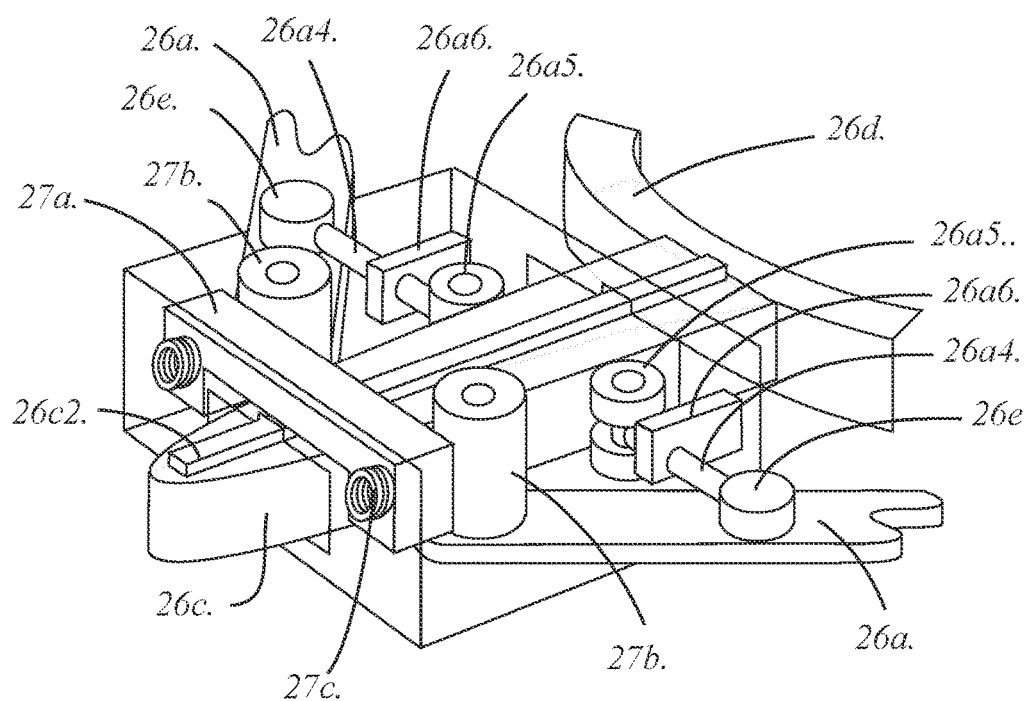
FIG. 23 is a perspective exploded view of the PPCM computer showing all of its principal elements

FIG. 23 illustrates the principal elements of the PPCM computer (26b.). Included are the two PPCM arms (26a.), the two Swivel fasters (26e) that connect these arms to the two PPCM arm roller connection bars (26a4.) which are connected to the two sets of PPCM arm roller (26a5.) that read the program from the PPCM program bar (26c.) the bars themselves forced to remain square the Mast (5.) by two PPCM arm roller connection bar guides (26a6.).

Also included are elements of the Brake (27.) which include the Brake mass (27a.), two Brake rotors (27b.) which are fixed to and rotate with the two PPCM arms (26a.) and two Brake activation springs (27c.). Their function will be recognized presently Also included are the PPCM Program bar (26c.) the PPCM program bar alignment track (26c1.) which assures the PPCM computer (26b.) and the PPCM Program bar (26c.) will remain square to one another, and the PPCM program bar holder (26d.) a rotating fastener which connects the PPCM Program bar (26c.) to Mast (5.)

Figure 24:
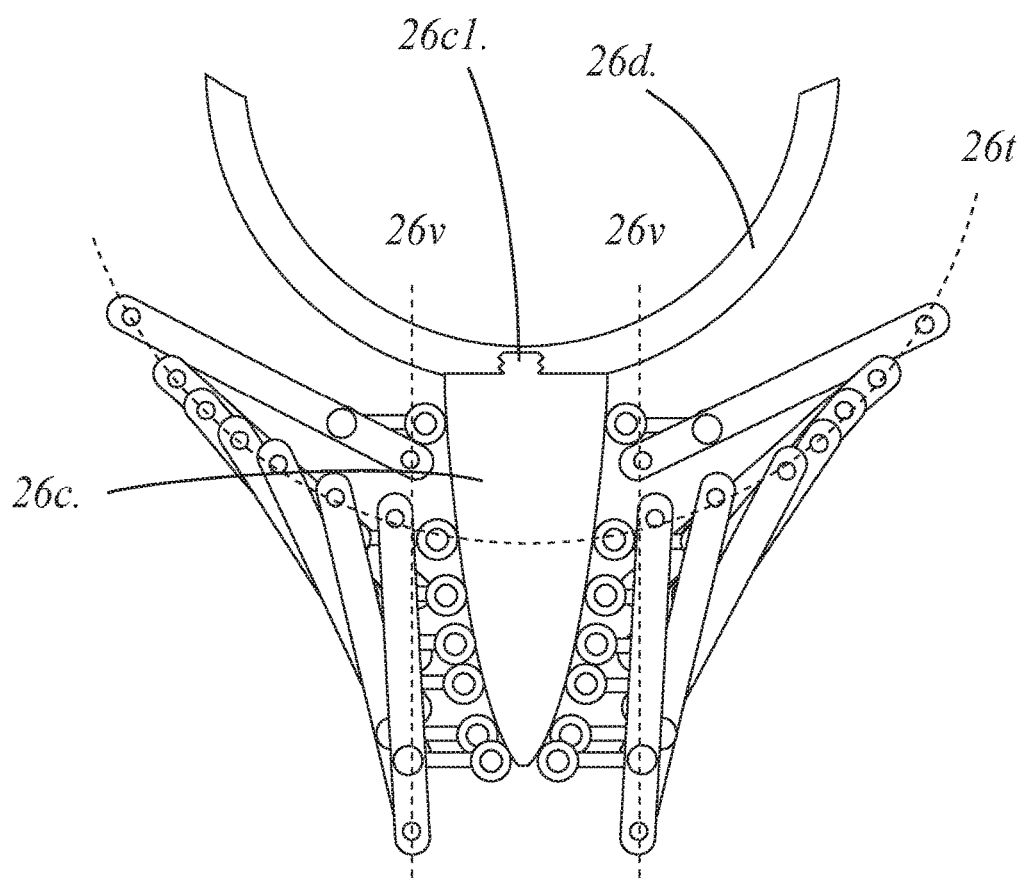
FIG. 24 illustrates that when faster oscillations of the Yeager wing increase the centrifugal force on the PPCM computer, drawing it aft, which causes the PPCM arm assemblies to draw in the Yeager wing is in large part determined by position of the PPCM arm rollers being drawn against the PPCM program bar.

FIG. 24 illustrates the positions of the PPCM arm assemblies (26a.) when the PPCM computer (26b.) and its PPCM arms (26a.) are positioned where they would be at the seven angles between the Yeager wing Port (26p.) element and Starboard (26s.) that are represented in FIG. 20 and FIG. 21.

What FIG. 24 shows are the positions of the PPCM arm rollers (26a5.) and the shape they outline, when the PPCM arms (26a.) are in the positions they represented being at in FIG. 20 and in FIG. 21. This shape becomes the outline of an unprogrammed PPCM program bar (26c.).

FIG. 24 includes three doted lines. The curved one is the path the Arc of rotation (26t.) of the PPCM wing connection points (26a3.). This path is invariable as is at a fixed distance from the of the center of rotation of the Starboard (23s.) and Port (23p.) elements of the Yeager wing (23.), which is also the center of the Mast (5.). One end of each PPCM arm (26a.), its PPCM arm wing connection point (26a3.) must, as a matter dictated by Geometry, remain on this path.

The other end of each PPCM arm (26a.) connected to the PPCM computer (26b.) at its PPCM arm computer connection point (26a1.) is forced to remain on one or the other of the two vertical dotted lines, each a Path of these PPCM arm computer connection points (26v.)

Attached to the PPCM arms (26a.) at their PPCM arm roller connection points (26a2.) and kept square to the Mast (5.) by PPCM arm roller connection guides (26a6,); PPCM arm roller connection bars (26a4.) precisely position PPCM arm rollers (26a1.) for each Angle of openness (26q.) of the Yeager wing (23.). As evident in FIG. 24, these positions create a parabolic shape for a PPCM Program bar (26c.) extending or allowing the draw in of the PPCM arms (26a.) opening or closing the Yeager wing (23) with the power to do so provided by either the force of compression from the Extender spring (25.) or centrifugal forces acting on the PPCM computer (26*b*.).

This raise the question of what would be the effect were the PPCM Program bar (26*c*.) wider or narrower at any distance from the Mast (1.).

The answer is that were it wider, the Angle of openness (26*q*.) of the Yeager wing (23.) would be greater. While were it narrower, the Angle of openness (26*q*.) of the Yeager wing (23.) would be narrower. Thus, by "programming" the PPCM Program bar (26*c*.) altering its width at different distances from the Mast (5.), a user can fix the Angle of openness (26*q*.) of the Yeager wing (23.) to the strength of the centrifugal force generated by the speed of rotation of the Yeager wing (23.) which, being determined by the speed of the Wind (14.) allows user control of how open the Yeager wing will be at that wind speed.

Figure 25:
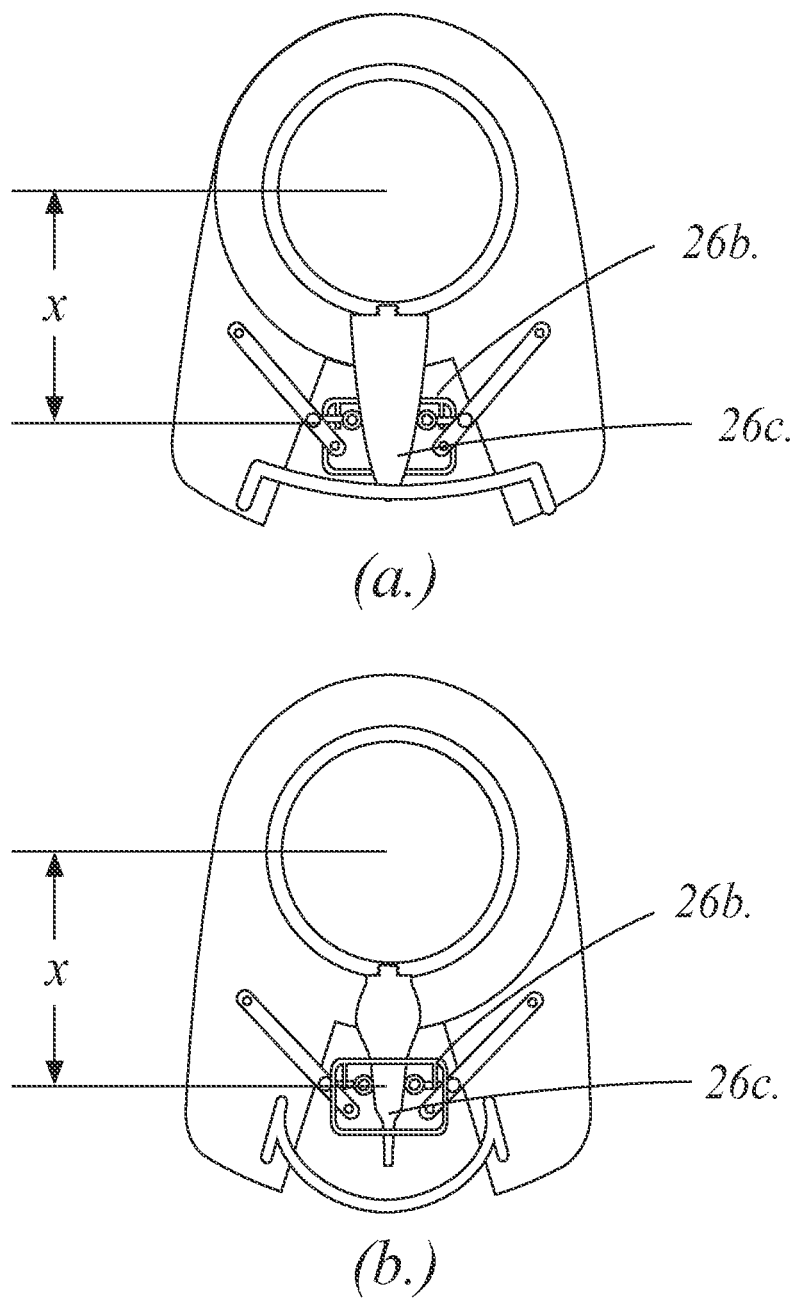
FIG. 25 (*a.*) along with FIG. 25(*b.*), both showing the PPCM computers the same distance from the Mast also show different widths of the PPCM Program Bar determining the degree of openness of the Yeager wing.

FIG. 25 (*a*.) and FIG. 25 (*b*.) allow this effect to be easier appreciated. At distance "x" from the center of the Mast (5*b*.) which is where the PPCM computer (26*b*.) would be were the speed of rotations and thus the centrifugal force on the Wind Wings in both drawings equal, and the compensating forces from the Extender springs (25.) equal—something which obviously is not the case and which will be addressed presently—the narrower PPCM program bar (26*c*.) would result, in the Yeager wing (23.) in FIG. 25 (*b*.) closing more than the Yeager wing (23.) in FIG. 25 (*a*.).

Inasmuch as the Extender spring (25.) in FIG. 25 (*b*.) is more closed than the Extender spring (25.) in FIG. 25 (*a*.) this is not quite the case. So that the distance from the center of the Mast (5.) to the PPCM computer (26*b*.) in FIG. 25 (*b*.) would be somewhat greater than "x." Calculating how much more is not difficult, but complex and not significantly illustrative, as long as it can be appreciated that a narrower PPCM program bar (26*c*.) at any point results in the Yeager wing (23.) closing more than it would were PPCM program bar (26*c*.) wider at that distance from the Mast (5.)

Before proceeding, it appears worth recognizing in FIG. 25 (*b*.) the conspicuous bulge in the PPCM program bar (26*c*.) inward of distance "x" and the conspicuous narrowness further outward. The former allows that the Yeager wing (23.) would keep more open until higher speed wind would be experienced, while the latter allows that it would close nearly completely in such higher speed winds than would be allowed by a parabolic shaped PPCM program bar (26*c*.). Although certainly not to the same degree, of sophistication, the Yeager wing can be recognized as imitating the intelligence of a bird tucking in its wings when soaring in turbulent winds.

The ability to "program" the PPCM program bar (26*c*.) allows any number of improvements to the performance of Wind Wings in different environments. Where wind speeds are higher and more constant, an overall a narrower PPCM program bar would appeared preferred, as among other things, there would be less if any demand for it to remain open to assist the rotation of the Wind Wing to remain face to the Wind (14.). It might also be used to "tune" oscillations, and thus AC power production to some grid or another application. The more one thinks about it, the more potential applications come to mind.

What does merit additional recognition is the feature that insures that changes in the distance from the center of the Mast (5*b*.) to the PPCM computer (26*b*.) are effected only during those periods when the Yeager wing (23.) is traversing, when centrifugal forces are present, and not when the Yeager wing (23.) is momentary stopped at the end of each traverse—where the absence of motion results in an absence of centrifugal force, allowing the force of Extender spring (25) to open the Yeager wing more than intended. The role of the Brake (27.) is to prevent this from happening.

Figure 26:
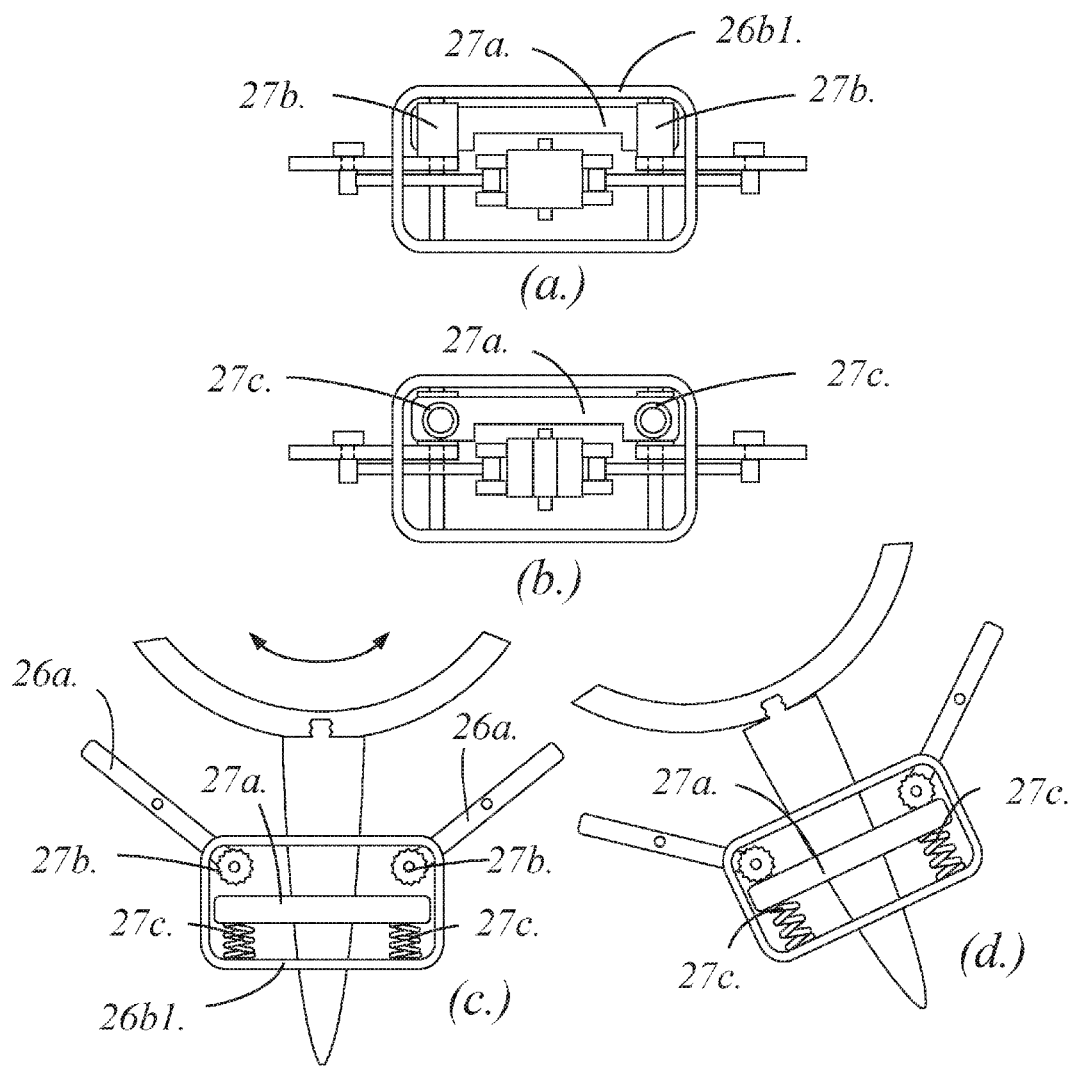
FIG. 26 (*a.*) shows the inside of the PPCM computer from forward of it.

FIG. 26 (*a*.) and FIG. 26 (*b*.) provide fore and aft views respectively of the Brake (27.) componentry, while FIG. 26 (*c*.) and FIG. 26 (*d*.) are top-down views of the Brake (27.) unengaged and engaged respectively.

Braking is activated by the Brake mass (27*a*.) not being forced outward by centrifugal force, moving inward against the two Brake rotors (27*b*.) in response to pressure from the two compressed Brake springs (27*c*.). The Brake functions in the manner of the railroad air brake invented George Westinghouse, in that braking is actively inhibited, and engages only when the inhibition is removed. With Westinghouse's railroad brake, it engaged whenever the air pressure inhibiting it (the train not operating, the air pressure connection between the cars failing, etc., causing a loss of compressed air pressure, etc.) was removed. In the case of the Brake (27.) in the PPCM (26.), it engages when rotations of the Yeager wing (23.) momentary cease at the end of each traverse, and the centrifugal force they produce, is no longer present.

As the Yeager wing (27.) rotates, centrifugal force on the Brake mass (27*a*.) forces it outward, compressing the Brake activation springs (27*c*.) as illustrated in FIG. 26 (*c*.). At the end of each traverse, when rotation ceases and resulting centrifugal is no longer present, the Brake activation springs (27*c*.) force the Brake mass against the Brake rotors (27*b*.) halting their rotation, along with that of the PPCM arms (26*a*.) to which they are attached, as illustrated in FIG. 26 (*d*.). This prevents the Extender spring (25.) from taking advantage of the lack of centrifugal force to upset the balance of forces maintaining the Angle of openness (26*q*.) of the Yeager wing (27.).

The Brake insures that the only time there is going to occur readjustment of the geometries of the Yeager wing is when it is rotating. Higher wind speeds→faster rotations-→more centrifugal force→outward movement of the PPCM computer (26*b*.)→greater closure of the Yeager wind. Also, lower wind speeds→slower rotations→less centrifugal force→inward movement of the PPCM computer (26*b*.). But no readjustment at the ends of traverses because no Yeager wing (23.) rotation→no centrifugal force→no resulting Brake mass (27*a*.) pressure against the compressed Brake springs (27*c*.)→Brake mass (27*a*.) moves inward→Braking engaged→no rotation of the two PPCM arms (26*a*.)→no readjustment.

While the Yeager wing (23.) and the PPCM (26.) will enable optimization of the performance of the Wind Wing in any speed winds, their dominating advantage is likely prove their enabling the Wind Wing to operate in the higher speed winds available at higher elevations, and thus take advantage of the disproportionate Kinetic energy they possess as the result of Kinetic wind energy being a function of the cube of the wind speed. Although, it increasingly appears that it may be that it also allows the Wind Wing to operate in conditions up to now considered too turbulent for wind power.

To exploit both these advantage, it is necessary to employ a larger and more robust electrical generator than the Wind Wing Electrical Generator that is the subject of U.S. Pat. No. 8,860,240) (which was, and remains intended for poor communities constructing their own $20 Model Wind Wings). More specifically it requires the ability to drive a much larger, and therefore heavier load of Coils (29.) one with significantly greater inertia.

The Wind Wing is, by nature of the Windraider process, weakest in generating torque when it is starting up and its Oscillating wing (7.) is amidships. Then, there is minimal imbalance between the Static pressure on its Starboard side and the Static pressure on its Port side—such imbalances being what rotates it. It was principally to overcome this weakness that the Torsional transfer mechanism (28.) was invented. However, as it emerged, it yields a number of other benefits, FIG. 27 (a.) shows the Torsional transfer mechanism, "TTM" (28.) to consist of two circular plates, one, the Key plate (28kp.), which has a Key (28k.) protruding from its bottom side, and the other a Slot plate (28sp.), which has a Slot (28s.) dug into its top side. Inside the Slot (28s) are two springs (28s) one at each end to conserve and later use nearly all the energy lost by direction reversals.

Figure 27:
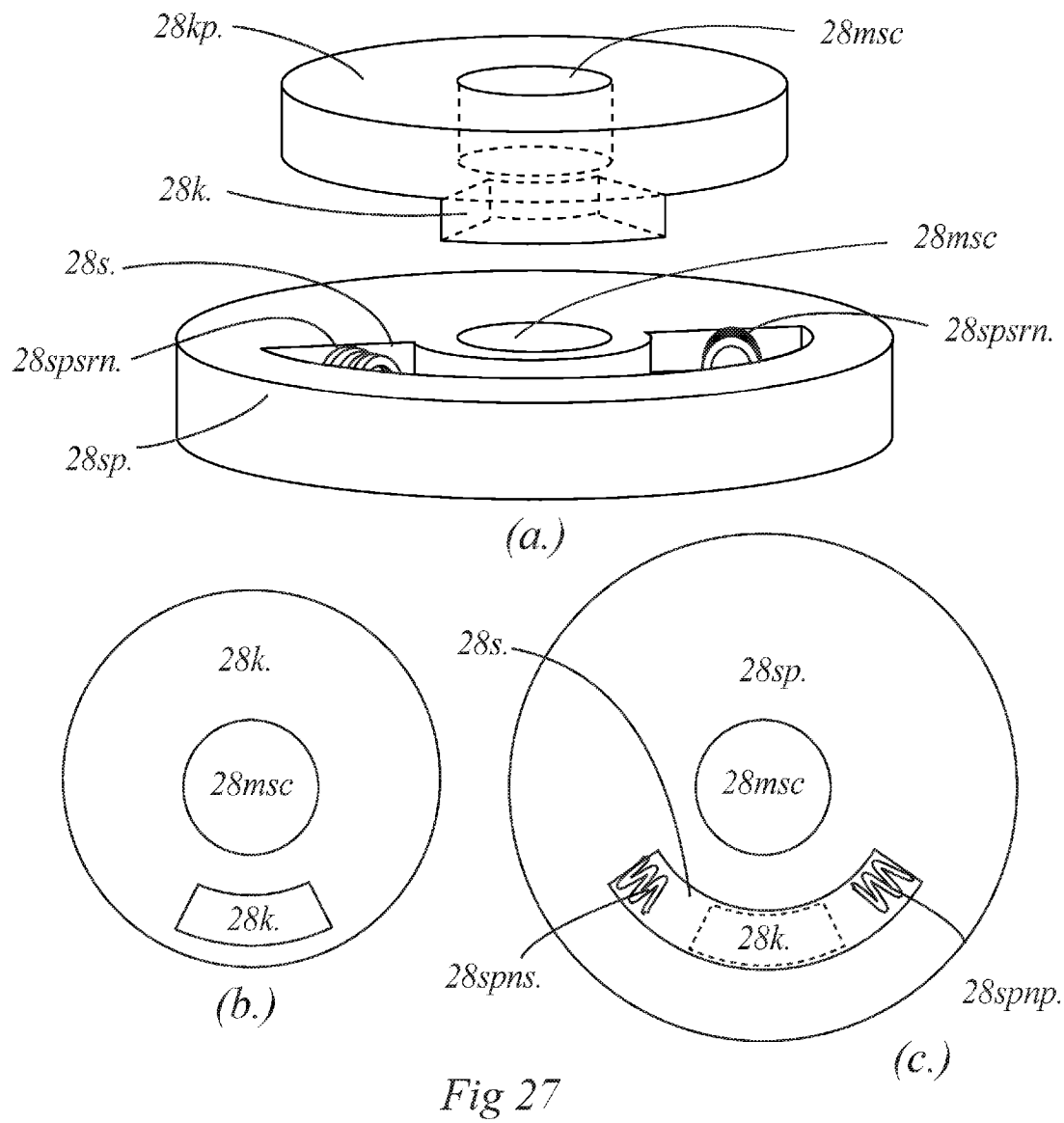
FIG. 27 (*a.*) is a perspective view of both the Key plate and the Slot plate elements of the Torsional transfer mechanism, which shows how, when the former is placed on top of the latter with both rotating around the Mast, rotations of the former are allowed some degree of 'wiggle room' before its Key engages one or the other of the latter's Springs.

FIG. 27 (a.) shows the Torsional transfer mechanism, "TTM" (28.) to consist of two circular plates, one, the Key plate (28kp.), which has a Key (28k) protruding from its bottom side, and the other a Slot plate (28sp.), which has a Slot (28s.) with Springs at each end cut into its top side, the Slot plate (28s.) allowing the Key Plate (28kp.) to rotate concentric with a limited distance before engaging the Slot plate (28sp.). With this mechanism, the TTM is able to conserve and later use nearly all the energy lost by direction reversals.

FIG. 27 (c.) is a top-down view of the Slot plate (28sp.), the Slot (28c.), and the two Springs (28pn.), along with how the Key (28k.) from the Key plate (28kp.), shown in FIG. 27 (b.) that fits between the two Springs (28spn.) without engaging either one.

It will not have escaped notice that the Slot plate (28sp.) has a significantly larger diameter than the Key plate (28kp.). This is to allow a cylinder attached to the Slot plate (28sp.) to serve as a combination Torque transmitter/Generator cover (29a.) for the Armstrong electrical generator (29.). The Armstrong generator will be discussed presently, beginning with Paragraph 0222.

Figure 28:
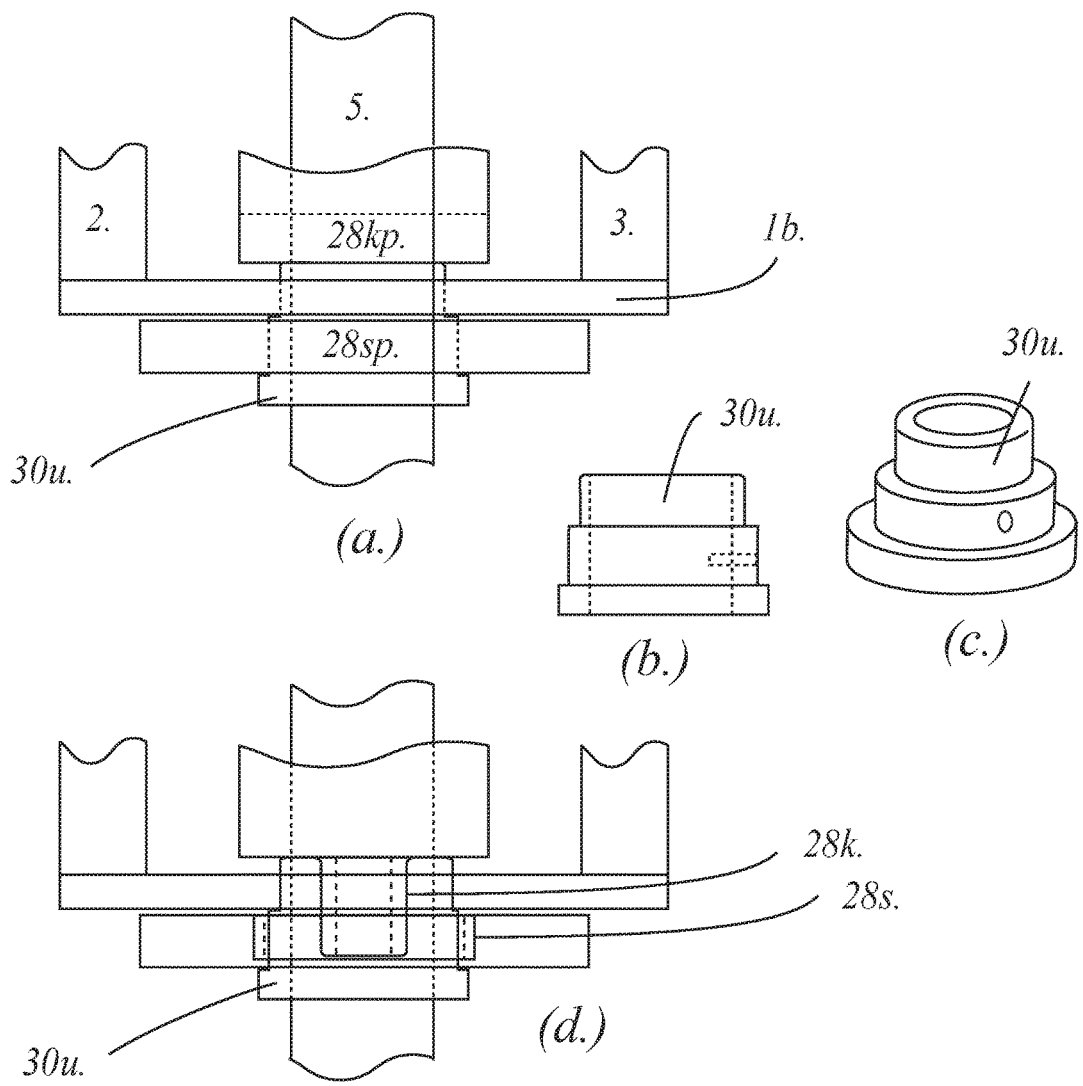
FIG. 28 (*a.*) is a side view showing the Upper slip-on flange supporting the Key plate frame of the Oscillating wing, the Floor, and the Slot plate, while allowing them to rotate around the Mast.

FIG. 28 (a.), FIG. 28 (b), FIG. 28 (c.) and FIG. 28 (d.) all focus on the Upper slip on flange (30u.) which is attached to the Mast (5.), and which has been lathed to support both the Floor (1b.) and the Slot plate (28sp.) allowing them to rotate completely around it in response to changes in Wind (14.) direction, and in the case of the Slot plate (28sp.) additionally to the oscillations of the Oscillating wing (7.).

As observable in FIG. 28 (b.) and FIG. 28 (c.), front and side views respectively, the Upper slip on flange (30u.) is drilled and tapped to allow for a set screw, which along with drilling and taping for similar set screws in the DPMA holder (29b.) and the Lower slip on flange (30l.) allow street lamps, flagpoles and other towers to be used as Wind Wing masts (5b.) (for even more rapid deployment of Wind Wings as alternative to fossil fuel burning) sources of electricity should global warming accelerate beyond what is anticipated.

FIG. 28 (a.) shows, for simplicity, a front view of the Slot plate (28sp.) and the Key plate (28kp.) without the presence of the Key (28k.) or the Slot (28s.). While FIG. 28d is the same drawing, but shows the presence of the Key (28k.) and the Slot (28s.). Also shown in FIG. 28 (a.) and FIG. 28 (b.) is that the Key plate (28kp.) should in most cases be the bottom frame of the Oscillating wing (7.).

Figure 29:
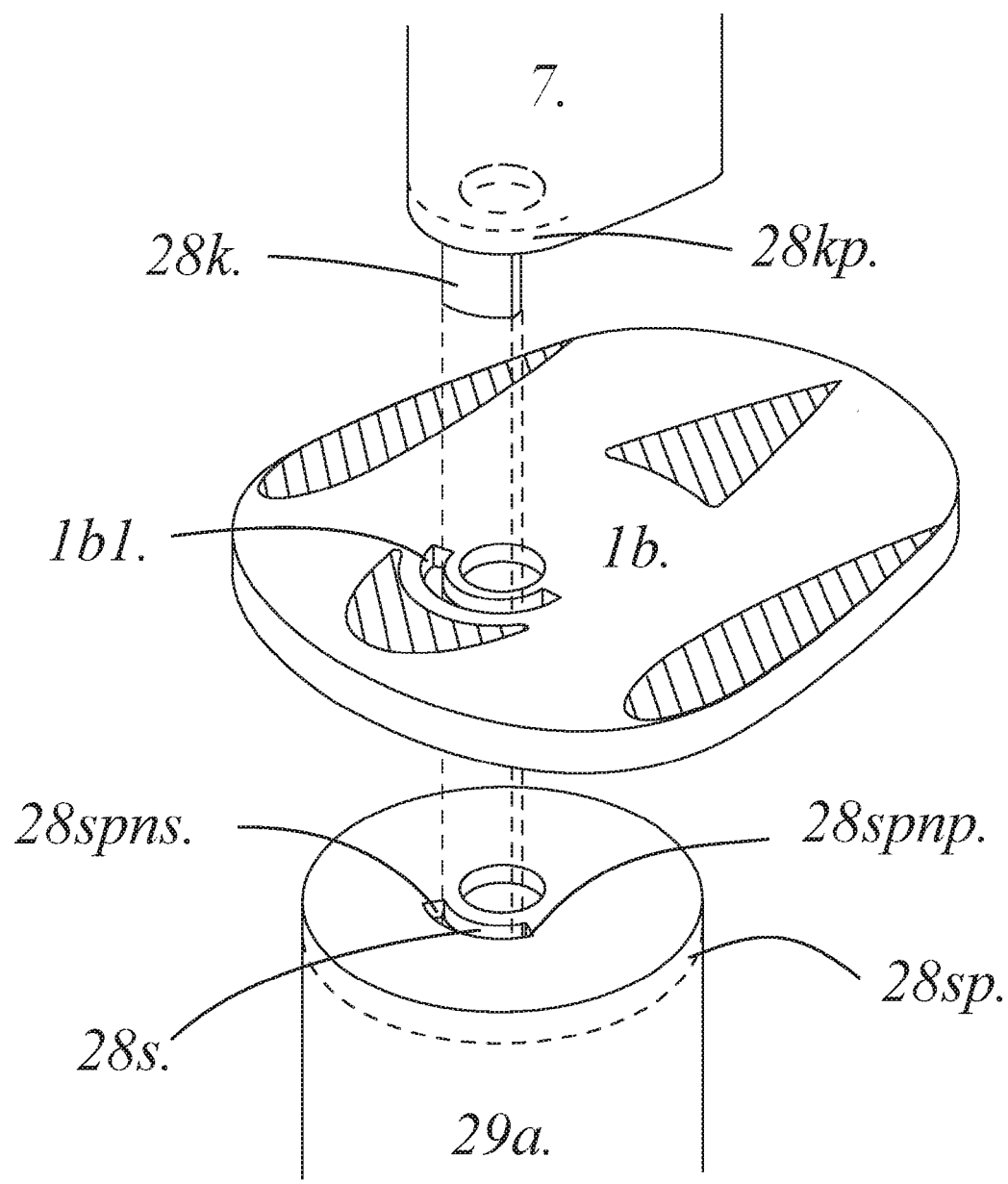
FIG. 29 is a perspective drawing showing how the Key of the Key plate extends through the Key clearance in the Floor into the Slot of the Slot plate, allowing the rotations of the Oscillating wing to be taken up by the Slot plate without engaging the Floor, as long as these oscillations do not exceed the arc of the Key clearance. Worthy of note is that the arc of the Key clearance is greater than the arc of the Slot, so that the Floor is immune to actions between Key plate and the Slot plate, and that, in contrast to the rotations of the Key plate and the Slot plate, the only time the Floor rotates is in response to changes in wind direction.

FIG. 29 is a perspective view which allows how the Key (28k) can transmit the torque from the Oscillating wing (7.) through the Tower Model Floor (1b.) to the Slot plate (28sp.) without coming into contact with the Tower Model Floor (1b.). Only when the wind changes direction significantly will they all be rotated by the Aft nacelle acting as a tail. Then, after everything has been rotated accordingly, a few oscillations of the Oscillating wing (7.) will reestablish these clearances.

Figure 30:
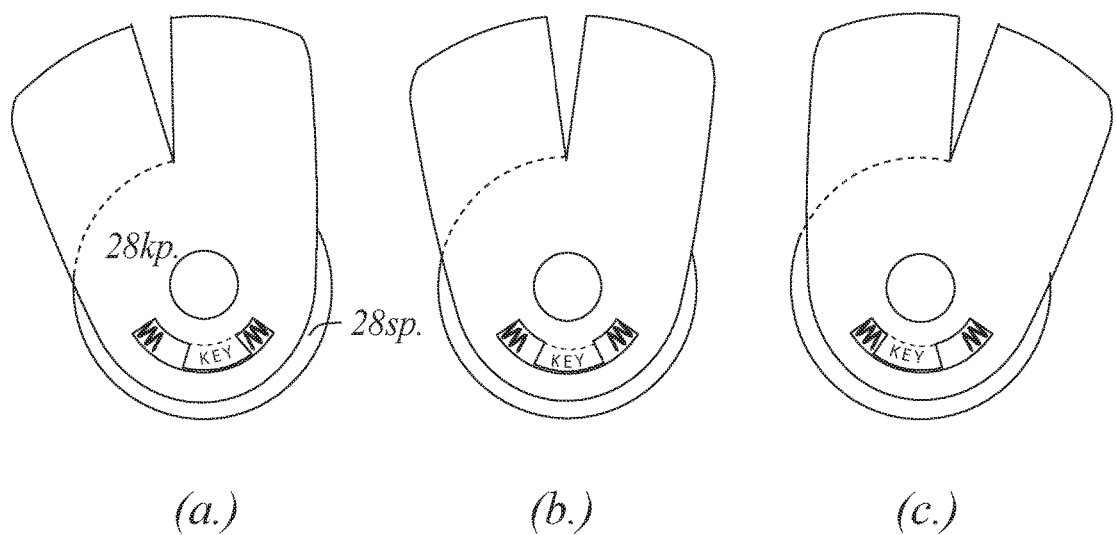
FIG. 30 (*a.*), FIG. 30 (*b.*) and FIG. 30 (*c.*) are three top down views showing the Key not engaging either of the two Springs at the ends of the Slot, allowing the Oscillating wing "wiggle room" to initiate oscillations before engaging the load of the Coils which are connected to the Slot plate through the Torque transmitter/Generator cover, and the Coil transports.

FIG. 30 (a.). FIG. 30 (b.). and FIG. 30 (c.) and FIG. 31 (a.), FIG. 31 (b.), FIG. 31 (c.), FIG. 31 (d.), FIG. 31 (e.), FIG. 31 (f), FIG. 31 (g.), FIG. 31 (h.) and FIG. 31 (i.) are an attempts to show the operation of the TTM in an easy-to-appreciate manner. Each drawing is a top-down view of the Oscillating wing (7.) at a rotation relative to the Wind (in this illustration assumed to coming from the bottom of the page). For example FIG. 30 b portrays the Oscillating wing (7.) amidships. The outline of the Oscillating wing (7.) is the outline of a Yeager wing (23.) because it is assumed that in most cases where a TTM is employed, a Yeager wing (23.) will be as well, and because the V in the outline of the Oscillating wing (7.) formed by the open area between the Yeager wing starboard element (23s.) and the Yeager wing port starboard element (23p.) highlights its angle off the wind.

FIG. 30 (a.), FIG. 30 (b.), and FIG. 30 (c.) show the TTM allowing the Oscillating wing (7.) to rotate in the range 10 degrees in either direction without the Key (28k) coming into contact with either of the two Springs (28sprn.). This allows the Windraider process to initiate without any load inhibiting it.

Normally it takes 2, 3, or 4 less-than-full-traverse oscillations before the Windraider process is able to build up oscillations so that it oscillates the Oscillating wing (7.) over its full traverse. At some point before then, the Key (28k) comes into contact with the two Springs (28spn.), compressing one and then the other to increasing degrees.

Very soon however, the Windraider process develops enough torque to rotate the Slot plate (28sp.) with its load of the Torque transmitter/Generator cover (29a.), the Coil transports (29d.) and the Coils (29c.).

When the rotation reaches the end of its traverse, it will stop and begin to reverse (Paragraphs 0122-0123 and FIG. 7 and FIG. 8). The momentum of the Slot plate (28sp.) and its load will however continue for the briefest instant and then stop as the compressed spring decompresses. This provides a boost for the Oscillating wing (7.) starting to rotate in the reverse direction.

What is taking place here is one of the two Springs (28sprn.) acting in its role as a battery, or better a capacitor, releasing the energy that it accumulated since the initiation of it becoming compressed as illustrated in FIG. 31b. This is one of the remarkable things about the TTM, storing and releasing energy, so that very little is lost in the course of its direction reversals.

Figure 31:
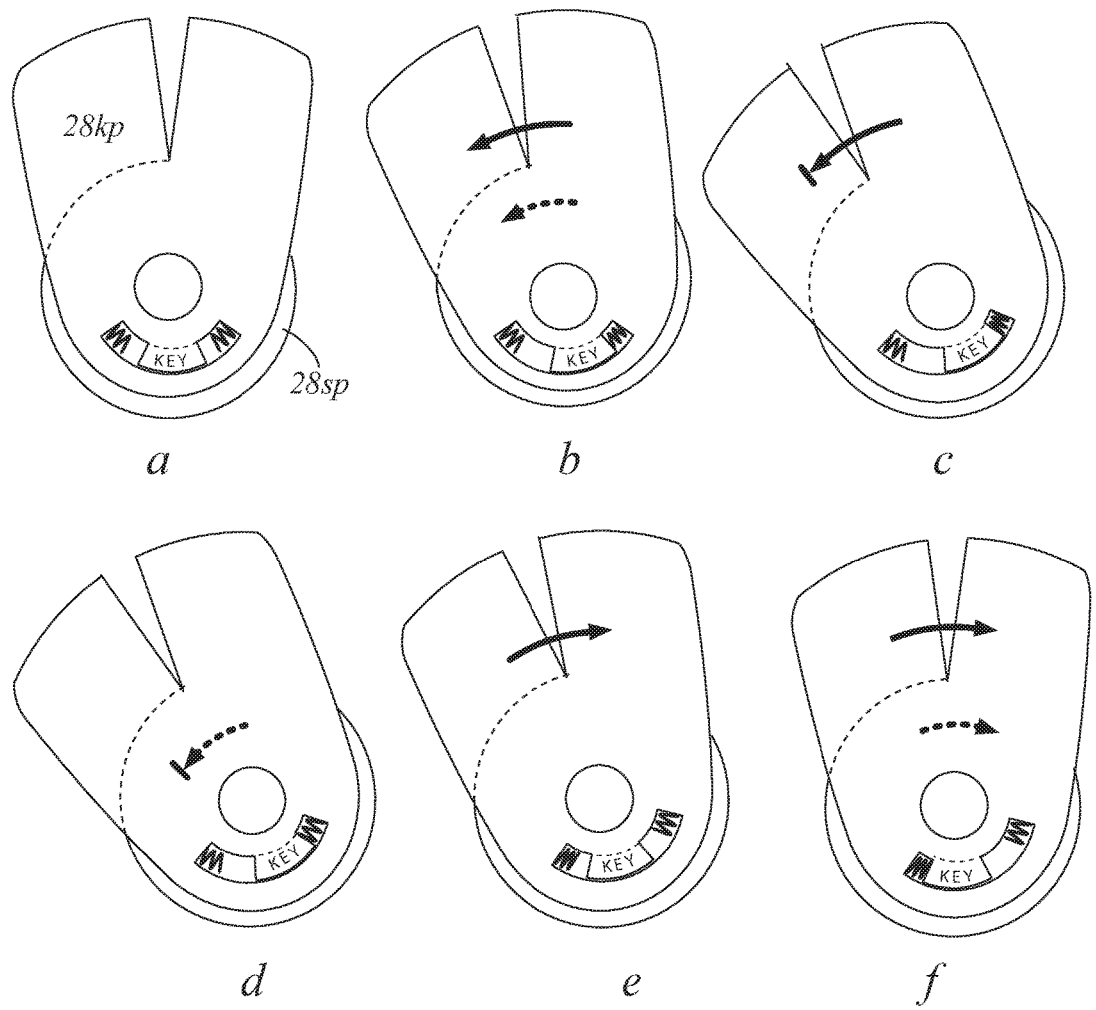
FIG. 31 provides six illustrations showing how the Torsional transfer mechanism cushions the Oscillating wing at the end of a traverse, storing the energy absorbed in one of the Slot Springs and then, as the Oscillating wing begins to rotate in the opposite direction releasing this energy accelerating this rotation.

As illustrated in FIG. 31 (e.) and FIG. 31 (f) the Key (28k) begins compressing the other of the two Springs (28sprn.) followed by the Slot plate (28sp.) and its load (28lp.) rotating in the same direction and at the same rotational speed (FIG. 30f.) as the Oscillating wing (7.).

It is worth highlighting that the TTM not only conserves the energy that might otherwise be lost in the Oscillating wing's (7.) reversals of direction, but it further cushions the components involved, and perhaps most importantly allows the Wind Wing to move a much greater weight of Coils (29b.). It is this lattermost capability that allows the Wind Wing to power the Armstrong electrical generator (29.).

Figure 32:
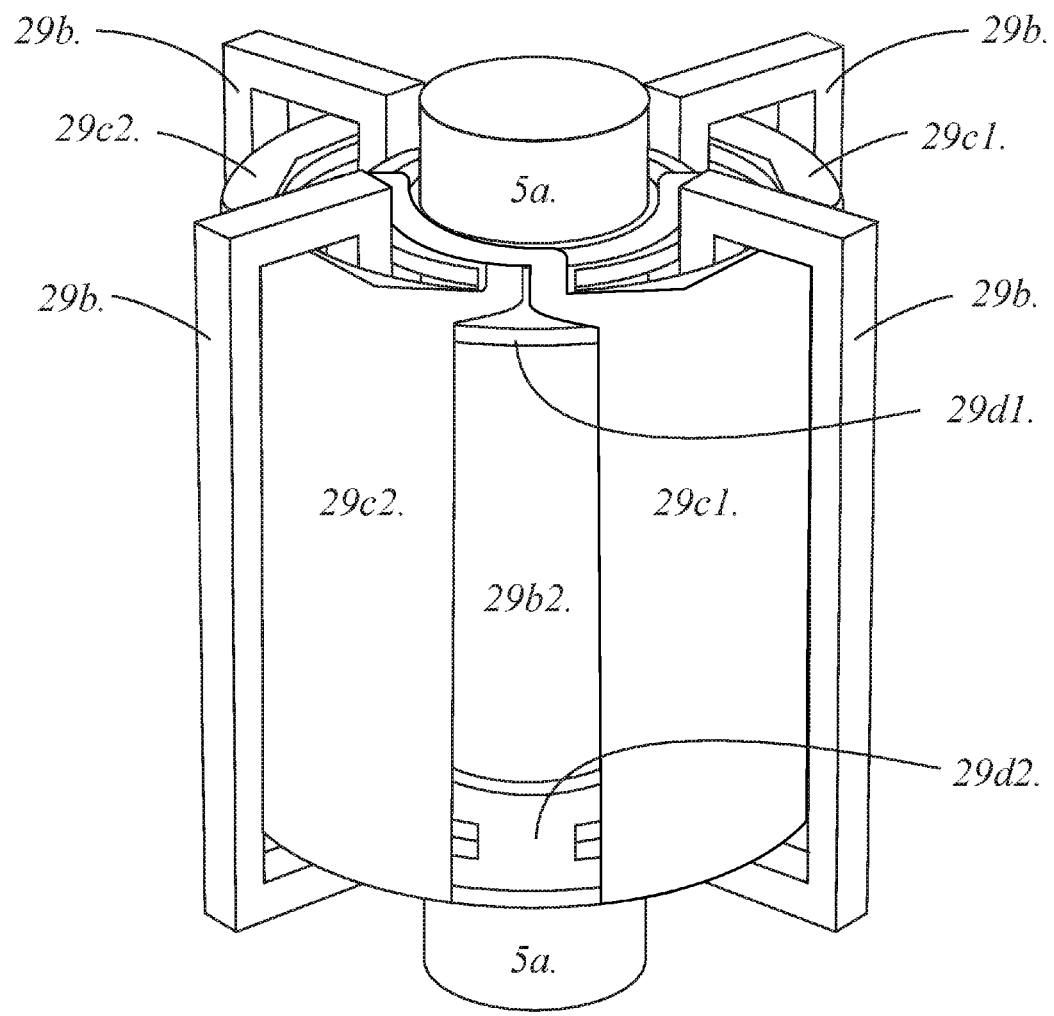
FIG. 32 is a perspective view of the Armstrong electrical generator showing all of its major components, lacking only the extensions that connect the Top and Bottom Coil transports to the Torque transmitter/Generator cover.

FIG. 32 is perspective view of the Armstrong generator (29.) without its Torque transmitter/Generator cover (29a.), or the Extensions (29e.) that attach it to the Coil transports (29d.)

Named to honor Neil Armstrong, the Armstrong generator (29.) takes advantage of [1.] the strength and stability of the Mast (5b.) that can be as thick as 41% of the width of the Wind Wing, [2.], an obscure magnet arrangement known as a dipole permanent magnet, [3.] a property of oscillating rotational motion that along with Dipole permanent magnet assemblies (29b.) enables magnets to be positioned on both sides of a coil (i.e. inside as well as outside of it), and [4.] Faraday's Law of Induction which recognizes that by doubling the flux density, such an arrangement will induce the same voltage with half the number, and thus approximately half the weight, of coil wraps.

Figure 33:
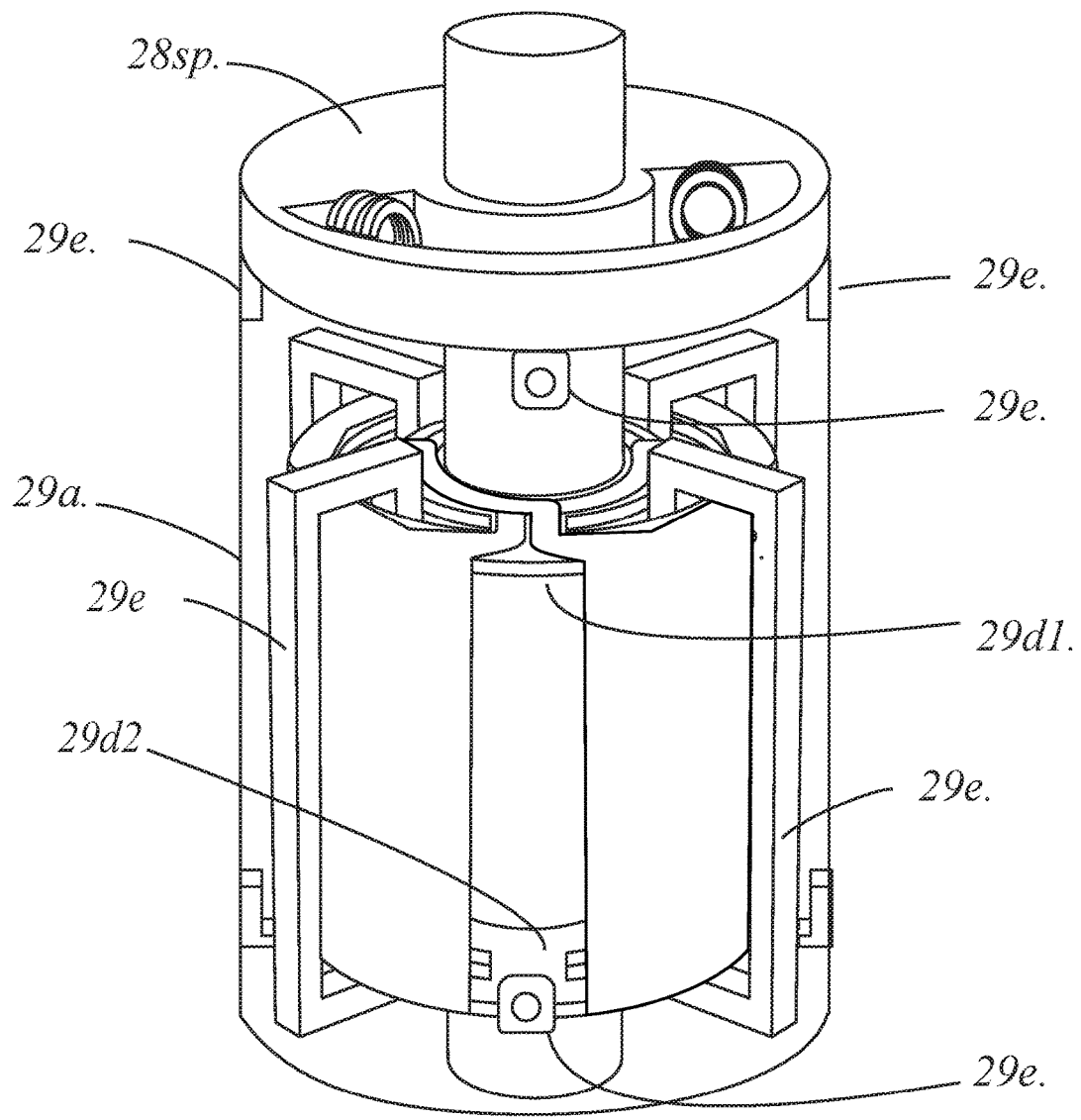
FIG. 33 is a perspective view of the means by which the Torque transmitter/Generator cover connects the Slot plate to the Top and Bottom Coil transports of the Armstrong electrical generator.

FIG. 33 comes from the same perspective as FIG. 32, but shows the positioning of the Torque transmitter/Generator cover (29a.), and the Extensions (29e.) of the two Coil transports (29d1. and 29d2.) that allow the Torque transmitter/Generator cover (29a.) to transfer torque from the Slot plate (28sp.) of the Torsional transfer mechanism (28.) to the two Coil transports (29d1. and 29d2.) rotating them around the Mast (5b.).

Figure 34:
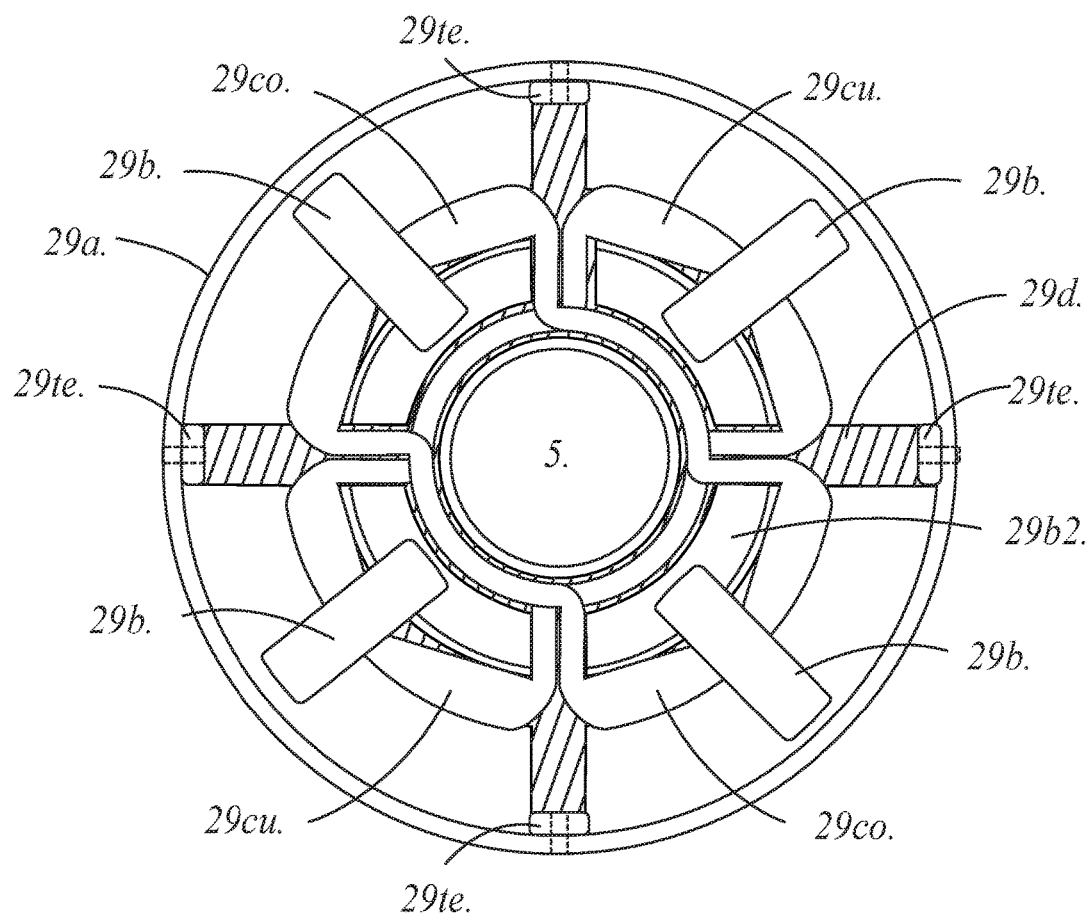
FIG. 34 is a top view of the Armstrong electrical generator and a cross section of the Torque transmitter/Generator cover showing its attachment to the Coil transports.

FIG. 34 is a top down view of the Armstrong generator (29.) that shows the Mast (5b.); the Torque transmitter/Generator cover (29a.); the top four Extensions (29e.) that connect it to the Upper coil transport (hatched -29d1.); the Upper coil transport itself (29d.); the tops of the two Coils (29c1. and 29c2.) that rotate along with it; the tops of the four Dipole permanent magnet assemblies "DPMAs" (29b.) that the two Coils (29c1. and 29c2.) rotate through; and the DPMA holder (29b2.) that attaches these four DPMAs (29b.) to the Mast (5b.) and upon which the top Coil transport (29d1.) rests and rotates.

Figure 35:
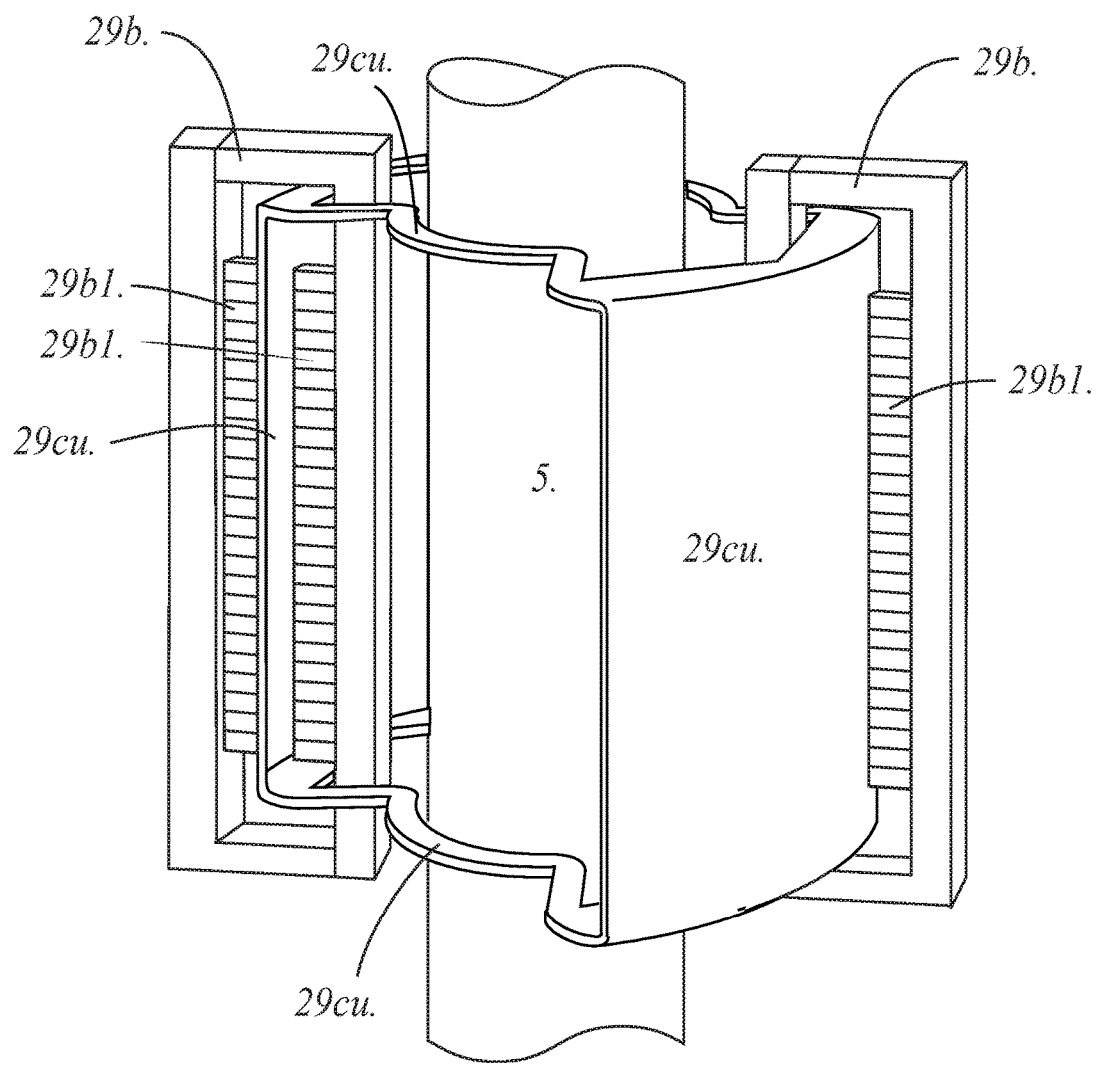
FIG. 35 is a perspective view of one of the Armstrong electrical generators two Coils showing how it is wrapped and how when the Oscillating wing oscillates, its sides are rotated through two DPMAs. The other Coil and its two DPMAs are positioned 90 degrees around the mast with the wraps between its two sides overlaying the wraps between the two sides of this Coil.

FIG. 35 is a perspective view of the wrapping of the Underlaid coil (29c1.) with it passing through two DPMAs (29b.). The same drawing (with different coil labeling (29c2. instead of 29c1.)) could be used to show the wrapping of the Overlaid coil (29c2.): The differentiating feature of the two, aside from being 90 degrees around the Mast (5b.) apart, is that while both of these Coils (29c.) are wrapped similarly around the Mast (5b.) the Overlaid coil (29c2.) is laid over the Underlaid coil (29c1.).

It is especially worthy of note to recognize how the Armstrong generator (29.) enables the Wind Wing to induce the same voltage as other electrical generators, but with half their number of coil wraps.

Faraday's Law of Induction says that moving a length of wire through a magnetic field in a direction perpendicular to that field, induces a voltage in that wire. Increasing the length of the wire drawn through the field, increasing the speed with which it moves perpendicular to that field, and increasing the strength of the field, each increase the voltage induced to commensurate degrees.

The Wind Wing increases the strength of the fields through which its Coils (29.) pass by the simple method of positioning magnets inside the sides of the its Coil wires (29c1. and 29c2.) as well as outside of them. And it does this by the combination of employing what are known as permanent magnet dipoles, and by taking advantage of the Wind Wing's oscillating rotational motion.

Figure 36:
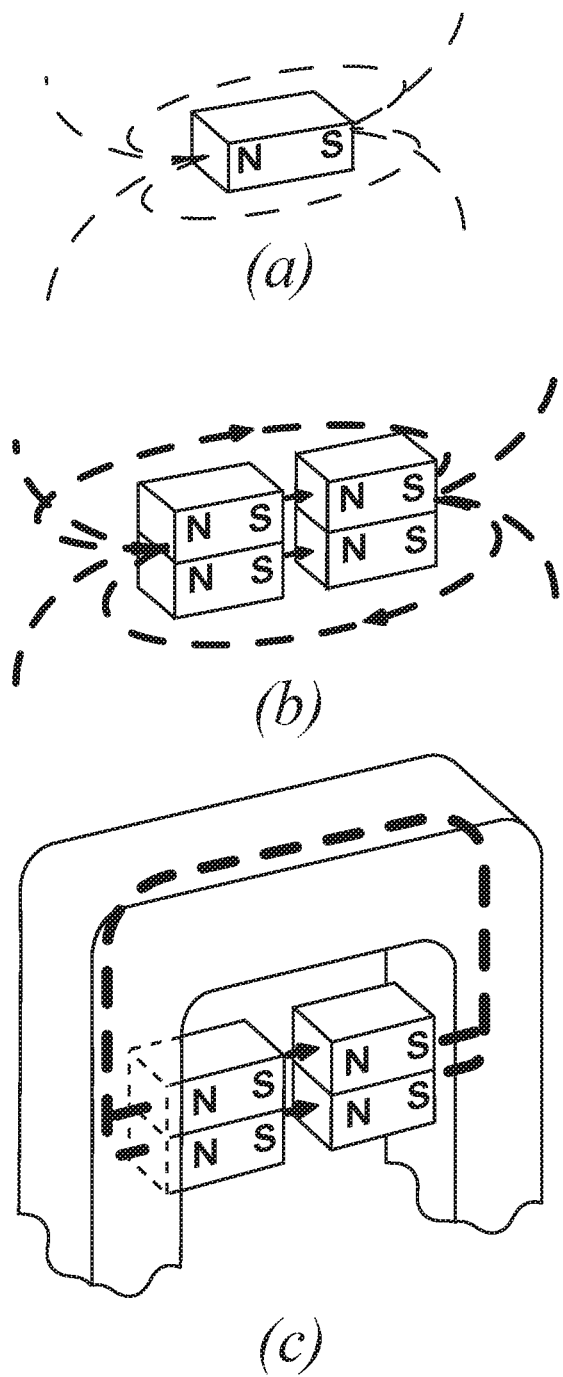
FIG. 36 (*a.*) shows the flux field of a single bar magnet represented by flux lines emanating from its poles.

FIG. 36 (a.) shows flux lines, indicative of a flux field, emanating from the outside poles of a bar magnet. Notably these lines both (1.) go off into space and (2.) wrap around the magnet to its other outside pole.

FIG. 36 (b.) shows the result of stacking magnets on top another with their poles aligned, holding them together, creating compound magnets. Until electromagnets (magnetic material wrapped with a DC current carrying coil) came about, compound magnets were known to supply the strongest degrees of magnetism. Consequently the flux lines in FIG. 36 (b.) as illustrated here are thicker than the flux lines in FIG. 35 (a.).

FIG. 35 (c.) shows the same magnets being held in place by a yoke which also provides a lower than air resistance path for the flux paths between their outside poles. This arrangement is what is known as a dipole permanent magnet. And in the case of the Wind Wing, which also employs stacks of magnets, a Dipole permanent magnet dipole assembly, abbreviated as a DPMA (29b.). How this is done can be found in the Wind Wing Electrical Generator Patent, U.S. Pat. No. 8,860,240, Paragraphs 0103-0109, FIGS. 15-18 therein.

DPMAs (29b.) provide three benefits. First, they hold multiple magnets in place allowing the construction of compound magnets.

Second, the yoke provides a lower-than-air resistance iron path for the flux emanating from the outside poles to pass over the gap between the stacks of magnets, thereby allowing coil wires passing through the gap to have a voltage induced in them. Were this not to be the case, flux flowing between the outside paths would the negate the effect of the flux flowing through this gap. This is part of the reason virtually all other generators have magnets on only one side of their coil wires (positioning them all inside or all outside). Geometrically, there is no practical way to support magnets inside as well as outside of a coil that keeps rotating 360 degrees in the same direction, Third, DPMAs (29b.) by not allowing any of the flux emanating from the outside poles to go off into space, flux density in the gap is higher than it otherwise would be. Because there needs to be the same amount of flux flowing between the outside as flows between their inside poles. By allowing more flux to flow between their outside poles, more flux (actually a higher density of flux) flows between the inside poles. Using Dexter Magnetics magnetic field calculator it can be recognized that this increase is greater than 15%.

Figure 37:
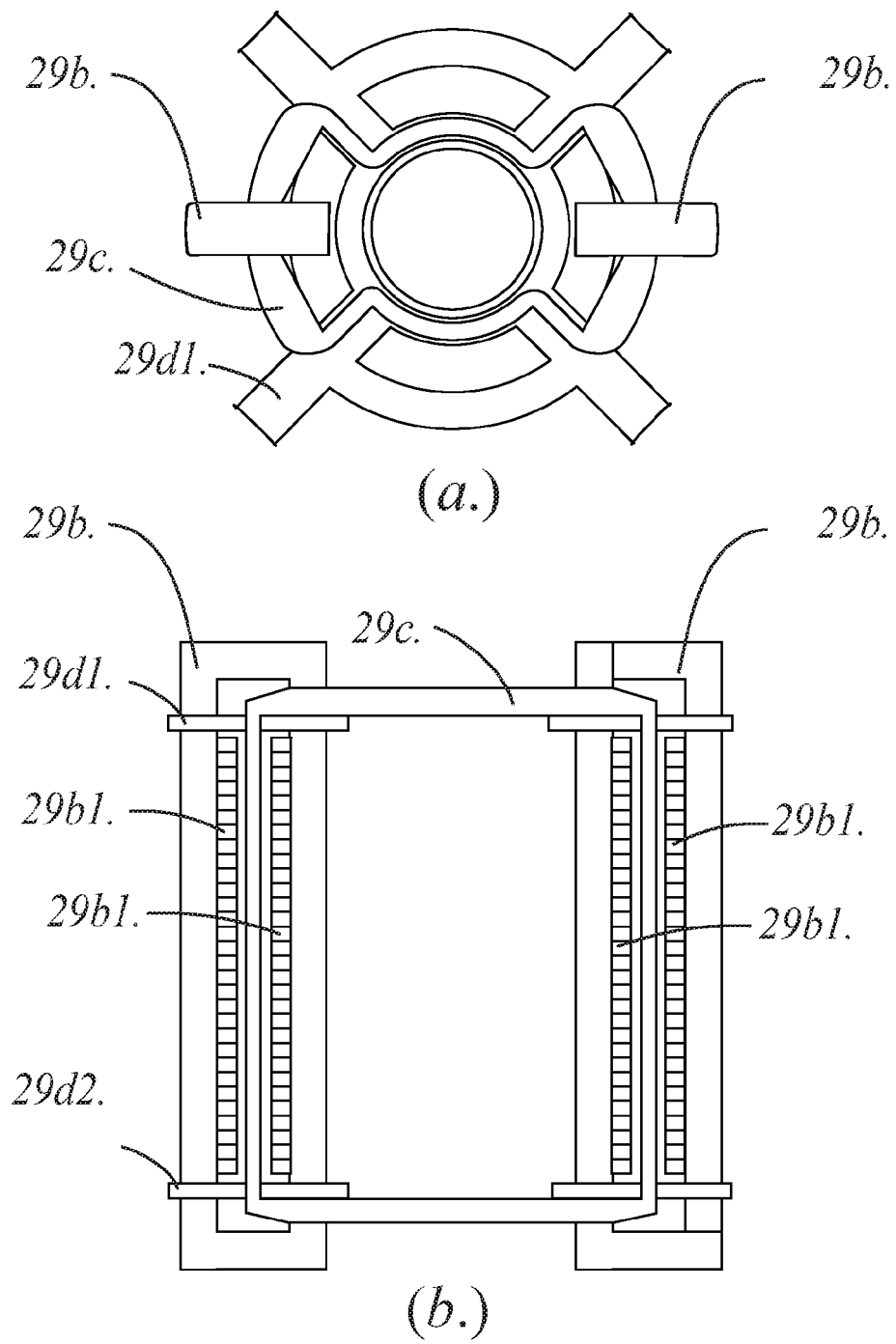
FIG. 37 (*a.*) is a top view and FIG. 37 (*b.*) is a side view of one of the Coils wrapped around the Upper and Lower Coil transports and passing through two DPMAs.

FIG. 37 (a.) provides a top down view of one the Coils (29c.), two of the DPMAs (29b.) and the Upper coil transport (29d1.): while FIG. 37 (b.) shows this Coil (29c.) running over the top of one of Coil transport (29d1.), down between the magnets (29b1.) of one DPMA (29b.), under the Lower coil transport (29d2.) and up between the magnets (29b1.) of the other DPMA (29b.). (Note: the alignments of magnets in each of the two involved DPMAs must have their poles aligned differently, one with all its North poles inboard or outboard, the other with the opposite orientation. The other with this arrangement reversed. Without this, the Faraday effects would negate one another.)

It is easy to underestimate the value of being able to reduce the number of windings by half and still induce the same voltage. Not only is the weight of the Coils (29c.) cut in half, so too are their inertial effects. And so too is the cost. A comprehensive cost/benefit analysis of the Wind Wing has yet to be conducted. But this is one of several factors which suggest it is likely to prove surprisingly inexpensive.

Figure 38:
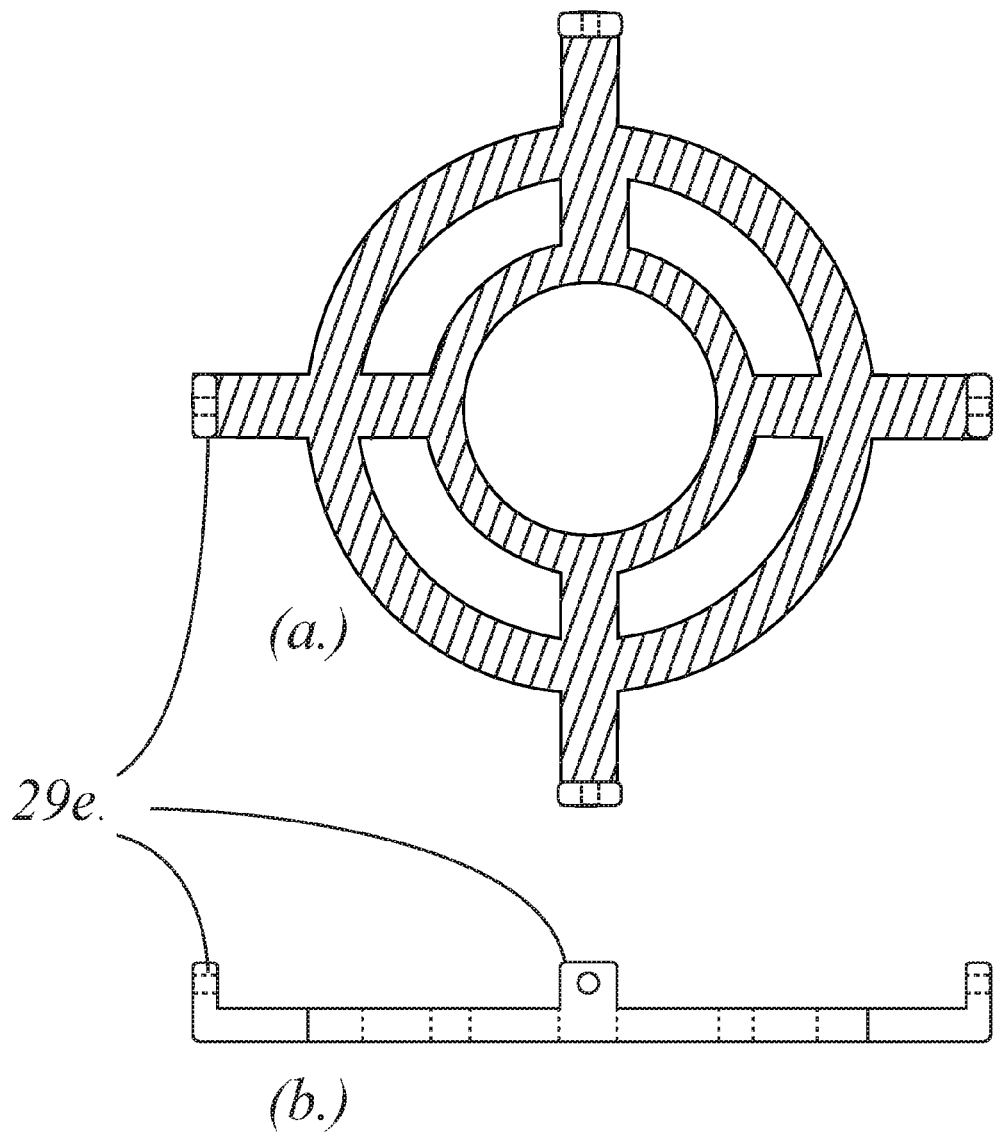
FIG. 38 *a* provides a top view and FIG. 38 *b* provides a side view of a Coil transport.

FIG. 38 provides top (a) and side (b) views of a Coil transport (29d.)—its unusual form dictated by the multiple roles it performs: [1.] Being used as spindle for the wrappings of the Coils (29c.), particularly the arcs formed by of their verticals, allowing them to rotate through the gaps between the magnets (29b1.), [2.] Supporting the weight these Coils (29c.) by shifting it to the DPMA holder (2962), and the Torque transmitter/Generator cover (28a.), [3.] Accepting torque from the Torque transmitter/Generator cover (28a.), using this torque to rotate the Coils (29c.), [4.]

providing clearance for the DPMAs (29.), and [5.] Rotating the vertical sections of each of these Coils (29c.) through 2 DPMAs. So that while appearing unusual, the form of the Coil transports (29d.) provide an unusually high number of important benefits FIG. 38 (a.) is a top view and FIG. 38 (b.) is a side view of a Coil transport (29d.). Its key dimensions are [1.] the innermost circle, whose diameter should be as close as practical to the diameter of the Mast (5.) considerate of the fact it needs to rotate around it. And [2.] the clearances for the inside vertical elements of the DPMAs (29b.) considerate of the manner by which the Coils are wrapped so as to allow the vertical elements of wrappings to be evenly distributed. This distribution is best understood with reference to FIG. 39 (b.) and FIG. 39 (c.).

Figure 39:
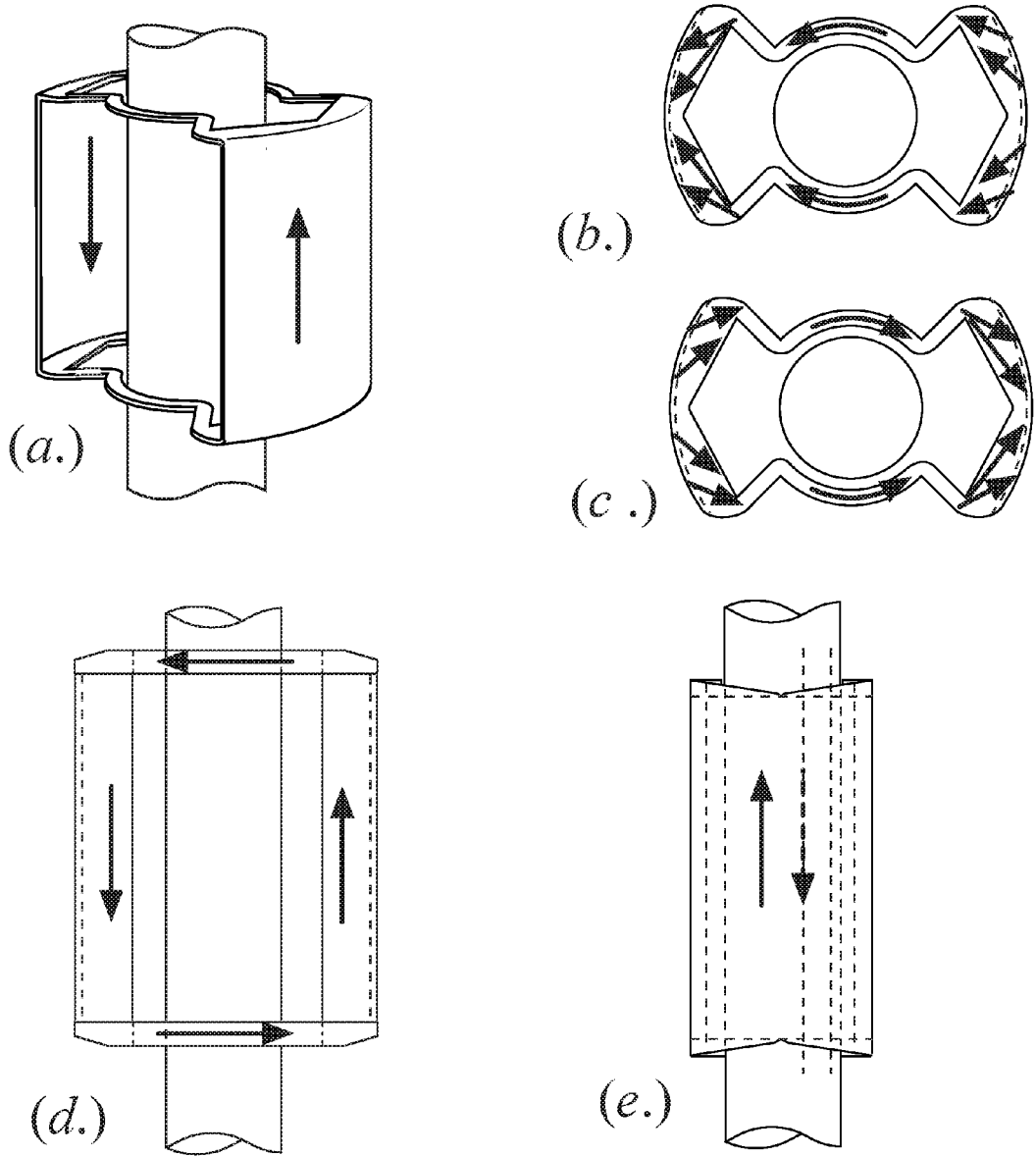
FIG. 39 (*a*.) is a perspective view, FIG. 39 (*b*.) is a top view, FIG. 39 (*c*) is a bottom view, FIG. 39 (*d*.) is a Post side view, and FIG. 39 (*e*.) is an aft view all showing the directions a Coil must wrapped so that rotating through DPMAs induces a voltage within it.

FIG. 39 (a.), FIG. 39 (b.), FIG. 39 (c.) and FIG. 39 (d.), show the directions of the Coil (29c.) wrappings. Coil wrapping is not difficult, but it is tedious and benefits greatly from a fixture allowing the Coil transports (29d.) and the DPMA holder (29b2.) to rotated around temporary shafts.

Figure 40:
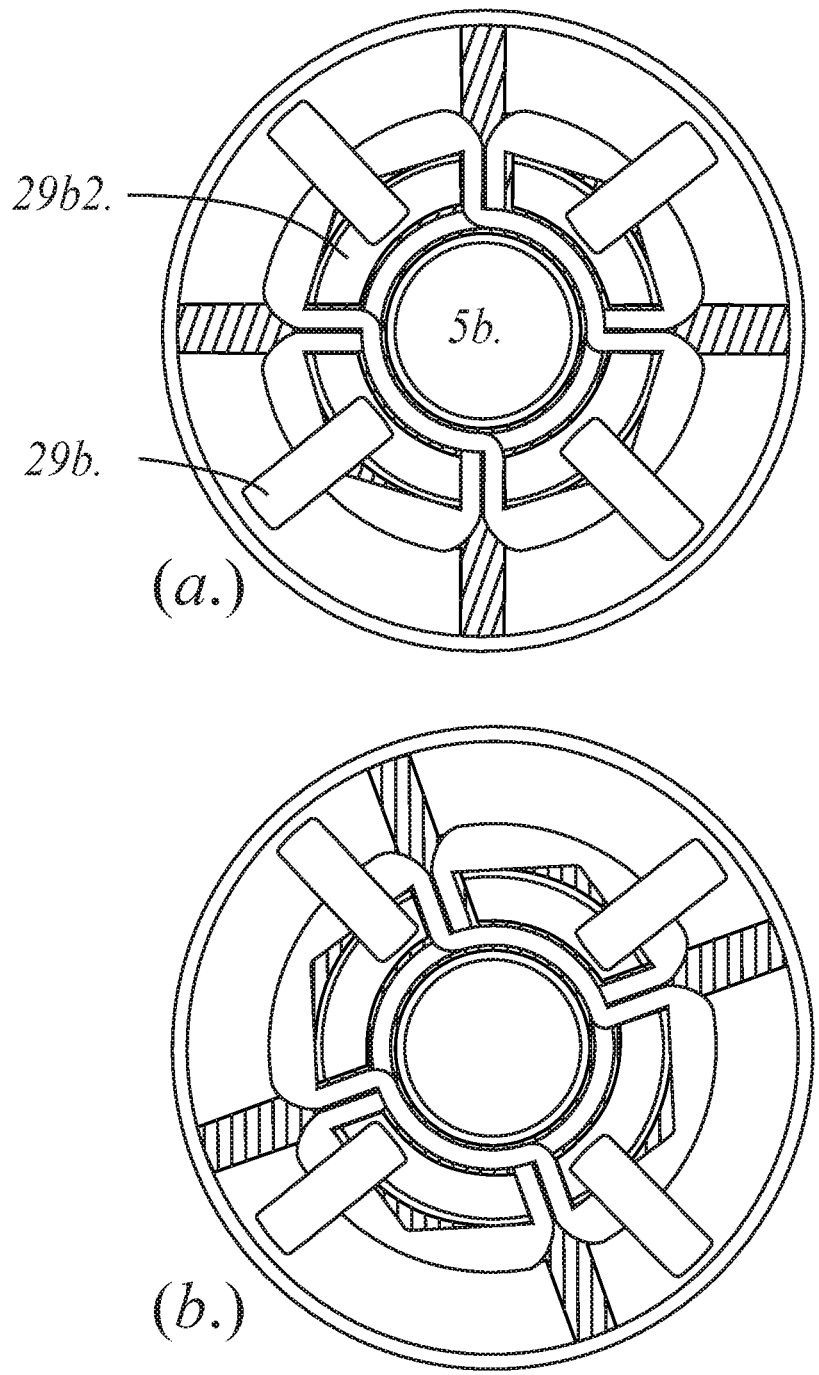

FIG. 40 shows how this unusual Coil (29c.) geometry allows all elements—save the Mast (5b.) the DPMA holder (29b2.) and the four DPMAs (29b.)—to rotate as much as 30 degrees counterclockwise or clockwise. This accommodates the aerodynamically-dictated 59-degree traverse of the Oscillating wing (7.)

Figure 41:
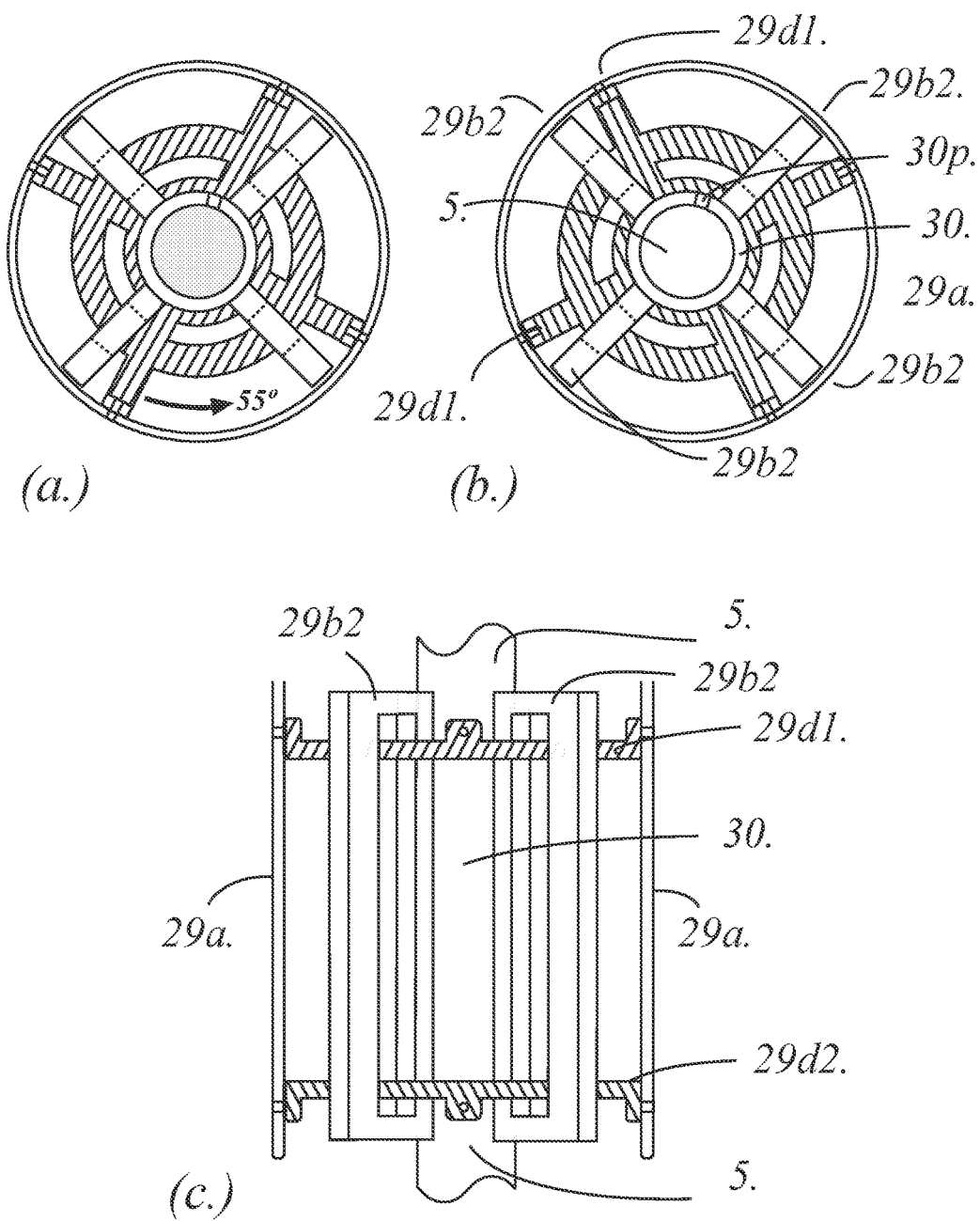
FIG. 41 (*a*.) is identical to FIG. 40 (*b*.) except that it is shown without the Coils and the Torque transmitter/Generator cover.

FIG. 41 (a.) shows how the DPMAs (29b.) are woven into the DPMA holder (29b2.) and how the DPMA holder (30l.) otherwise serves as a spacer between the Upper coil transport (29d1.) the Lower coil transport (29d2.) as well as supporting the entire Armstrong generator by allowing the Upper coil transport (29d1.) to rest and rotate on it.

It can be recognized that the Wind Wing can use any sufficiently strong vertical cylinder as its Mast (5b.). All that will be required will be to slide these elements over it, tighten the set screws and add the other elements. Planning has included consideration of assembling kits that can be used with flagpoles, modified street lights and any number of similar structures. In the event of severe worsening of global warming demanding even more rapid abandonment of fossil fuel burning, and deployment of massive numbers of Wind Wings, such kits will be easily fabricated by almost any capable body shop.

Figure 42:
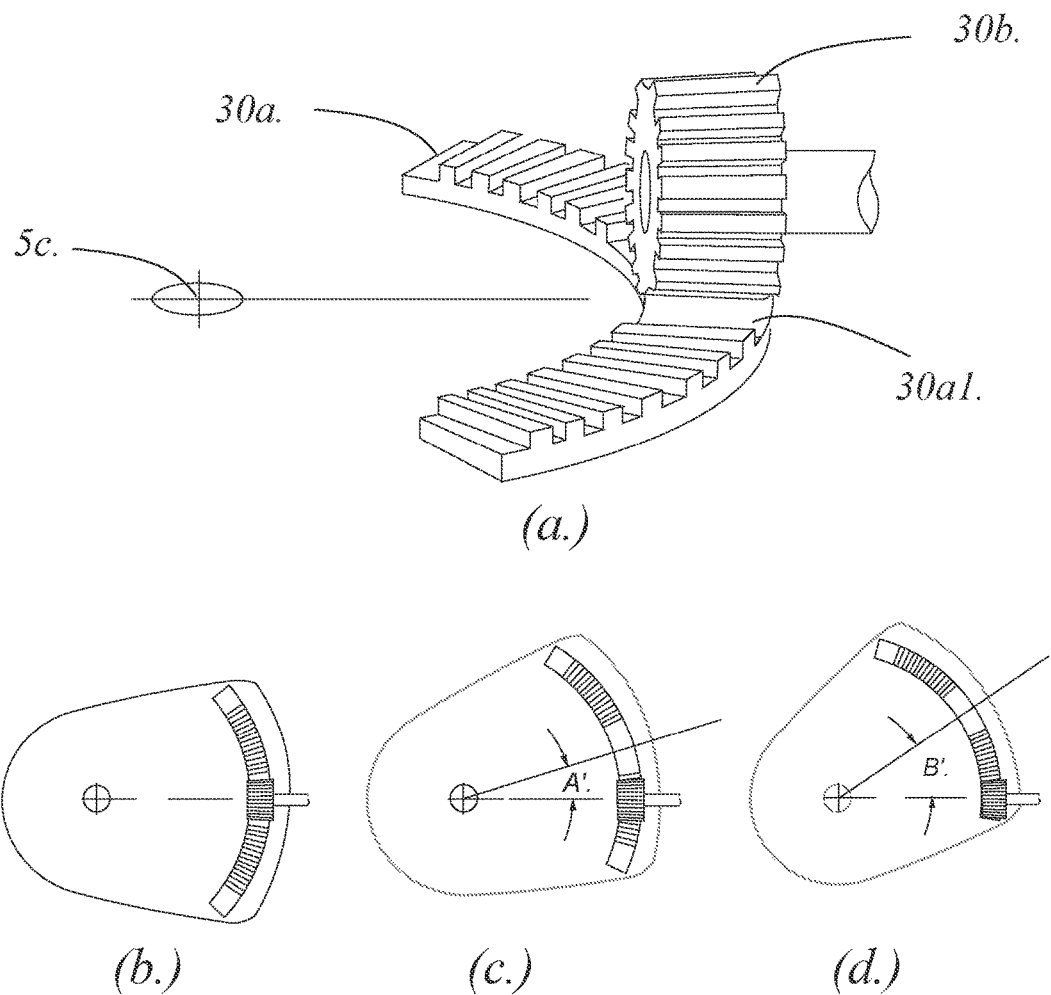
FIG. 42 (*a*.) is a perspective view of the Wiggler.

FIG. 42 is a perspective view of the Wiggler (31.), while FIG. 42 (a.), FIG. 42 (b.) and FIG. 42 (c.) are top-down views of it when the Oscillating wing is amidships (FIG. 41 (a.); at the threshold angle (angle A' in the drawing) where oscillations are sufficient to burden it with the load of a standard generator or motor/generator (FIG. 41 (b.); and at the angle (angle B' in the drawing) which is the limit of its traverse (FIG. 41 (c.).

The Wiggler (31.) is a simple mechanism that has two parts. The first is a approximately 60 degrees of a circular Rack (31a.) concentric with the Center of the Mast (5c.), centered on a line running from the Center of the Mast (5c.) to the midpoint of the aft side of the Oscillating wing (7.), absent teeth in the center of the rack (so as to not burden the Oscillating wing with a load until it has built-up sufficient torque from the Windraider process—usually 2-4 oscillations), and which can be adhered to either the top or the bottom of the Oscillating wing (or in the case of a Yeager wing to the topmost or bottommost knuckle. The second part is a horizontal Pinion (31b.) capable of taking off its torque and transferring to a generator or combination motor generator to the top of Wind Wing's roof (4.) or the bottom of its Floor (1.).

The Wiggler (31.) recognizes that many if not most electrical generation demands of $20 Model Wind Wings are likely to be more economically accommodated using commercial generators or motor generators, particularly with the ongoing decrease in their costs, than by using either the Wind Wing Electrical Generator (U.S. Pat. No. 8,860,240) or, in a much lesser number of situations, the Armstrong electrical generator (29.)

This appears increasingly true the closer one works with organizations wishing to assist poor communities: The suggestion being their assembling Wind Wings "kits" containing a small motor/generator, a Wiggler (31.), a single chip bridge rectifier, batteries and LEDs, and distributing them to these communities. As earlier noted, the inventor is committed to these communities remaining free to use all Wind Wing IP to build Wing Wings for themselves or their neighbors. And it appears only common sense for this to take place in cooperation with established organizations of the same mind and purpose Finally, there is very much the potential of Wind Wings being applied to a broad range of requirements where they would be mounted other than on a mast or employed other than by poor communities. Among the more obvious of these are situations where the rectangular frontal surface coverage provided by Wind Wings is significantly greater than that allowed by the circular swept area of a turbine. Where the available frontal area is square, this advantage is slightly less than 22%. For other areas, such exist in rectangular frontal area alleyways, and other urban canyons, it will be even greater. It even appears likely that the Wind Wing with its absence of danger from high speed turbine blades becoming detached, and its relative insensitivity to the damaging effects of gradients will enable wind power to be a competitive energy alternative in urban areas, something up to now generally considered relatively impractical.

What is claimed is:
1. A method for converting wind energy comprising:
   a. channeling a wind stream into a pair of aerodynamically streamlined channels defined by a pair of internally streamlined outside vertical airfoils and a center airfoil consisting of 3 collectively aerodynamically streamlined sections: a forward nacelle, an aft nacelle, and between them, a center section, so that the wind stream forms two air flows through the channels;
   b. the two airflows causing the center section to oscillate between the two channels about a vertical mast, thereby converting the airflow into oscillating mechanical energy, and
   c. driving an electrical generator using the oscillating mechanical energy from the oscillating motion of the center section to generate electricity.
2. An apparatus for converting wind energy comprising:
   a. a pair of streamlined outside vertical airfoils, each outside vertical airfoil similar to a National Advisory Committee for Aeronautics NACA 0020 airfoil shape, each outside vertical airfoil having a leading edge, both leading edges of the outside airfoils pointed in the same direction,
   b. a center vertical streamlined airfoil similar to NACA 0030, aimed in the same direction and positioned between the outside airfoils, consisting of three sections; a forward nacelle, an aft nacelle, and an oscillating center section, thereby defining two alternating streamlined channels, the leading edge of the center airfoil also positioned so that the center airfoil extends slightly ahead of the leading edges of the outside vertical airfoils, the center airfoil having chord approximately 1.5 times longer than a chord of the outside airfoils, and c. the center section of the center airfoil positioned to permit the rotation of the center section about an axis of a vertical mast across an arc having an angle of approximately of 58 degrees.

3. The apparatus of claim 2, wherein the center section of the center airfoil further comprises;

a pair of pivoting sides permitting programmable expansion or reduction of the arc of the aft ends of the center section relative to one another.

4. The apparatus of claim 2, further comprising;

a. a transfer mechanism comprising a pair of plates; a slot plate and a key plate, mounted on the vertical mast to permit rotation of each plate around the axis of the vertical mast, the slot plate having an arc-shaped slot, the key plate having a key extending into the arc-shaped slot to allow limited movement of the key in the slot when the key plate is rotated around the vertical mast;

b. at least two coil transports mounted to permit rotation of the coil transports around the vertical mast;

c. the arc-shaped slot enclosing springs at each end;

d. the key plate coupled to the center section of the center airfoil so that oscillation of this center section oscillates the key plate about the vertical mast;

e. the oscillations of the key plate oscillating in the slot plate which in turn oscillate the coil transports, a plurality of the coils between a plurality of magnet dipoles and inducing a current in the coils.

* * * * *